US012632527B2

(12) United States Patent
Pan et al.

(10) Patent No.: US 12,632,527 B2
(45) Date of Patent: May 19, 2026

(54) DATA TRANSMISSION METHOD AND ELECTRONIC DEVICE

(71) Applicant: HUAWEI TECHNOLOGIES CO., LTD., Guangdong (CN)

(72) Inventors: Shiran Pan, Shanghai (CN); Xiwen Fang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 270 days.

(21) Appl. No.: 18/024,913

(22) PCT Filed: Aug. 11, 2021

(86) PCT No.: PCT/CN2021/112098
§ 371 (c)(1),
(2) Date: Mar. 6, 2023

(87) PCT Pub. No.: WO2022/052727
PCT Pub. Date: Mar. 17, 2022

(65) Prior Publication Data
US 2023/0401300 A1      Dec. 14, 2023

(30) Foreign Application Priority Data

Sep. 9, 2020 (CN) .......................... 202010942712.0
Dec. 29, 2020 (CN) .......................... 202011590388.7

(51) Int. Cl.
*G06F 21/32* (2013.01)
*G06F 21/60* (2013.01)
*G06F 21/62* (2013.01)

(52) U.S. Cl.
CPC ............ *G06F 21/32* (2013.01); *G06F 21/602* (2013.01); *G06F 21/606* (2013.01); *G06F 21/6245* (2013.01)

(58) Field of Classification Search
CPC .... G06F 21/32; G06F 21/602; G06F 21/6245; G06F 21/606
(Continued)

(56) References Cited

U.S. PATENT DOCUMENTS 8,402,556 B2 * 3/2013 Bradley ................ H04L 67/104
713/160
9,071,602 B2 * 6/2015 Kamakura ............. G06V 10/95
(Continued)

FOREIGN PATENT DOCUMENTS

CN          107800672 A      3/2018
CN          109302415 A      2/2019
(Continued)

OTHER PUBLICATIONS

NPL Search Terms (Year: 2025).*
(Continued)

*Primary Examiner* — Syed A Zaidi
(74) *Attorney, Agent, or Firm* — WOMBLE BOND DICKINSON (US) LLP

(57) ABSTRACT

This application provides a data transmission method and an electronic device. The method includes: a first electronic device establishes a connection to a second electronic device. The second electronic device sends a request to the first electronic device, where the request includes a biometric feature input by a user. Then, the first electronic device performs, by using a target biometric feature template, authentication on the biometric feature input by the user, and, in response to the authentication succeeding, determines sensitive data associated with the target biometric feature template. Finally, the first electronic device transmits the sensitive data to the second electronic device. According to the method, secure transmission of sensitive data that includes biometric feature data can be implemented.

19 Claims, 45 Drawing Sheets

(58) Field of Classification Search
USPC ........................................................... 726/17
See application file for complete search history.

(56) References Cited

U.S. PATENT DOCUMENTS

| | | | |
|---|---|---|---|
| 11,315,188 B2 * | 4/2022 | Niering | G06Q 10/0635 |
| 2002/0143798 A1 * | 10/2002 | Lisiecki | H04L 67/1097 |
| 2002/0166048 A1 * | 11/2002 | Coulier | H04L 63/1441 |
| | | | 713/169 |
| 2007/0195998 A1 | 8/2007 | Le Saint et al. | |
| 2011/0138187 A1 * | 6/2011 | Kaga | G06F 21/32 |
| | | | 713/186 |
| 2011/0145904 A1 * | 6/2011 | Pizano | H04L 63/0861 |
| | | | 726/7 |
| 2017/0364698 A1 * | 12/2017 | Goldfarb | H04L 9/3239 |
| 2019/0197248 A1 * | 6/2019 | O'Hare | H04L 9/3231 |
| 2020/0106610 A1 | 4/2020 | Doddavula et al. | |

FOREIGN PATENT DOCUMENTS

| | | |
|---|---|---|
| CN | 110321757 A | 10/2019 |
| CN | 110651270 A | 1/2020 |
| EP | 2031538 A2 | 3/2009 |

OTHER PUBLICATIONS

International Search Report (w—Engl. Transl) and Written Opinion dated Oct. 28, 2021, from related International Application No. PCT/CN2021/112098 filed Aug. 8, 2021; 8 Pages.

* cited by examiner

440

830

831

This is the new device

This is the previous device

830

Clone sensitive data in phone

This is the new device

832

This is the previous device

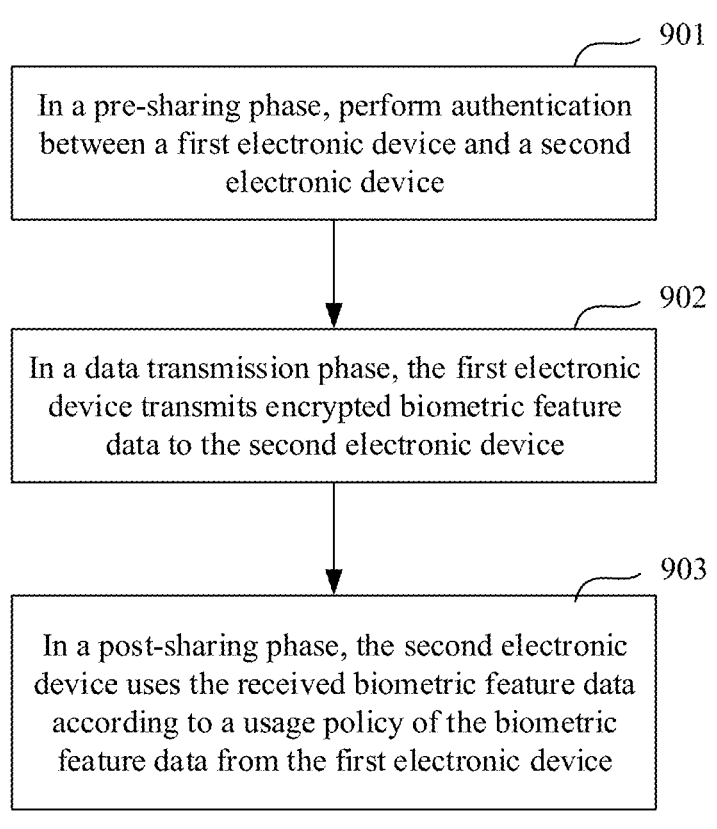

901

In a pre-sharing phase, perform authentication between a first electronic device and a second electronic device

902

In a data transmission phase, the first electronic device transmits encrypted biometric feature data to the second electronic device

903

In a post-sharing phase, the second electronic device uses the received biometric feature data according to a usage policy of the biometric feature data from the first electronic device

FIG. 9

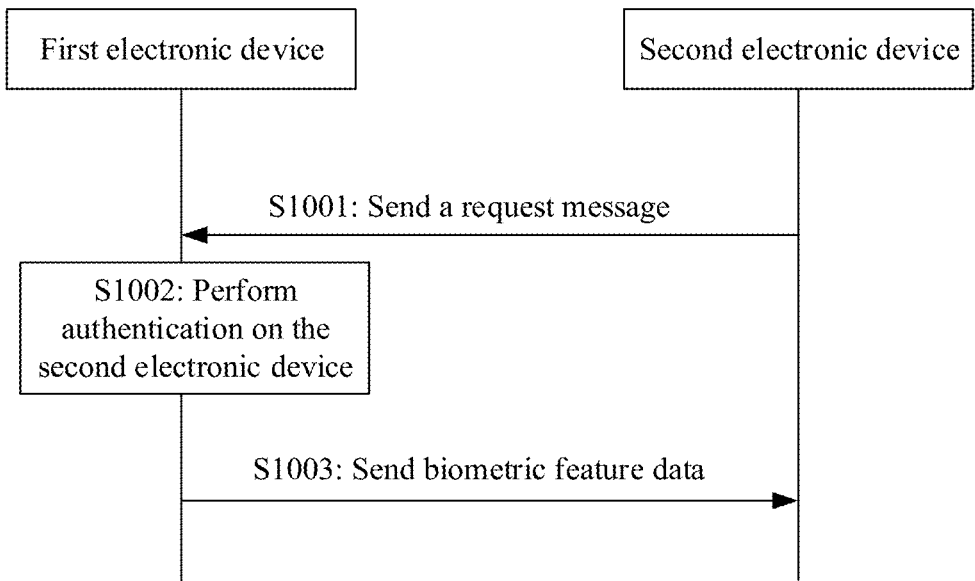

First electronic device

Second electronic device

S1001: Send a request message

S1002: Perform authentication on the second electronic device

S1003: Send biometric feature data

FIG. 10

DATA TRANSMISSION METHOD AND ELECTRONIC DEVICE

CROSS-REFERENCE TO RELATED APPLICATIONS

This application is a National Stage of International Application No. PCT/CN2021/112098, filed on Aug. 11, 2021, which claims priority to Chinese Patent Application No. 202011590388.7, filed on Dec. 29, 2020 and Chinese Patent Application No. 202010942712.0, filed on Sep. 9, 2020. All of the aforementioned applications are hereby incorporated by reference in their entireties.

TECHNICAL FIELD

This application relates to the field of electronic devices, and in particular, to a data transmission method and an electronic device.

BACKGROUND

To ensure data security, a user may perform security settings on a terminal device, for example, unlocking the terminal device by using a lock screen password, a fingerprint, or a face. Therefore, the user may record a template of a biometric feature such as a fingerprint or a face of the user on the terminal device. Laws, regulations, industry specifications, and the like define standards for storage and usage of biometric features due to high sensitivity of biometric feature data. Currently, because existing technologies cannot ensure sharing security of the biometric feature data, the biometric features cannot be transmitted between devices. When the user is to replace a previous device with a new device, the user may repeat recording of the biometric feature of the user on the new device (for example, a mobile phone or a tablet computer). A biometric feature recording process usually requires repeated verifications, and therefore is time-consuming. Although security of the biometric feature data can be ensured currently, user experience is affected. Therefore, a data transmission method is urgently needed to effectively resolve a problem, caused by device replacement, of secure transmission of biometric feature data.

SUMMARY

This application provides a data transmission method and an electronic device, to implement secure transmission of sensitive data that includes biometric feature data.

According to a first aspect, an embodiment of this application provides a data transmission method. The method includes: a first electronic device establishes a connection to a second electronic device. The second electronic device sends a request to the first electronic device, where the request includes a biometric feature input by a user. Then, the first electronic device performs, by using a target biometric feature template, authentication on the biometric feature input by the user, and when the authentication succeeds, determines sensitive data associated with the biometric feature template. Finally, the first electronic device transmits the sensitive data to the second electronic device. According to the method, secure transmission of sensitive data that includes biometric feature data can be implemented.

Based on the foregoing method, in one aspect, because biometric feature authentication is performed on the second electronic device, it can be ensured that the sensitive data will not be transmitted to a device of an unauthorized user, and that the sensitive data is prevented from being intercepted by the unauthorized user, that is, sensitive data (for example, a fingerprint, a face, or another biometric feature) can be migrated from one terminal of a user to another terminal of the user. In another aspect, when the method is applied to a scenario in which a previous device is replaced with a new device, all sensitive data related to a user can be transmitted to the new device via one time of data transmission, thereby implementing "one-click device replacement" and improving user experience.

In a possible embodiment, the first electronic device may further receive a first operation of the user. The first operation is used to select the target biometric feature template and the sensitive data, and establish an association relationship between the target biometric feature template and the sensitive data in response to the first operation. For example, a fingerprint of the user is associated with another biometric feature of the user, or a fingerprint of an administrator is associated with a fingerprint of another group member. Information such as a biometric feature and user's confidential data in the first electronic device can be associated based on the method.

In a possible embodiment, in a process of receiving the sensitive data input by the user, the first electronic device performs authentication on the user by using the target biometric feature template, and when the authentication succeeds, records an association relationship between the sensitive data input by the user and the target biometric feature template. For example, in a process of receiving a face input by the user, the first electronic device performs authentication on the face and associates the face with a fingerprint of the user, thereby implementing association between the face of the user and the fingerprint of the user. Information such as a biometric feature and user's confidential data in the first electronic device can be associated based on the method.

In a possible embodiment, the first electronic device sends check request information to the second electronic device. The second electronic device sends a security proof to the first electronic device after receiving the check request information. The first electronic device performs a security check on the second electronic device according to the security proof. In this way, the first electronic device establishes the connection to the second electronic device after determining that the check succeeds. According to the method, it may be authenticated whether the second electronic device has a trusted execution environment, and the sensitive data is sent to the second electronic device only when it is authenticated that the second electronic device has the trusted execution environment, thereby ensuring security of the sensitive data.

In a possible embodiment, the first electronic device generates a negotiation key by using a device certificate preset in a trusted execution environment of the first electronic device, encrypts the sensitive data by using the negotiation key, and transmits the encrypted sensitive data to the second electronic device. According to this method, encrypted transmission of sensitive data can be implemented, thereby ensuring data transmission security and avoiding leakage.

In a possible embodiment, the first electronic device fragments the sensitive data to generate n data fragments, where a set of the n data fragments constitutes the sensitive data. The first electronic device sends the n data fragments to at least two second electronic devices, where data fragments received by different second electronic devices are different. In this method, the sensitive data fragments are stored in a distributed storage manner, thereby improving cross-device transmission security of sensitive data.

In a possible embodiment, the first electronic device transmits the sensitive data and usage policy information to the second electronic device, where the usage policy information is used to indicate an authorized service, and the authorized service is a service that can be executed by the second electronic device by using the sensitive data. Based on the method, in this way, after the first electronic device sends locally stored sensitive data to the second electronic device, the sensitive data is prevented from being abused in the second electronic device.

In a possible embodiment, the sensitive data includes user's confidential data and/or biometric feature data. The sensitive data in this embodiment of this application may include user's confidential data, the biometric feature data, and the like. User's confidential data may include registration information (such as an account and a password) of the user, a lock screen password of the user, a protection password, and the like. The biometric feature in this embodiment of this application may include one or more of the following: a physical biometric feature, a behavioral biometric feature, and a soft biometric feature. The physical biometric feature may include a face, a fingerprint, an iris, a retina, a deoxyribonucleic acid (DNA), skin, a hand shape, and a vein. The behavioral biometric feature may include a voiceprint, a signature, and a gait. The soft biometric feature may include a gender, an age, a height, a weight, and the like.

In a possible embodiment, the second electronic device and the first electronic device are connected to a same local area network, and/or the second electronic device and the first electronic device are pre-bound to a same user account. In this way, it can be ensured that both the first electronic device and the second electronic device are trusted devices.

According to a second aspect, an embodiment of this application provides a data transmission method. The method includes: a second electronic device establishes a connection to a first electronic device. The second electronic device sends a request to the first electronic device, where the request includes a biometric feature input by a user. Then, the second electronic device receives sensitive data from the first electronic device, where the sensitive data is determined according to the biometric feature.

Based on the foregoing method, in one aspect, because biometric feature authentication is performed on the second electronic device, it can be ensured that the sensitive data cannot be transmitted to a device of an unauthorized user, and thus the sensitive data is prevented from being intercepted by the unauthorized user, that is, sensitive data can be migrated from one terminal of a user to another terminal of the user. In another aspect, when the method is applied to a scenario in which a previous device is replaced with a new device, all sensitive data related to a user can be transmitted to the new device via one time of data transmission, thereby implementing "one-click device replacement" and improving user experience.

In a possible embodiment, the second electronic device receives check request information from the first electronic device, sends a security proof to the first electronic device, and establishes the connection to the first electronic device. According to this method, it can be ensured that the second electronic device establishes a secure connection to the first electronic device in a case that the second electronic device has a trusted execution environment.

In a possible embodiment, the second electronic device generates a negotiation key by using a device certificate preset in a trusted execution environment of the second electronic device, receives encrypted sensitive data from the first electronic device, and performs decryption by using the negotiation key, to obtain the sensitive data. In this method, security of the sensitive data can be further ensured via encrypted transmission of the sensitive data.

In a possible embodiment, the second electronic device receives usage policy information from the first electronic device, where the usage policy information is used to indicate an authorized service, and the authorized service is a service that can be executed by the second electronic device by using the sensitive data. According to this method, it can be ensured that the sensitive data is not abused by the second electronic device.

In a possible embodiment, the sensitive data includes user's confidential data and/or biometric feature data. The sensitive data in this embodiment of this application may include user's confidential data, the biometric feature data, and the like. User's confidential data may include registration information (such as an account and a password) of the user, a lock screen password of the user, a protection password, and the like. The biometric feature in this embodiment of this application may include one or more of the following: a physical biometric feature, a behavioral biometric feature, and a soft biometric feature. The physical biometric feature may include a face, a fingerprint, an iris, a retina, a deoxyribonucleic acid (DNA), skin, a hand shape, and a vein. The behavioral biometric feature may include a voiceprint, a signature, and a gait. The soft biometric feature may include a gender, an age, a height, a weight, and the like.

In a possible embodiment, the second electronic device and the first electronic device are connected to a same local area network, and/or the second electronic device and the first electronic device are pre-bound to a same user account. In this way, it can be ensured that both the first electronic device and the second electronic device are trusted devices.

According to a third aspect, an embodiment of this application provides a first electronic device, including a processor and a memory, where the memory is configured to store one or more computer programs, and when the one or more computer programs stored in the memory are executed by the processor, the first electronic device is enabled to implement the method according to any possible embodiment in the first aspect.

According to a fourth aspect, an embodiment of this application provides a second electronic device, including a processor and a memory, where the memory is configured to store one or more computer programs, and when the one or more computer programs stored in the memory are executed by the processor, the second electronic device is enabled to implement the method according to any possible embodiment in the second aspect.

According to a fifth aspect, an embodiment of this application further provides an apparatus. The apparatus includes modules/units that perform the method according to any possible embodiment in the first aspect. These modules/units may be implemented by hardware, or may be implemented by hardware by executing corresponding software.

According to a sixth aspect, an embodiment of this application further provides an apparatus. The apparatus includes modules/units that perform the method according to any possible embodiment in the second aspect. These modules/units may be implemented by hardware, or may be implemented by hardware by executing corresponding software.

According to a seventh aspect, an embodiment of this application further provides a computer-readable storage medium. The computer-readable storage medium includes a computer program. When the computer program runs on an electronic device, the electronic device is enabled to perform the method according to any possible embodiment in any one of the foregoing aspects.

According to an eighth aspect, an embodiment of this application further provides a computer program product. When the computer program product runs on an electronic device, the electronic device is enabled to perform the method according to any possible embodiment in any one of the foregoing aspects.

According to a ninth aspect, an embodiment of this application further provides a chip or a chip system. The chip or the chip system is coupled to a memory, and is configured to execute a computer program stored in the memory, to perform the method according to any possible embodiment in any one of the foregoing aspects.

For technical effects that can be achieved by the embodiments in any one of the third aspect to the ninth aspect, reference may be made to descriptions of technical effects that can be achieved by the embodiments in the first aspect or the second aspect. Details are not described herein again.

BRIEF DESCRIPTION OF DRAWINGS

FIG. 9 is a schematic diagram of a data transmission method according to an embodiment of this application;

FIG. 10 is a schematic diagram of another data transmission method according to an embodiment of this application;

DESCRIPTION OF EMBODIMENTS

Figure 1A:
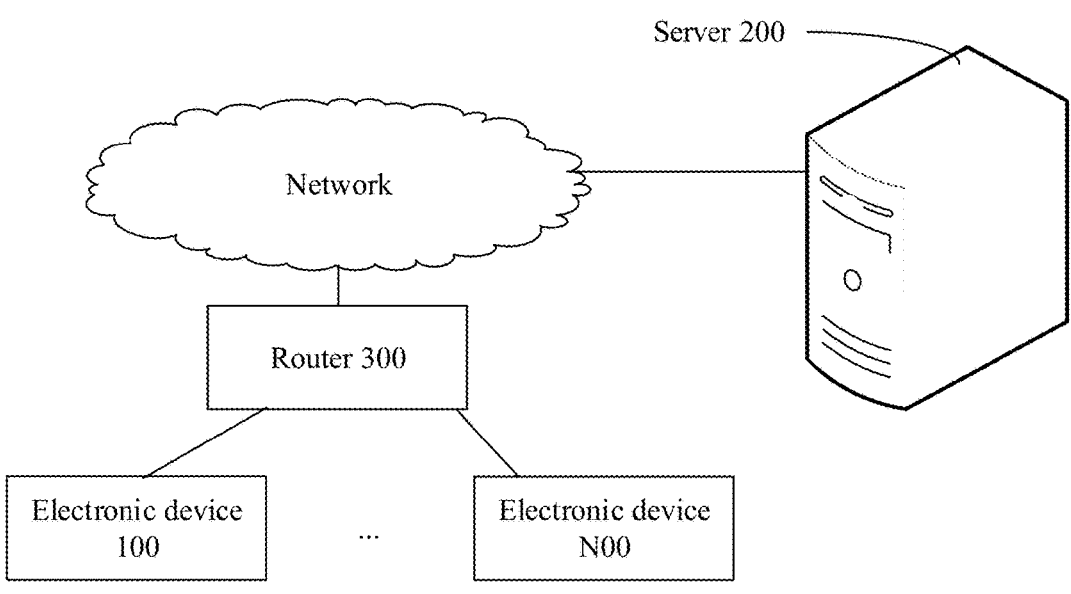
FIG. 1A and FIG. 1B are schematic diagrams of a communications system according to an embodiment of this application.

The following describes the technical solutions in embodiments of this application with reference to the accompanying drawings in embodiments of this application. In the descriptions of embodiments of this application, terms used in the following embodiments are merely intended to describe purposes of example embodiments, but are not intended to limit this application. The terms "one", "a", "the", "the foregoing", "this", and "the one" of singular forms used in this specification and the appended claims of this application are also intended to include expressions such as "one or more", unless otherwise specified in the context clearly. It should be further understood that in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily refer to a same embodiment. Instead, the statements mean "one or more but not all of embodiments", unless otherwise specifically emphasized in another manner. The terms "include", "comprise", and "have", and variants thereof all mean "include but are not limited to", unless otherwise specifically emphasized in another manner. The term "connection" includes a direct connection and an indirect connection, unless otherwise stated. "First" and "second" are merely intended for a purpose of description, and shall not be understood as an indication or implication of relative importance or implicit indication of the number of indicated technical features.

In embodiments of this application, the word "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the word "example", "for example", or the like is intended to present a relative concept in a specific manner.

Because security of sensitive data cannot be effectively protected, current cross-device data sharing is generally limited to sharing of data that is irrelevant to sensitive data of a user. Currently, security of biometric feature data cannot be ensured during sharing due to high sensitivity of the biometric feature data. As a result, biometric feature data cannot be transmitted between devices. When replacing a previous device with a new device, a user has to repeat recording of a biometric feature on the new device (for example, a mobile phone or a tablet computer). This brings inconvenience to user experience. In addition, a user usually has a plurality of terminals. Because secure sharing of a biometric feature cannot be implemented between devices, the user has to repeat recording of the biometric feature on each of the terminals. This brings inconvenience to the user. Some terminals may be restricted by hardware conditions, and thus cannot collect some biometric features of a user. For example, a smart speaker cannot collect a facial feature of a user due to lack of a camera. As a result, the smart speaker does not have a facial feature-based security service function, and a manner of performing identity authentication on a user by the smart speaker is limited. It can be learned that the foregoing problem can be properly resolved if secure transmission of sensitive data between devices can be implemented.

Therefore, an embodiment of this application provides a data transmission method. In this method, it can be ensured that sensitive data cannot be transmitted to a device of an unauthorized user in a transmission process of the sensitive data, which prevents the sensitive data from being intercepted by the unauthorized user, that is, sensitive data can be migrated from one terminal of a user to another terminal of the user. In addition, when a previous device is replaced with a new device, all sensitive data related to a user can be transmitted to the new device via one time of data transmission, thereby implementing "one-click device replacement" and improving user experience.

It should be noted that the sensitive data in this embodiment of this application may include user's confidential data, biometric feature data, and the like. User's confidential data may include registration information (such as an account and a password) of the user, a lock screen password of the user, a protection password, data of a safe, content of a memo, a photo of the user, and the like. The biometric feature in this embodiment of this application may include one or more of the following: a physical biometric feature, a behavioral biometric feature, and a soft biometric feature. The physical biometric feature may include a face, a fingerprint, an iris, a retina, a DNA, skin, a hand shape, and a vein. The behavioral biometric feature may include a voiceprint, a signature, and a gait. The soft biometric feature may include a gender, an age, a height, a weight, and the like.

The data transmission method provided in this embodiment of this application may be applicable to data transmission in a near-field networking scenario in which a plurality of electronic devices access a same network. FIG. 1A illustrates a schematic diagram of a communications system architecture according to an embodiment of this application. As shown in FIG. 1A, the communications system architecture may include one or more electronic devices, such as an electronic device 100 to an electronic device N00 shown in FIG. 1A, where N is a positive integer greater than or equal to 2. The system architecture may further include a server 200 deployed on a cloud. The system architecture may further include a router 300.

The electronic devices 100 may be connected to each other in a wireless manner to complete near-field networking. Specifically, the wireless connection manner includes but is not limited to a connection based on a universal serial bus (USB) data line, Bluetooth, wireless fidelity (Wi-Fi), Wi-Fi direct connection (Wi-Fi Direct), a near-field communication (NFC) technology, a fifth-generation mobile communications system (5G), a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) system, or the like.

Figure 1B:
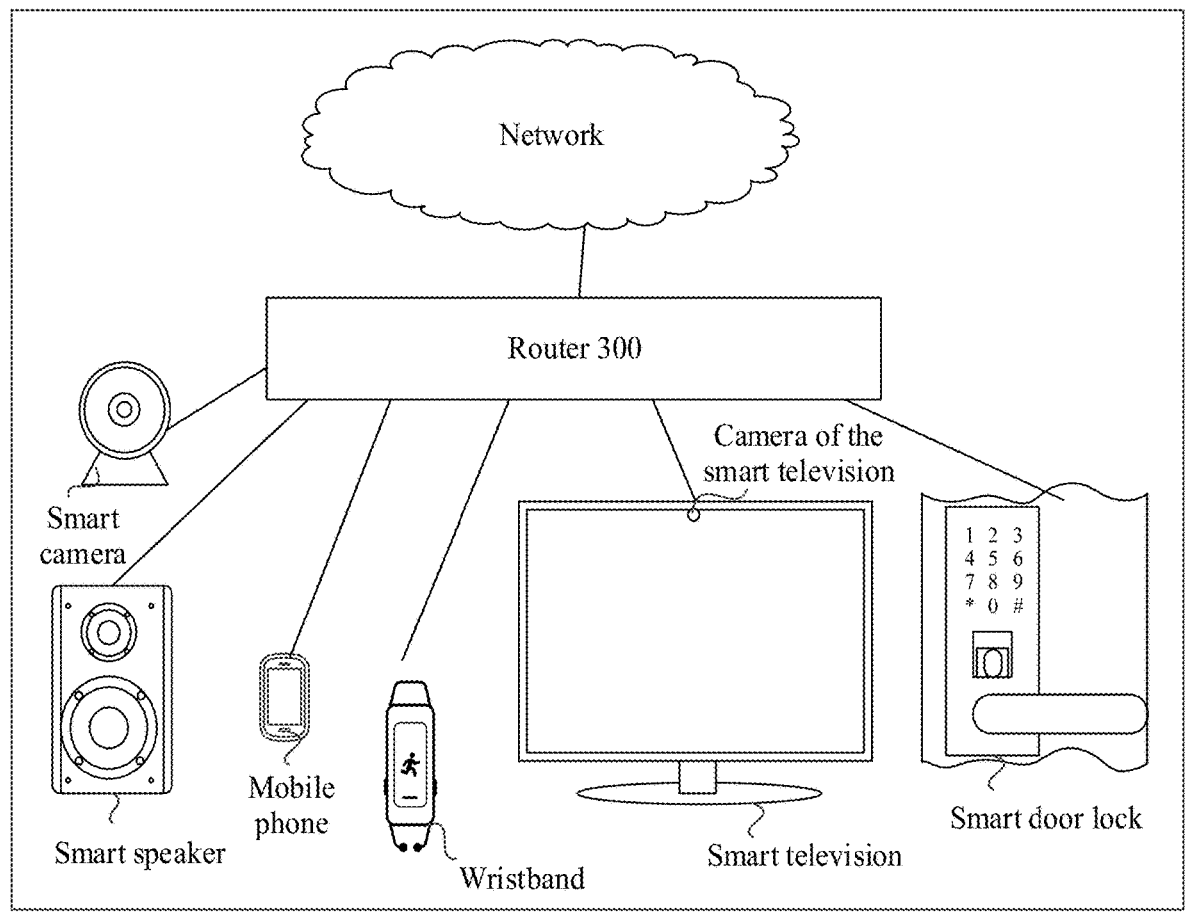

The data transmission method provided in this embodiment of this application may be applied to an electronic device. In some embodiments, the electronic device may be a portable terminal that includes functions such as a personal digital assistant function and/or a music player function, for example, a mobile phone, a tablet computer, a wearable device (for example, a smartwatch) with a wireless communication function, or a vehicle-mounted device. An example embodiment of the portable terminal includes but is not limited to a portable terminal with a Harmony OS®, iOS®, Android®, Microsoft®, or another operating system. Alternatively, the portable terminal may be, for example, a laptop computer with a touch-sensitive surface (for example, a touch panel). It should be further understood that in some other embodiments, the foregoing terminal may alternatively be a desktop computer with a touch-sensitive surface (for example, a touch panel). The electronic device 100 may alternatively be a smart home device in a smart home system. FIG. 1B illustrates an electronic device 100 that may be a smart home device in a smart home system. The smart home device in the smart home system includes a smart camera, a smart speaker, a smart television, a smart door lock, a mobile phone, a wristband, and the like.

Figure 2:
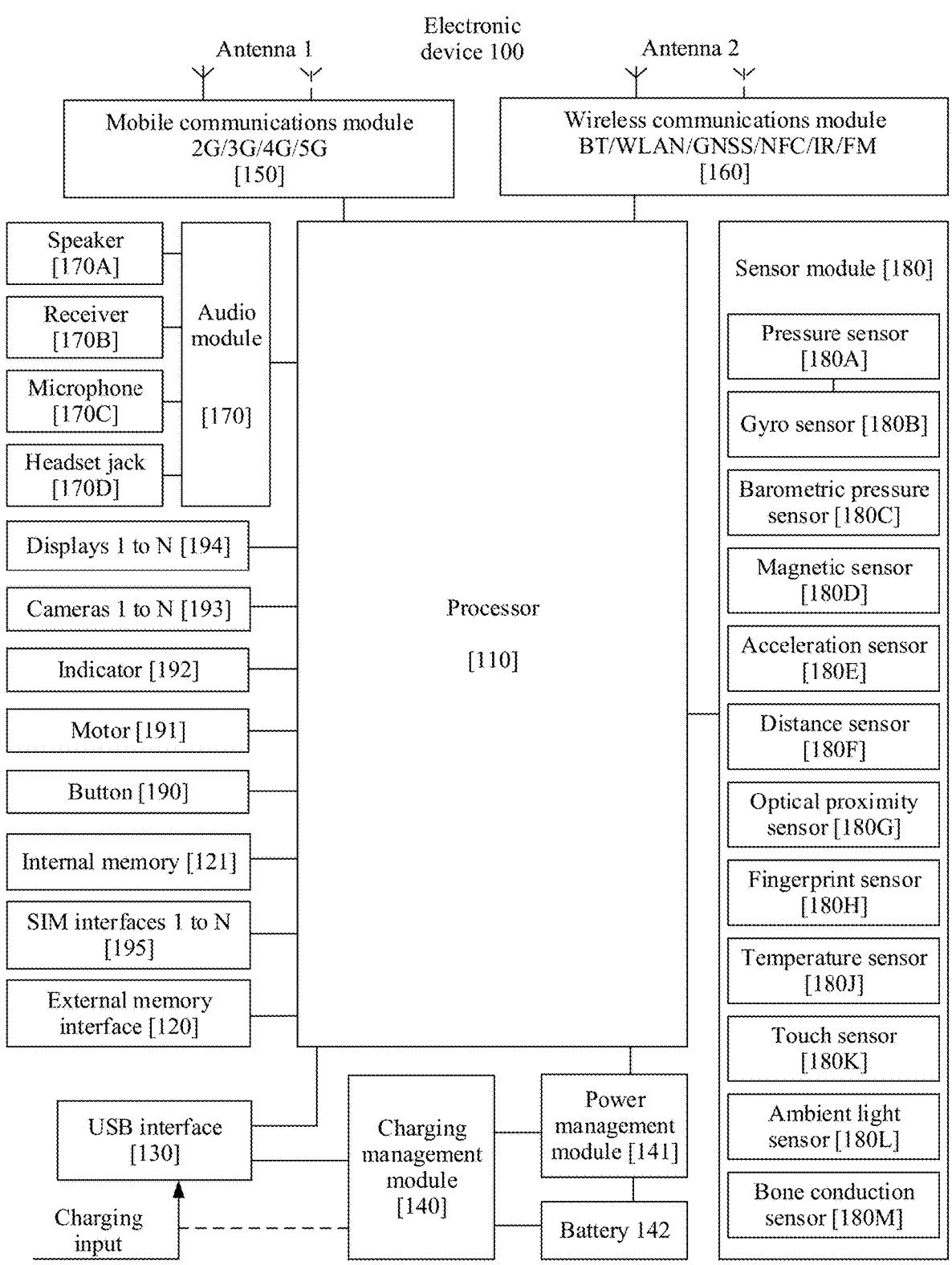
FIG. 2 is a schematic structural diagram of an electronic device according to an embodiment of this application.

FIG. 2 is a schematic structural diagram of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined or split, or there may be a different component arrangement. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The electronic device 100 may implement a display function by using the GPU, the display 194, the application processor, and the like. The GPU is a microprocessor for image processing, is connected to the display 194 and the application processor, and is configured to perform mathematical and geometric calculations for graphics rendering. The processor 110 may include one or more GPUs that execute program instructions to generate or change display information.

The electronic device 100 may implement a shooting function by using the ISP, the camera 193, the video codec, the GPU, the display 194, the application processor, and the like.

The SIM card interface 195 is configured to connect a SIM card. The SIM card may be inserted into the SIM card interface 195 or withdrawn from the SIM card interface 195, thereby getting in contact with or being separated from the electronic device 100. The electronic device 100 may support one or N SIM card interfaces, where N is a positive integer greater than 1. The SIM card interface 195 may support a nano-SIM card, a micro-SIM card, a SIM card, or the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with an external storage card. The electronic device 100 interacts with a network via a SIM card, thereby implementing functions such as making/answering a call and data communication. In some embodiments, the electronic device 100 uses an eSIM, namely, an embedded SIM card.

A wireless communication function of the electronic device 100 may be implemented by using the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the electronic device 100 may be configured to cover one or more communications bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution applied to the electronic device 100 for wireless communication such as 2G/3G/4G/5G. The mobile communications module 150 may include at least one filter, a switch, a power amplifier, a low-noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert, through the antenna 1, an amplified signal into an electromagnetic wave for radiation. In some embodiments, at least some functional modules in the mobile communications module 150 may be disposed in the processor 110. In some embodiments, at least some functional modules of the mobile communications module 150 may be disposed in the same device as at least some modules of the processor 110.

The wireless communications module 160 may provide wireless communication solutions including a wireless local area network (WLAN) (for example, a wireless fidelity (Wi-Fi) network), Bluetooth (BT), a global navigation satellite system (GNSS), frequency modulation (FM), a near field communication (NFC) technology, an infrared radiation (IR) technology, and the like, applied to the electronic device 100. The wireless communications module 160 may be one or more devices integrating at least one communications processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert, through the antenna 2, a frequency-modulated and amplified signal into an electromagnetic wave for radiation.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communication technology. The wireless communication technology may include global system for mobile communications (GSM), general packet radio service (GPRS), code division multiple access (CDMA), wideband code division multiple access (WCDMA), time division-synchronous code division multiple access (TD-SCDMA), long term evolution (LTE), BT, GNSS, WLAN, NFC, FM, IR, and/or the like.

It may be understood that the components shown in FIG. 2 do not constitute a specific limitation on the electronic device 100. The electronic device 100 may further include more or fewer components than those shown in the figure, or some components may be combined or split, or there may be a different component arrangement. In addition, a combination/connection relationship between the components in FIG. 2 may also be adjusted and modified.

A software system of the electronic device may use a layered architecture, an event-driven architecture, a microkernel architecture, a microservice architecture, or a cloud architecture. In this embodiment of this application, a layered architecture is used as an example. The layered architecture may include a Harmony operating system (OS)®, iOS®, Android®, Microsoft®, or another operating system. The data transmission method provided in the embodiments of this application may be applicable to a terminal integrating the foregoing operating system.

FIG. 2 shows a hardware structure of an electronic device to which embodiments of this application are applicable. The following describes, with reference to example embodiments, a data transmission method provided in embodiments of this application. For ease of distinguishing, in the following embodiments, a device for sending sensitive data is referred to as a first electronic device, and a device for receiving the sensitive data is referred to as a second electronic device.

Embodiment 1

Figure 3:
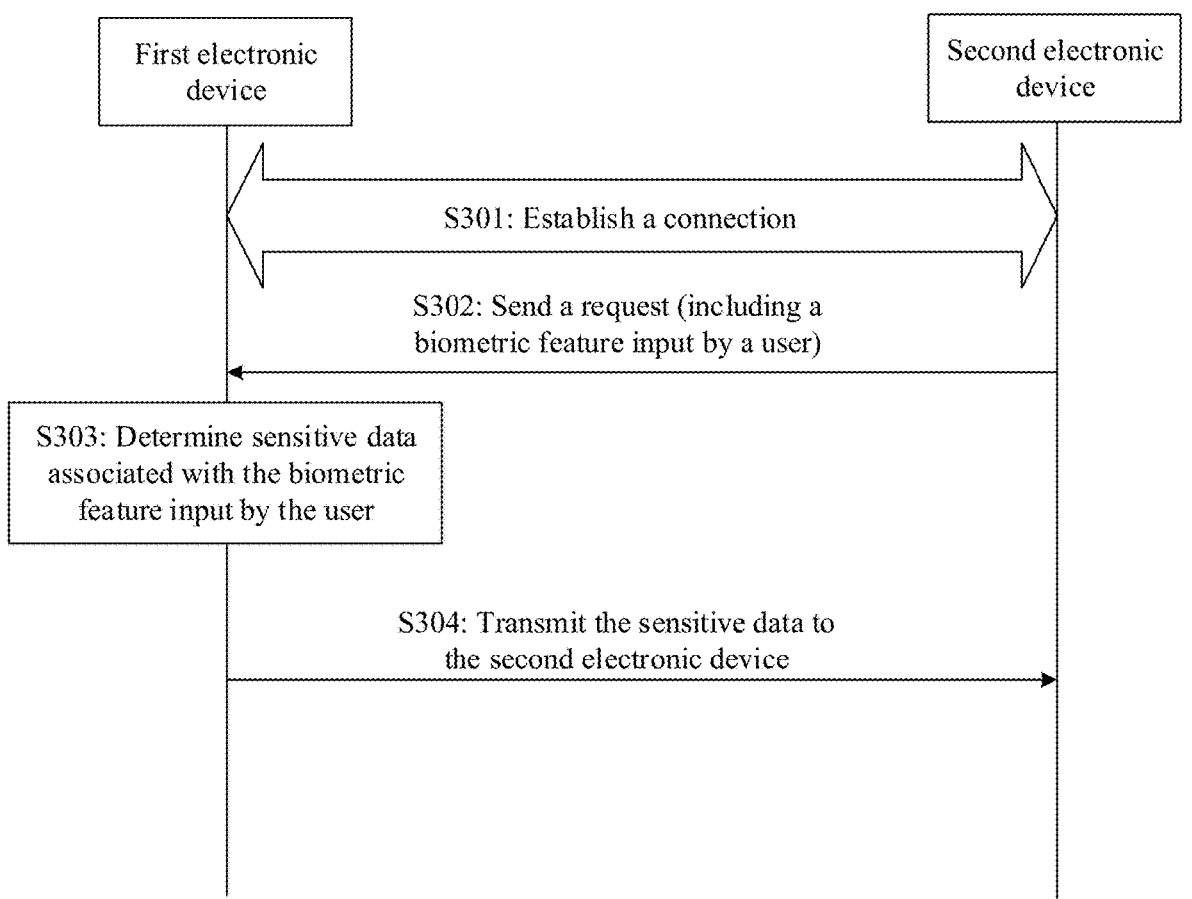
FIG. 3 is a schematic diagram of a data transmission method according to an embodiment of this application.

FIG. 3 is a schematic diagram of a data transmission method according to an embodiment of this application. The method mainly includes the following operations.

Operation 301: A first electronic device establishes a connection to a second electronic device.

In this operation, a manner of establishing the connection to the second electronic device by the first electronic device may include but is not limited to the following manners.

Manner A: The first electronic device uses a device selected by a user as a trusted device, and establishes the connection to the second electronic device. In other words, the user performs a binding operation on the first electronic device, to establish a binding relationship between the first electronic device and the second electronic device. For example, the user may establish the binding relationship between the first electronic device and the second electronic device by scanning a quick response code or accessing a same WLAN hotspot.

Manner B: The first electronic device may perform authentication on the second electronic device when receiving a sensitive data sharing request of the second electronic device, determine, after the authentication succeeds, that the second electronic device is a trusted device, and establish the connection to the second electronic device.

For example, after the first electronic device establishes a network connection to the second electronic device, the user inputs a fingerprint on the second electronic device. Then, the second electronic device sends, to the first electronic device, the sensitive data sharing request that includes the fingerprint. After receiving the fingerprint from the second electronic device, the first electronic device matches the received fingerprint against a fingerprint template of an administrator, and determines, if the matching succeeds, that the authentication performed on the second electronic device succeeds.

Manner C: The first electronic device queries whether the second electronic device has a trusted environment, determines, if the second electronic device has the trusted environment, that the second electronic device is a trusted device, and establishes the connection to the second electronic device.

Manner D: When querying that the second electronic device has a trusted environment and the trusted environment meets a specified security level, the first electronic device determines that the second electronic device is a trusted device, and establishes the connection to the second electronic device.

In this embodiment of this application, the first electronic device and the second electronic device may alternatively establish a secure connection in a combination manner of the foregoing several manners. Examples are not listed herein one by one.

Operation 302: The second electronic device sends a request to the first electronic device, where the request includes a biometric feature input by a user.

In a possible embodiment, the second electronic device receives the biometric feature input by the user, and adds, to a sensitive data obtaining request that is to be sent to the first electronic device, the biometric feature input by the user. Alternatively, the second electronic device first sends a sensitive data obtaining request to the first electronic device, receives an authentication request from the first electronic device, receives the biometric feature input by the user, and sends, to the first electronic device, the biometric feature input by the user.

Operation 303: The first electronic device determines sensitive data associated with the biometric feature input by the user.

In a possible embodiment, the second electronic device receives the biometric feature input by the user, and sends, to the first electronic device, an authentication request that includes the biometric feature input by the user. The second electronic device receives the authentication request, performs authentication on the biometric feature that is input by the user and that is in the authentication request, and determines, when the authentication succeeds, the sensitive data associated with the biometric feature input by the user. For example, the first electronic device receives an authentication request from the second electronic device, where the authentication request includes a fingerprint input by the user. The first electronic device matches the fingerprint against a biometric feature of an administrator in the device, and determines, when the matching succeeds, that sensitive data associated with a fingerprint of the administrator is to-be-transmitted sensitive data. For example, the sensitive data associated with the fingerprint of the administrator includes sensitive information such as the fingerprint of the administrator, a fingerprint of a group member, and a lock screen password.

It should be understood that the first electronic device should associate a plurality of pieces of sensitive data in the device in advance. In some embodiments, the first electronic device may associate each piece of sensitive data in the first electronic device in manners that include but are not limited to the following manners.

Manner 1: The first electronic device receives an operation of the user, that is, the user selects, from a sensitive data list displayed by the first electronic device, sensitive data that is to be transmitted to the second electronic device. Then, the first electronic device associates, according to content selected by the user, the sensitive data selected by the user with a key biometric feature (for example, the key biometric feature is the fingerprint of the administrator).

Figure 4A:
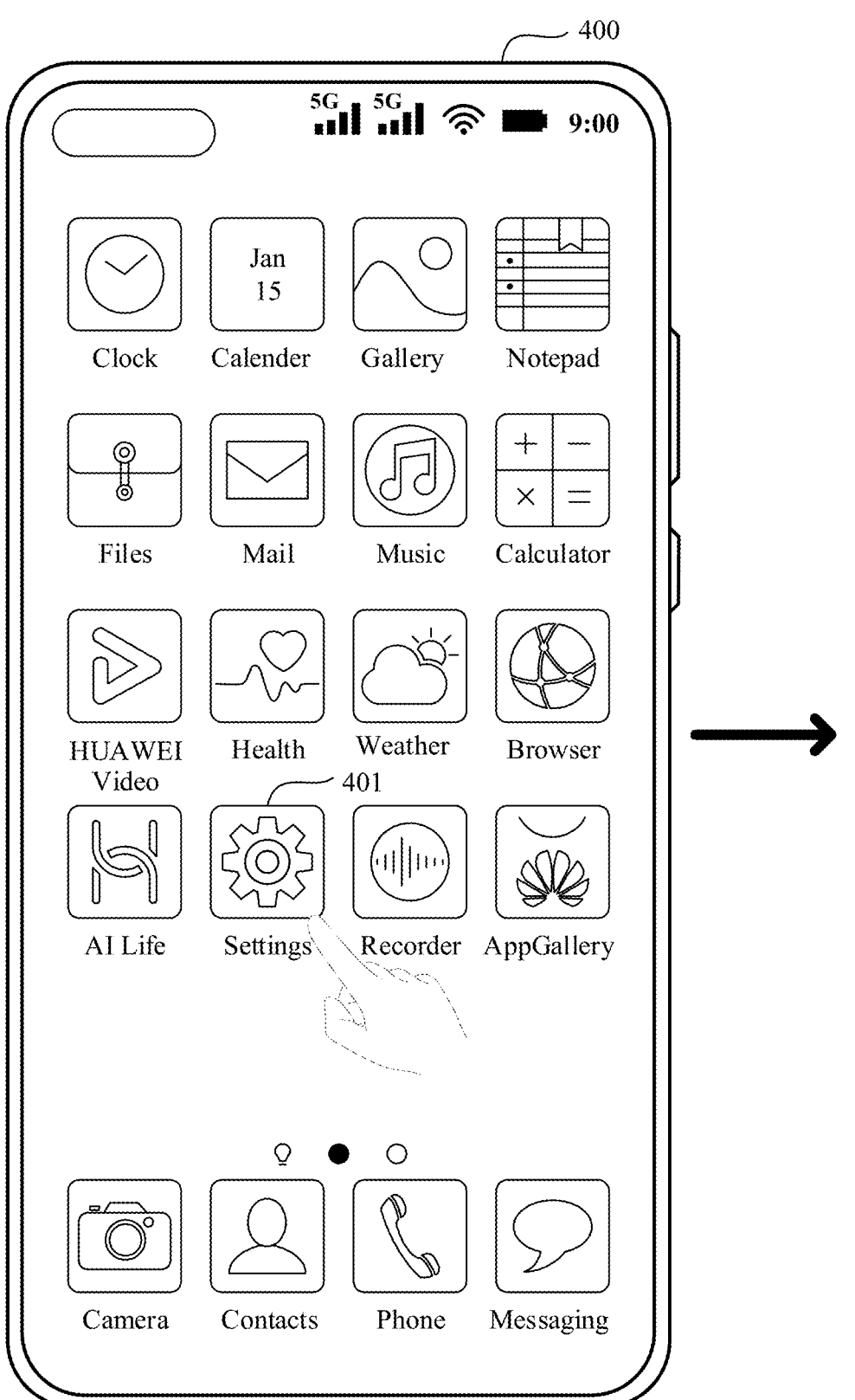
FIG. 4A(a) to FIG. 4A(d) are a schematic diagram of a group of interfaces according to an embodiment of this application.
Figure 4A:
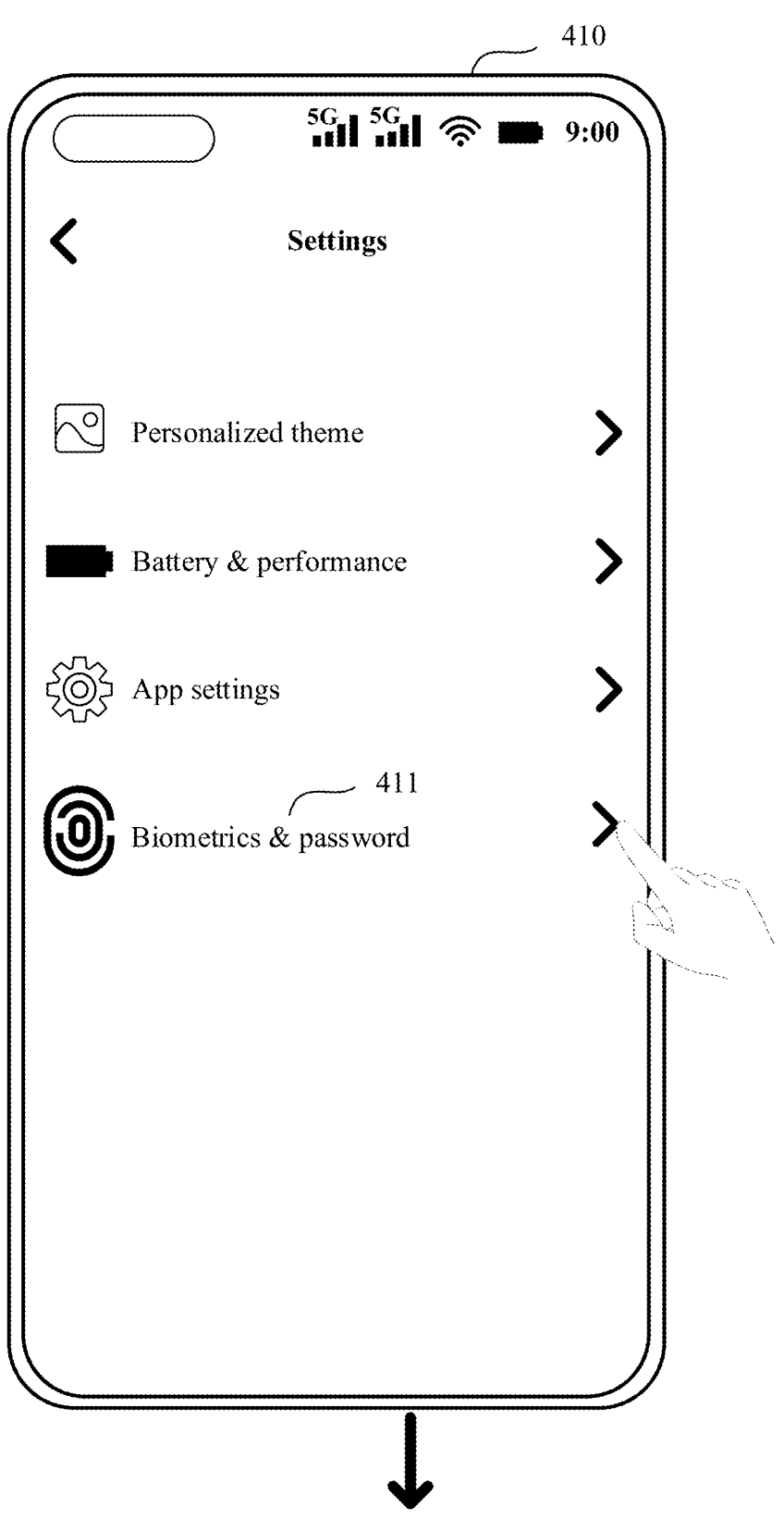
Figure 4A:
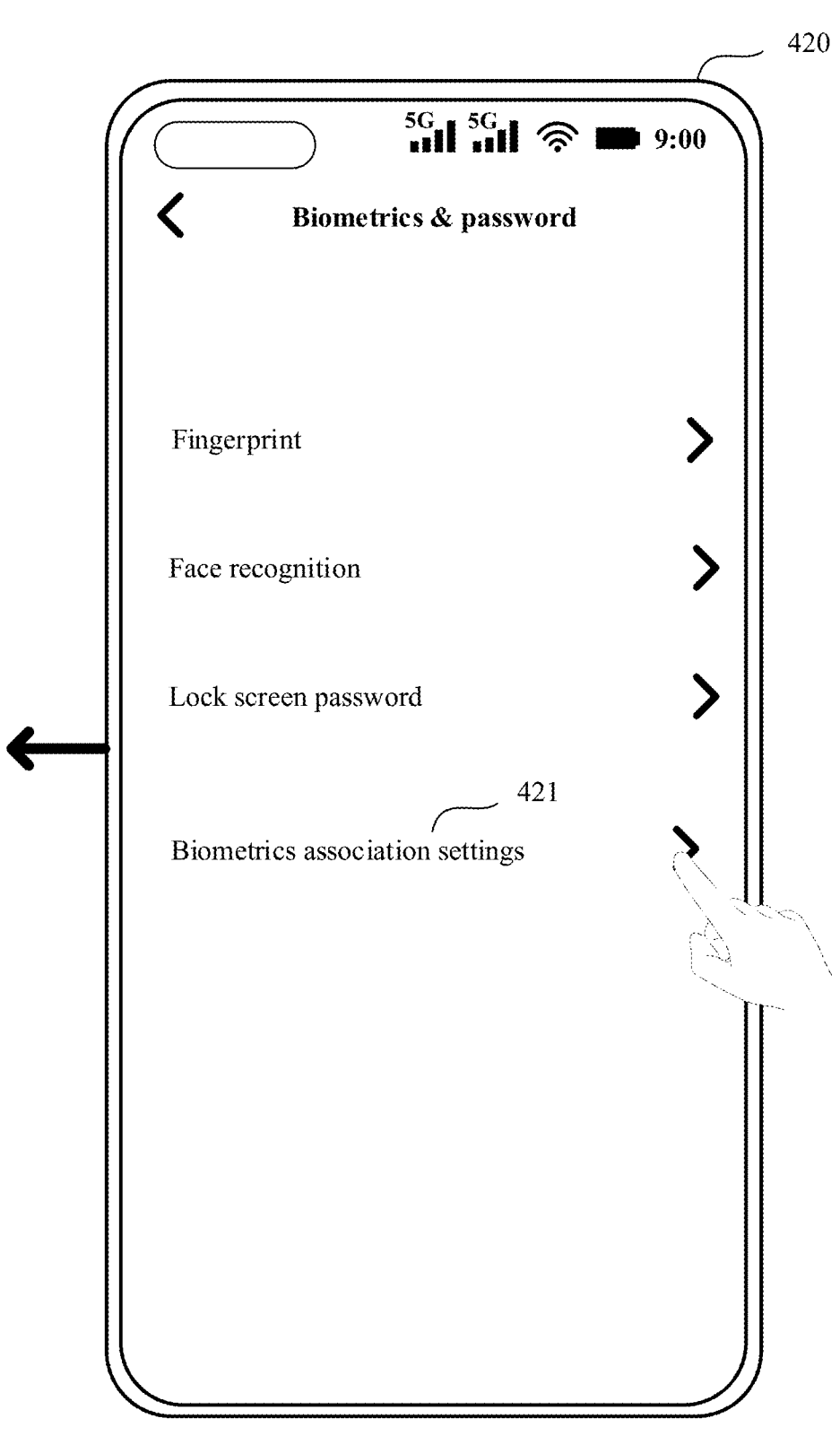
Figure 4A:
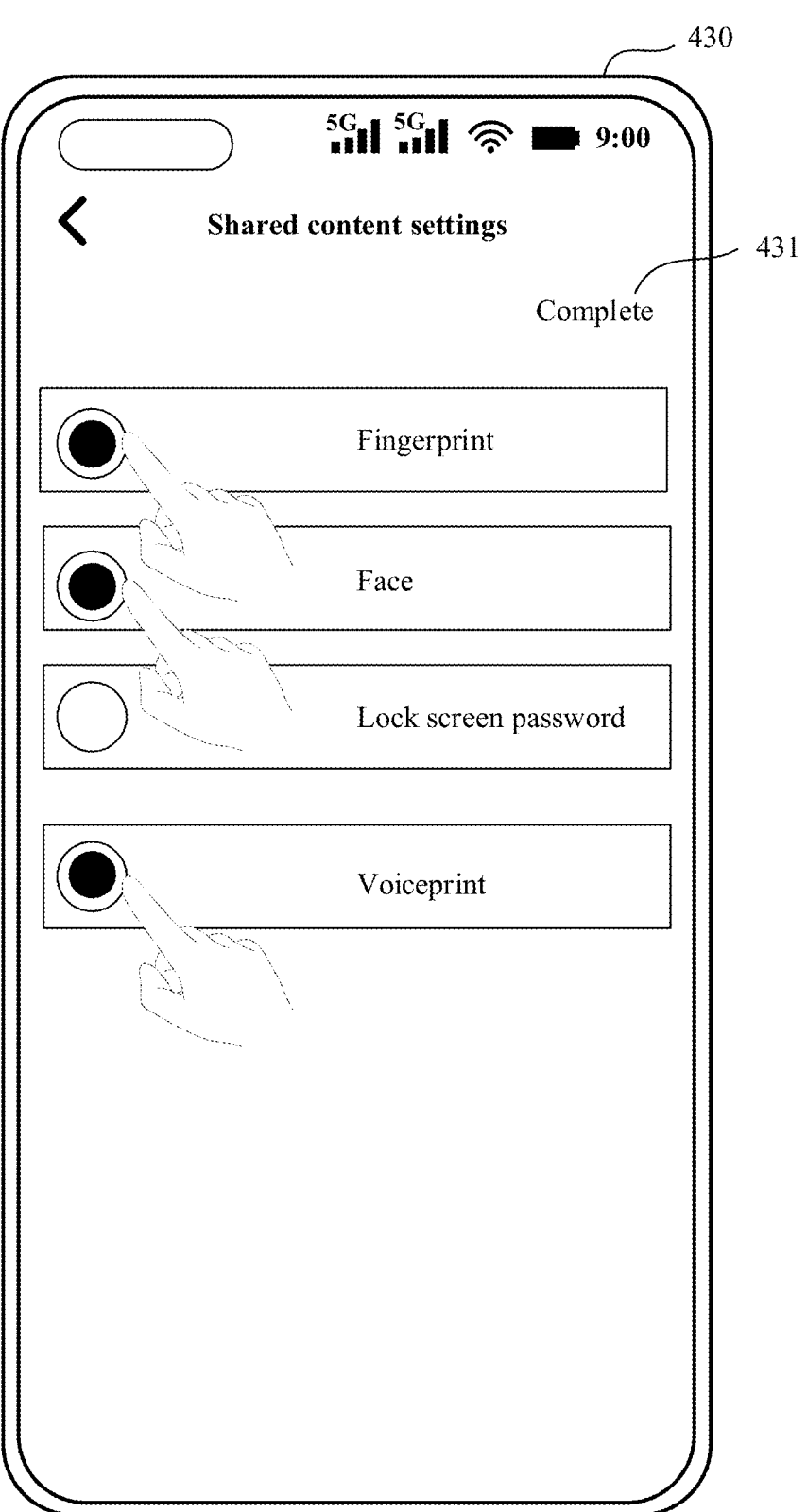

For example, referring to FIG. 4A(a), a user interface 400 is a desktop of a mobile phone of the user. The desktop of the mobile phone of the user includes applications such as Phone, Gallery, WeChat®, Album, Weather, Calendar, and Settings. After detecting an operation performed by the user on the "Settings" control 401, the mobile phone may display a user interface 410 shown in FIG. 4A(b). Referring to FIG. 4A(b), the user interface 410 is a display interface for setting applications. The user interface 410 displays a plurality of setting items, including a "Biometrics & password" control 411. After detecting an operation performed by the user on the "Biometrics & password" control 411, the mobile phone may display a user interface 420 shown in FIG. 4A(c). The user interface 420 is a display interface of a setting item: "Biometrics & password". The user interface 420 includes a "Biometrics association settings" control 421. After detecting an operation performed by the user on the "Biometrics association settings" control 421, the mobile phone may display a user interface 430 shown in FIG. 4A(d). The user selects the fingerprint of the administrator, a face of the user, and a voiceprint of the user as to-be-transmitted sensitive data. After detecting that the user performs an operation on the "Complete" control 431, the mobile phone associates the fingerprint of the administrator with the face of the user and the voiceprint of the user. It should be noted that, in this example, the face and the voiceprint associated with the fingerprint of the administrator may be a face and a voiceprint of the administrator, or may include a face or a voiceprint of another user. This is not limited in this embodiment.

Manner 2: The user may associate, during use of the first electronic device, a biometric feature currently stored in the device.

For example, the administrator may associate sensitive data of the first electronic device at intervals, for example, associate a biometric feature of each group member with the fingerprint of the administrator. For another example, when using a tablet device, a parent associates a biometric feature such as a fingerprint and a face of a child with a fingerprint of the parent. For an interface operation example of an example association method, refer to the foregoing examples shown in FIG. 4A. No more examples are provided herein.

Manner 3: In a process of recording a biometric feature, the first electronic device performs authentication on the user by using an existing key biometric feature, and associates, when the authentication succeeds, the newly recorded biometric feature with the key biometric feature, or skips the association when the authentication fails. In this way, a biometric feature in the first electronic device can be automatically associated in a recording phase.

Figure 4B:
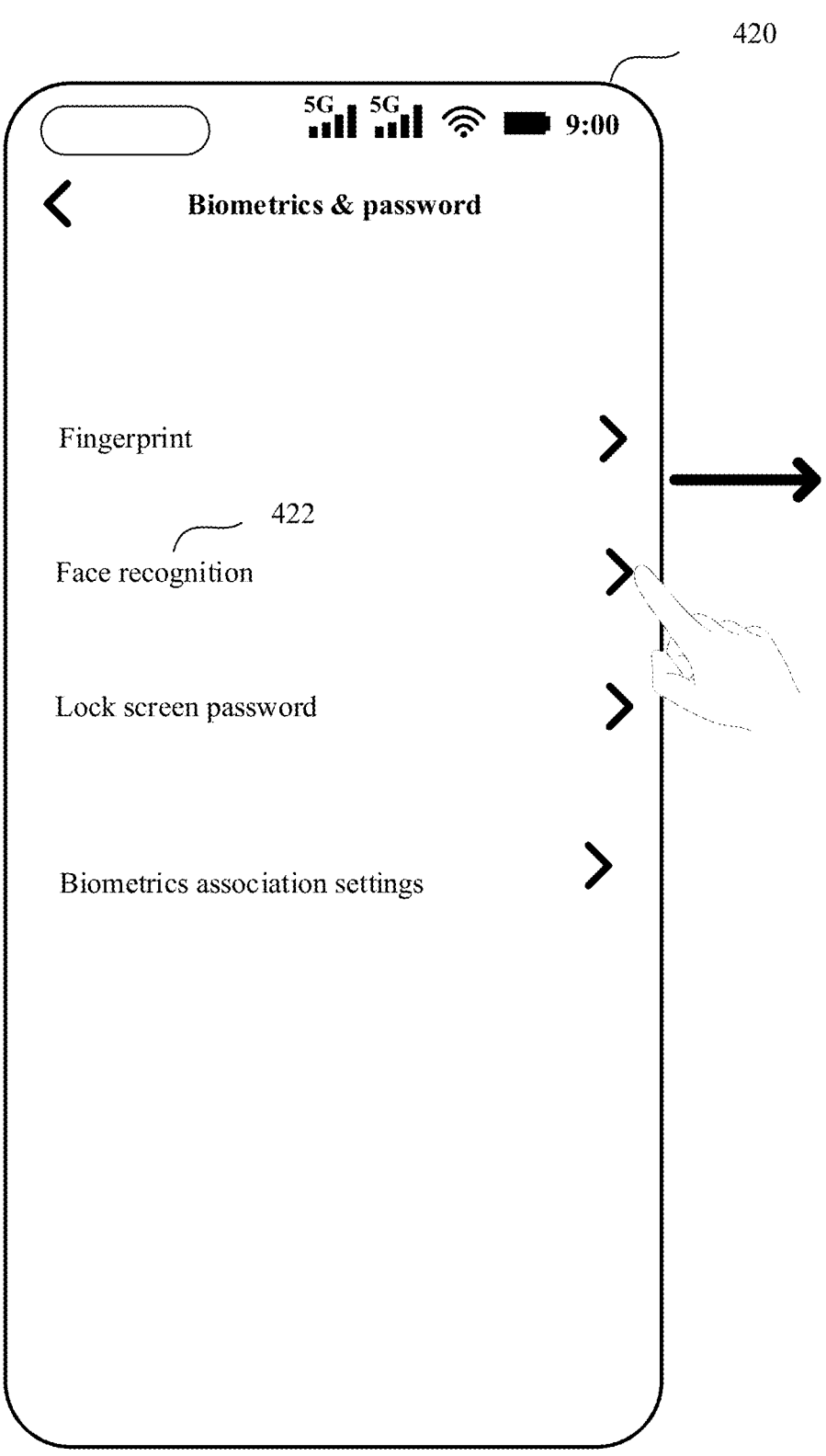
FIG. 4B(a) to FIG. 4B(c) are a schematic diagram of another group of interfaces according to an embodiment of this application.
Figure 4B:
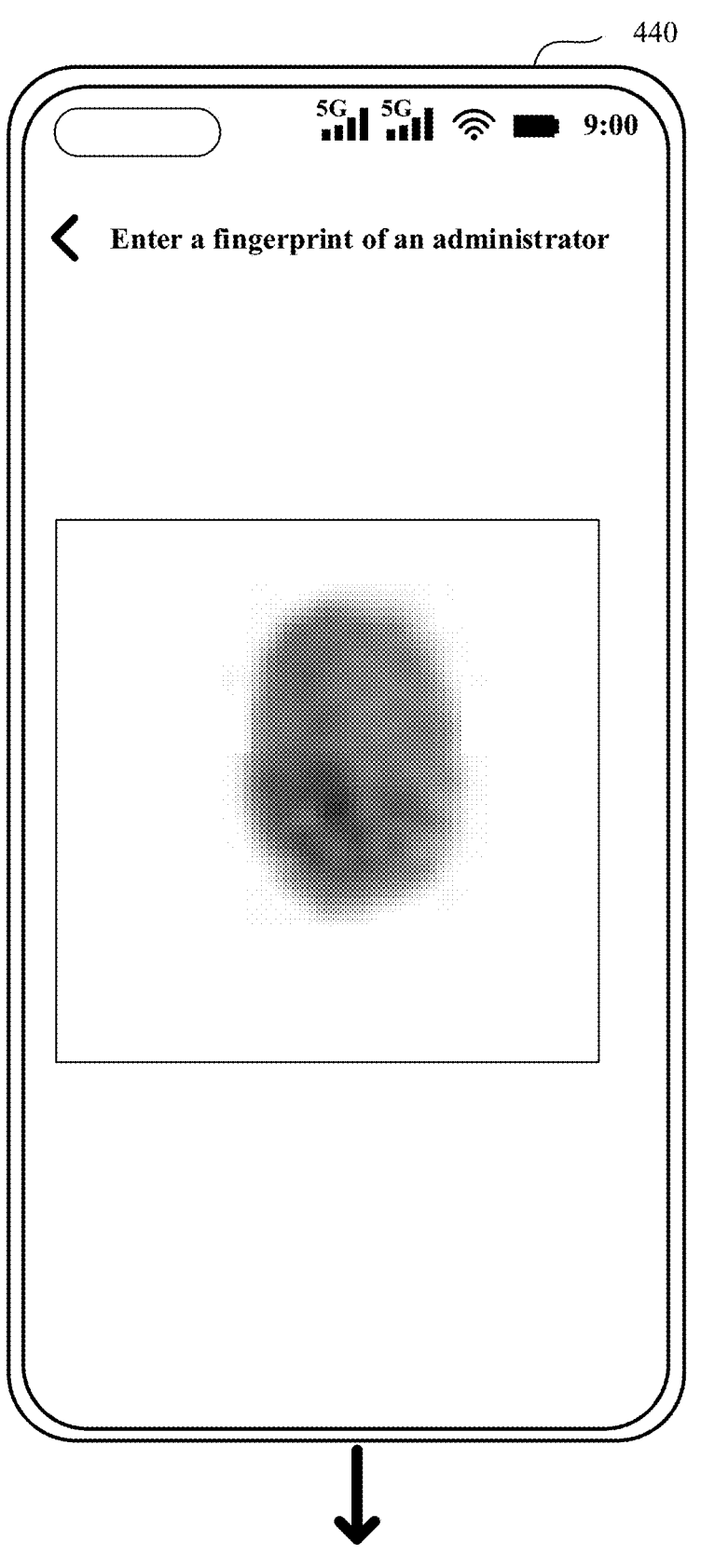
Figure 4B:
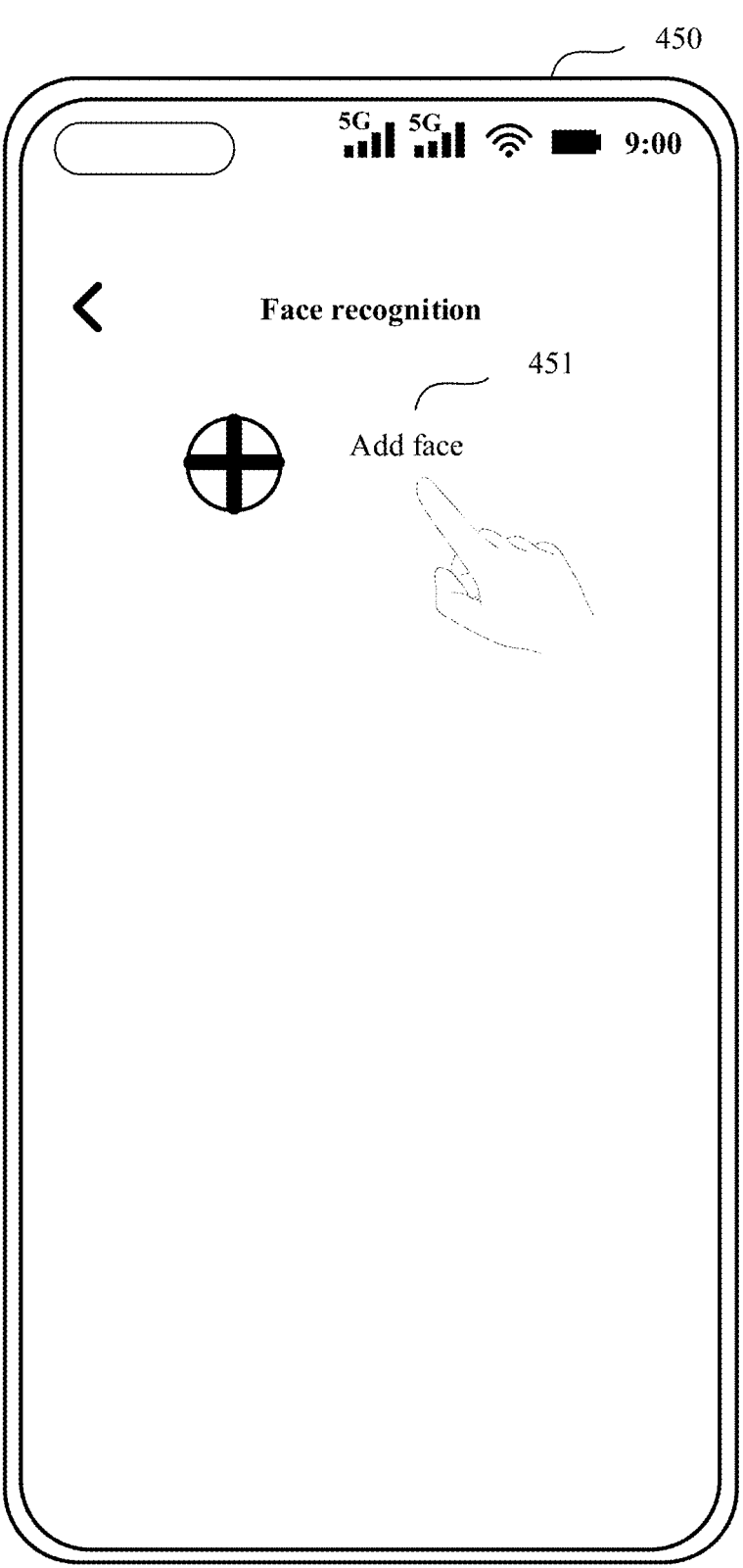

For example, after detecting an operation performed by the user on the "Biometrics & password" control, the mobile phone may display a user interface 420 shown in FIG. 4B(a). The user interface 420 is a display interface of a setting item: "Biometrics & password". The user interface 420 includes a "Face recognition" control 422. It is assumed that the user is to record a face. After detecting an operation performed by the user on the "Face recognition" control 422, the mobile phone displays an interface 440 shown in FIG. 4B(b). The interface 440 prompts the user to enter the fingerprint of the administrator, that is, the mobile phone requires the user to enter the fingerprint of the administrator for authentication. After the user inputs a fingerprint, matching is performed on the fingerprint input by the user. If the authentication succeeds, it indicates that the user is the administrator, or that the administrator inputs the fingerprint to authorize the user to record a face. Therefore, the first electronic device continues to collect the face. For example, the mobile phone displays an interface 450 shown in FIG. 4B(c). The interface includes an "Add face" control 451. When the mobile phone detects an operation performed by the user on the "Add face" control 451, the mobile phone invokes a camera to collect facial data, and associates the collected facial data with the fingerprint of the administrator.

Operation 304: The first electronic device transmits the sensitive data to the second electronic device.

In a possible embodiment, the first electronic device may use a manner of fragmenting the sensitive data, that is, first processes the sensitive data into data fragments, and then sends the data fragments to a plurality of second electronic devices.

In another possible embodiment, the first electronic device may negotiate with the second electronic device about a negotiation key that can be used in a trusted execution environment, encrypt the sensitive data by using the negotiation key, and send encrypted sensitive data to the second electronic device.

It should be understood that the negotiation key may be a symmetric key, or may be asymmetric session keys. If the negotiation key is a symmetric key, the first electronic device uses the negotiation key to encrypt the sensitive data, and the second electronic device also uses the negotiation key to decrypt the sensitive data. If the negotiation key is asymmetric session keys, the first electronic device uses a session public key to encrypt the sensitive data, and the second electronic device uses a session private key to decrypt the sensitive data. In this method, because the negotiation key is generated based on a device private key preset in the trusted execution environment, the negotiation key can be used only in trusted execution environments that are of the first electronic device and the second electronic device respectively and that are authenticated by the second electronic device and the first electronic device respectively. Therefore, encrypting the sensitive data by the first electronic device by using the negotiation key can ensure security of the sensitive data in a transmission process and reliability of a transmission result of the sensitive data.

In this embodiment of this application, there may be a plurality of manners of generating the negotiation key. The following lists several possible generation manners.

Manner (1): Negotiation is performed by using a private key of a local device and a public key of a peer device, so that both the two devices can obtain a same negotiation key via the negotiation. For example, an ECDH algorithm is used. In other words, the first electronic device may generate a negotiation key by using a device private key of the first electronic device and a device public key of the second electronic device, and the second electronic device may also generate a negotiation key by using a device private key of the second electronic device and the device public key of the second electronic device, where the negotiation keys generated by the second electronic device and the first electronic device are the same.

Manner (2): A local device first generates a random key, uses a private key of a local device for signature, uses a public key of a peer device for encryption, and sends results to the peer device. Then, the peer device uses a private key of the peer device for decryption and uses a public key of the local device for verification. If the verification succeeds, it is determined that the random key is a negotiation key. For example, the second electronic device randomly generates a random key. The first electronic device performs signature on the random key by using a device private key of the first electronic device, encrypts signature information by using a device public key of the second electronic device, and sends the encrypted signature information to the first electronic device. Subsequently, the second electronic device performs decryption by using a device private key of the second electronic device, and performs verification on decrypted data by using a device public key of the first electronic device. If the verification succeeds, it is determined that the random key is a negotiation key. It should be noted that Manner (2) does not impose a limitation on a sequence of encryption and signature, and encryption may be performed before signature as required.

Manner (3): Two devices each generate a pair of a random public key and a random private key, perform signature on the random public key by using respective device private keys, and exchange the signed random public keys. After the exchange, the two devices perform the foregoing manner (1) or manner (2) to obtain the negotiation key.

It should be noted that this embodiment of this application does not impose a limitation on a specific algorithm for generating the negotiation key, and an existing negotiation key generation algorithm may be used as required to generate the negotiation key.

This embodiment does not impose a limitation on an execution sequence of the operations of the foregoing method. In a possible embodiment, the first electronic device may first establish a secure connection to the second electronic device, then receive a biometric feature input by the user, determine sensitive data associated with the biometric feature, and finally send the sensitive data to the second electronic device. In another possible embodiment, the first electronic device may first determine sensitive data associated with a biometric feature input by the user, then establish a secure connection to the second electronic device, and finally send the sensitive data to the second electronic device.

Figure 5:
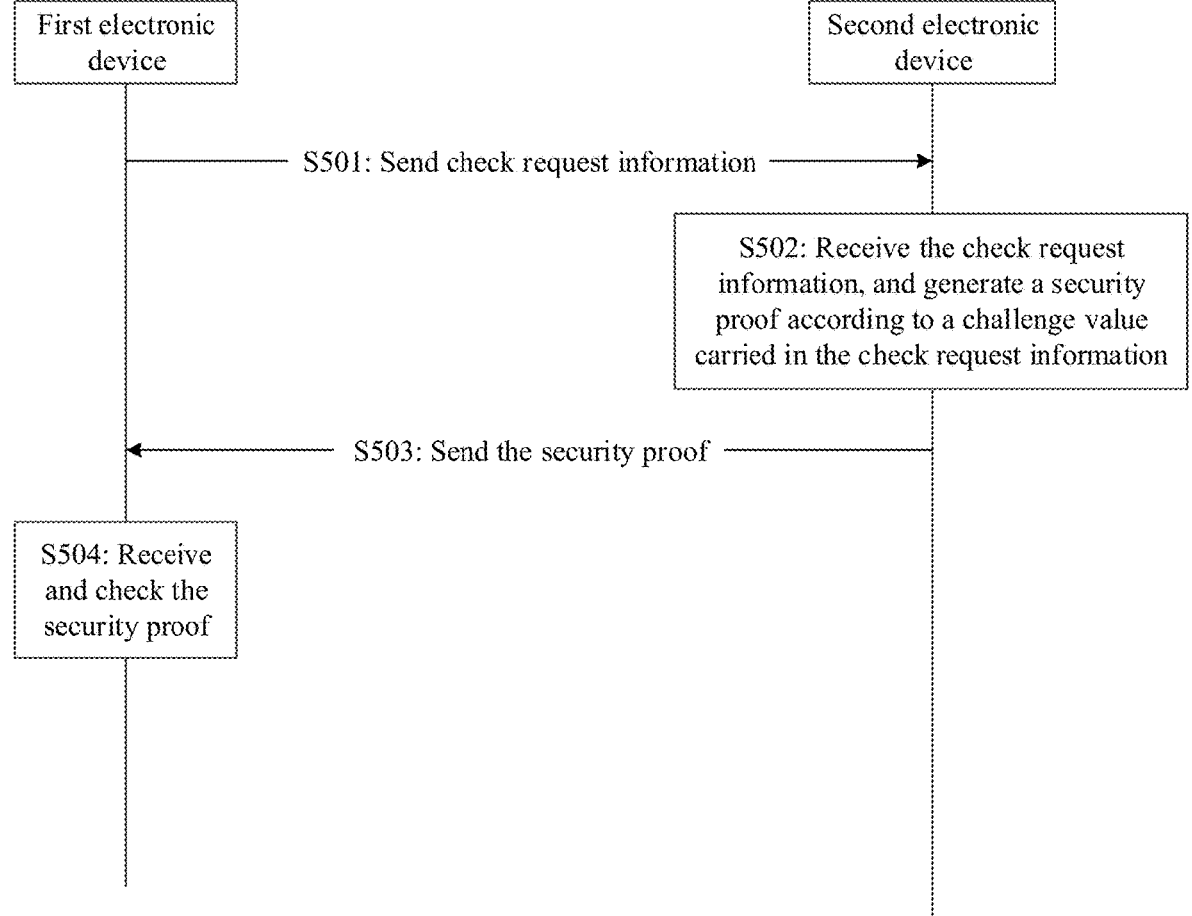
FIG. 5 is a schematic diagram of an authentication method according to an embodiment of this application.

In a possible embodiment, before the first electronic device negotiates with the second electronic device about a negotiation key that can be used in a trusted execution environment, the first electronic device may perform authentication on a trusted execution environment of the second electronic device. For an example authentication process, refer to a method flowchart shown in FIG. 5.

S501: A first electronic device sends check request information to a second electronic device.

The check request information includes any one or any combination of the following: a challenge value and a registration information value. When performing a security check on the second electronic device, the first electronic device may first check whether the first electronic device and the second electronic device are in a same trusted environment; or the first electronic device determines whether a security level of the second electronic device is higher than a specified security level; or the first electronic device determines whether the second electronic device is a secure device. For example, in the following embodiment, the check request information carries the challenge value, and the second electronic device returns a security proof corresponding to the challenge value.

S502: The second electronic device receives the check request information sent by the first electronic device, and generates a security proof according to a challenge value carried in the check request information, where the security proof is used to prove a trusted environment of the second electronic device, or prove a security level of the second electronic device, or prove that the second electronic device is a secure device. The challenge value may be information such as a random number, or may be encrypted information of other content.

In some embodiments, the second electronic device may generate the security proof according to the challenge value in manners that include but are not limited to the following manner: The second electronic device encrypts, to obtain an encrypted challenge value according to a device certificate in a trusted execution environment of the second electronic device, the challenge value sent by the first electronic device, where the encrypted challenge value is the security proof.

For example, the second electronic device encrypts the challenge value by using a device private key in the device certificate of the second electronic device, to obtain the security proof. The device certificate includes any one or any combination of information, such as an identity number (ID), manufacturer information (for example, a name or trademark of a manufacturer), delivery time information, version information, or model information, of the second electronic device. The device certificate may further include other parameter information of the second electronic device.

S503: The second electronic device sends the security proof to the first electronic device.

S504: The first electronic device receives the security proof from the second electronic device, and checks the security proof.

In some embodiments, the first electronic device checks the security proof, and determines, according to a check result, whether the second electronic device is in the same trusted environment as the first electronic device; or the first electronic device checks the security proof, and determines, according to a check result, whether a security level corresponding to a trusted environment in which the second electronic device is located is higher than the specified security level, where the security level may be higher than or lower than that of a trusted environment in which the first electronic device is located; or the first electronic device checks the security proof, and determines, according to a check result, whether the second electronic device is a secure device.

For example, the first electronic device may decrypt the security proof by using the device certificate obtained from the second electronic device, to obtain a challenge value, and compare the challenge value with the challenge value that is carried in the request information sent to the second electronic device, thereby determining whether the two values are consistent. If the two values are consistent, the first electronic device determines that the first electronic device and the second electronic device are in a same trusted environment; or if the two values are inconsistent, the first electronic device determines that the first electronic device and the second electronic device are in different trusted environments. Alternatively, the first electronic device further determines, according to the challenge value carried in the request information, a key corresponding to a security level of the second electronic device, determines the security level of the second electronic device by using the key corresponding to the security level, and further determines whether the security level of the second electronic device is higher than the specified security level.

Alternatively, the first electronic device may encrypt, by using the device certificate obtained from the second electronic device, the challenge value that is carried in the request information sent to the second electronic device, and compare an encrypted challenge value with the security proof sent by the second electronic device, thereby determining whether the two values are consistent. If the two values are consistent, the first electronic device determines that the first electronic device and the second electronic device are in a same trusted environment; or if the two values are inconsistent, the first electronic device determines that the first electronic device and the second electronic device are in different trusted environments. The first electronic device may alternatively encrypt, by using keys corresponding to different trusted environments, the challenge value that is carried in the request information sent to the second electronic device, and compare the challenge value with the security proof sent by the second electronic device, thereby determining the trusted environment in which the second electronic device is located.

In a possible embodiment, the first electronic device may classify sensitive data into sensitive data sets having different security levels. According to an authentication result of a biometric feature input on the second electronic device by a user, whether the second electronic device has a trusted environment, and sensitive data selected by the user for sending, the first electronic device may finally determine content of the sensitive data to be sent to the second electronic device, that is, the sensitive data may be not fixed, and may change according to a current authentication result.

To more systematically describe the data transmission method provided in the embodiments of this application, the following provides descriptions with reference to two example embodiments.

Example Embodiment I

Figure 6A:
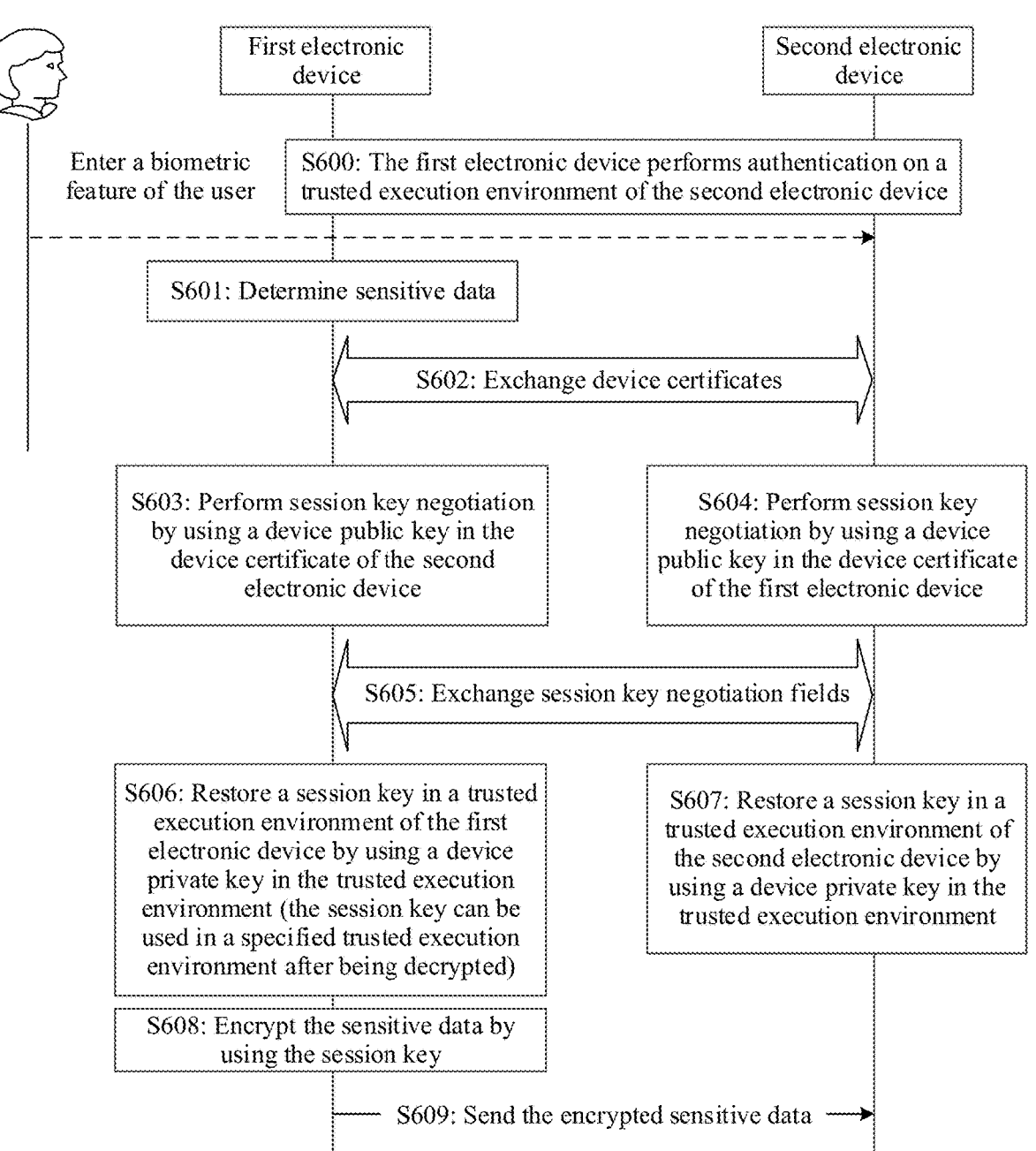
FIG. 6A is a schematic diagram of a data transmission method according to an embodiment of this application.

Referring to FIG. 6A, an embodiment of this application provides a data transmission method. The method includes the following operations.

S600: A first electronic device performs authentication on a trusted execution environment of a second electronic device.

For an example authentication process, refer to operations S501 to S505. Details are not described herein again.

S601: After the second electronic device is authenticated, the first electronic device establishes a connection to the second electronic device, receives a biometric feature input by a user, and determines sensitive data associated with the biometric feature.

For an example manner of determining the sensitive data, refer to the foregoing operation 302.

S602: The first electronic device and the second electronic device exchange device certificates.

Figure 6B:
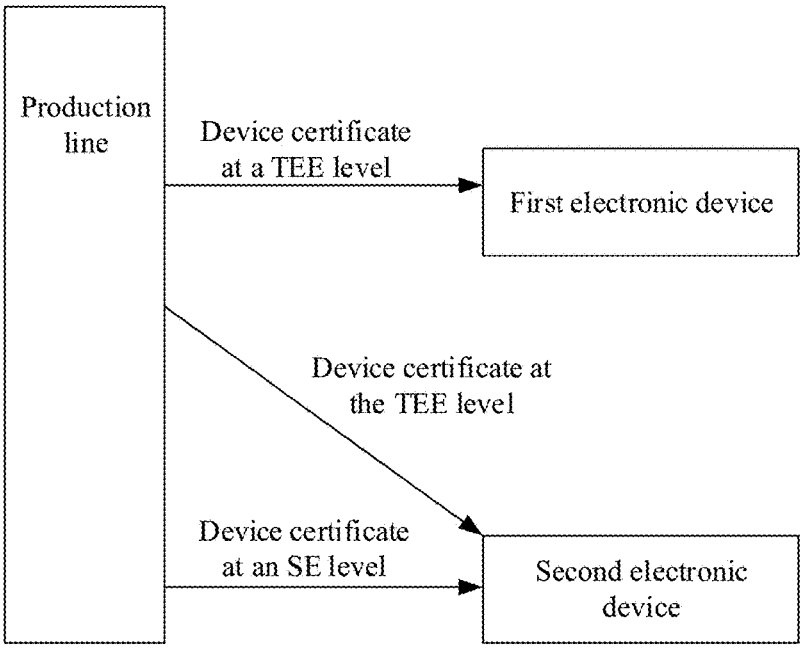
FIG. 6B is a schematic diagram of a device certificate issue method according to an embodiment of this application.

The device certificates exchanged in this operation are device certificates preset in the electronic devices on a production line. For example, as shown in FIG. 6B, a device certificate preset in the first electronic device on the production line is a device certificate at a trusted execution environment (TEE) level. Device certificates preset in the second electronic device on the production line are a device certificate at the TEE level and a device certificate at a secure element (SE) level.

S603: The first electronic device performs session key negotiation by using a device public key in the device certificate of the second electronic device, and generates a session key negotiation field.

S604: The second electronic device performs session key negotiation by using a device public key in the device certificate of the first electronic device, and generates a session key negotiation field.

It should be noted that an execution sequence of the foregoing operations S603 and S604 is not limited. In these operations, in a possible embodiment, the session key negotiated between the first electronic device and the second electronic device may be a session key that can be used in a specified trusted execution environment. For example, the session key may be a session key that can be used in a TEE-level trusted execution environment. In another possible embodiment, the session key negotiated between the first electronic device and the second electronic device may be specified as follows: The session key can be used in an environment that is at the same security level as a trusted execution environment of the first electronic device. In still another possible embodiment, the session key negotiated between the first electronic device and the second electronic device may be specified as follows: The session key can be used in a trusted execution environment whose security level is greater than a specified security level. For example, the session key can be used in another trusted execution environment that has a greater security level than the trusted execution environment of the first electronic device.

S605: The first electronic device and the second electronic device exchange the session key negotiation fields.

S606: Restore a session key in a trusted execution environment of the first electronic device by using a device private key in the trusted execution environment.

In this operation, the session key can be used in the trusted execution environment after being decrypted.

S607: Restore a session key in a trusted execution environment of the second electronic device by using a device private key in the trusted execution environment.

S608: The first electronic device encrypts the sensitive data by using the session key.

It should be noted that S601 may alternatively occur after S607, that is, the first electronic device may first negotiate with the second electronic device about the session key, and then the first electronic device encrypts the sensitive data by using the session key.

S609: The first electronic device sends encrypted sensitive data to the second electronic device.

In some embodiments, the second electronic device may decrypt the sensitive data by using the session key, and save the sensitive data to the trusted execution environment.

Figure 6C:
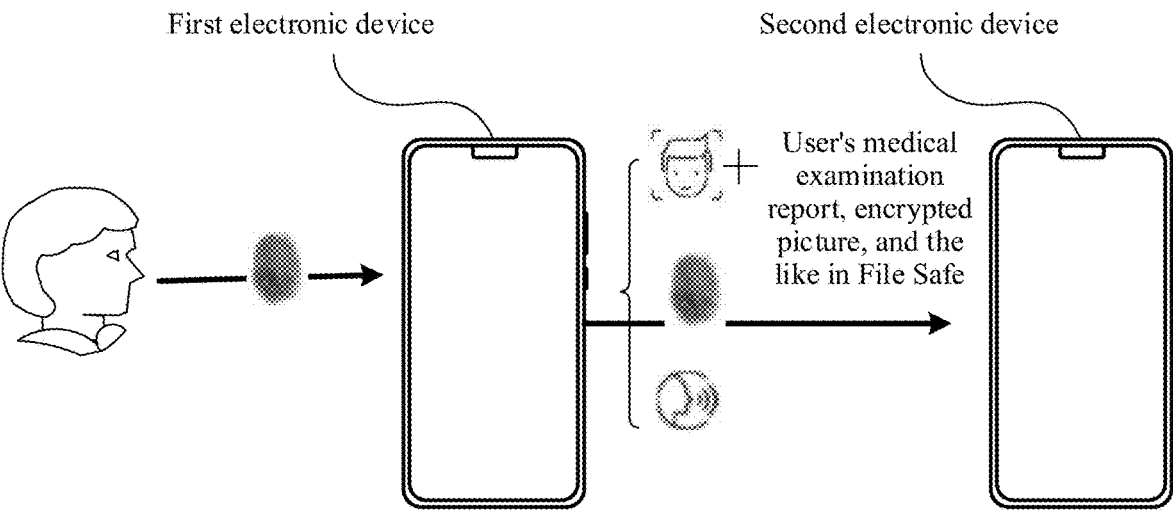
FIG. 6C is a schematic diagram of biometric feature distribution according to an embodiment of this application.

For example, as shown in FIG. 6C, after the first electronic device establishes a secure connection to the second electronic device, the second electronic device receives a fingerprint input by a user, and then sends a data obtaining request to the first electronic device. The request includes the fingerprint input by the user. The first electronic device performs matching on the fingerprint input by the user, and determines, if authentication succeeds, that sensitive data associated with the fingerprint includes a fingerprint, a face, and a voiceprint, and user's confidential data bound to the face, such as user's medical examination report and an encrypted picture in File Safe. After receiving the data obtaining request from the second electronic device, the first electronic device sends, to the second electronic device, a face that is in the mobile phone and that is associated with the administrator, as well as user's confidential data, a fingerprint, and a voiceprint that are in the mobile phone and that are bound to the face.

Example Embodiment II

Figures 7A, 7B:
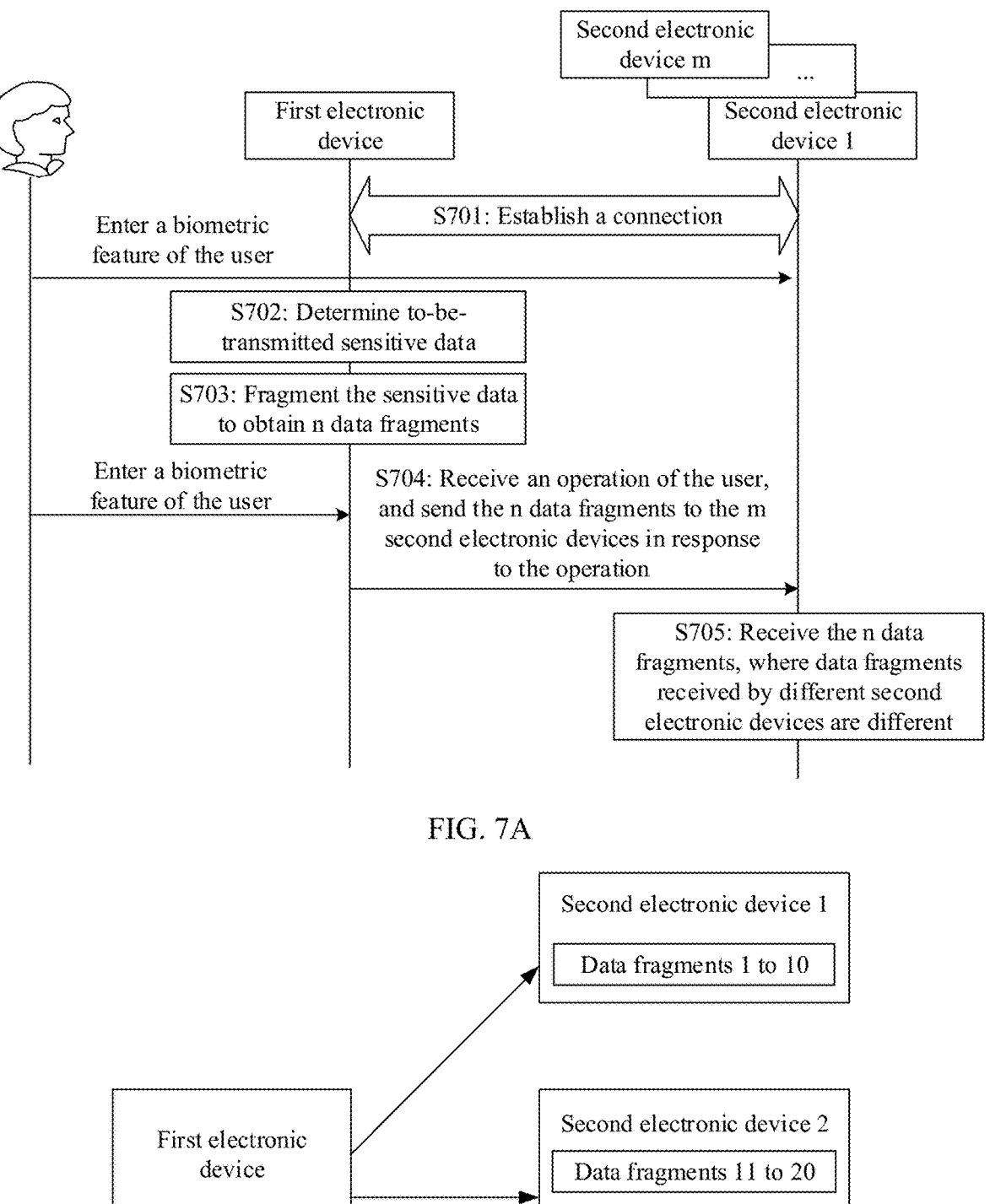
FIG. 7A is a schematic diagram of a data transmission method according to an embodiment of this application.
FIG. 7B is a schematic diagram of a data transmission scenario according to an embodiment of this application.

Referring to FIG. 7A, an embodiment of this application provides a data transmission method. The method includes the following operations.

S701: A first electronic device establishes connections tom second electronic devices.

In this operation, m is a positive integer greater than or equal to 2, and a manner of establishing secure connections to the second electronic devices by the first electronic device may include but is not limited to the following manners.

Manner A: The first electronic device uses at least two second electronic devices selected by a user as trusted devices, and establishes the connections to the at least two second electronic devices. In other words, the user performs a binding operation on the first electronic device, to establish binding relationships between the first electronic device and the second electronic devices. For example, the user may establish the binding relationships between the first electronic device and the at least two second electronic devices by scanning quick response codes or accessing a same WLAN hotspot.

Manner B: The first electronic device may perform authentication on the second electronic devices when receiving sensitive data sharing requests of the second electronic devices, determine, after the authentication succeeds, that the second electronic devices are trusted devices, and establish the connections to the second electronic devices.

For example, after the first electronic device establishes network connections to the at least two second electronic devices, the user inputs a fingerprint on a new device (one of the second electronic devices). Then, the new device sends the fingerprint to the first electronic device. After receiving the fingerprint from the new device, the first electronic device matches the received fingerprint against a fingerprint template of an administrator, and determines, if the matching succeeds, that the authentication performed on the second electronic device succeeds.

S702: The first electronic device determines sensitive data associated with a biometric feature input by a user.

For an example manner of determining the sensitive data, refer to the foregoing operation 302.

S703: The first electronic device fragments the sensitive data to obtain n data fragments.

S704: The first electronic device sends the n data fragments to the m second electronic devices.

In a possible embodiment, the first electronic device may receive an operation performed by the user on the first electronic device, for example, a mobile phone cloning operation, and send the n data fragments to the m second electronic devices in response to the operation, where m and n are positive integers greater than or equal to 2.

In another possible embodiment, the second electronic devices may send data sharing request messages to the first electronic device. After receiving the data sharing request messages, the first electronic device sends the n data fragments to the second electronic devices.

S705: The m second electronic devices receive the n data fragments, where data fragments received by different second electronic devices are different.

For example, as shown in FIG. 7B, the first electronic device divides the sensitive data into 20 data fragments. After establishing secure connections to two second electronic devices, the first electronic device sends a data fragment 1 to a data fragment 10 to one second electronic device 1, and sends a data fragment 11 to a data fragment 20 to the other second electronic device 2, where a set of the data fragment 1 to the data fragment 20 constitutes the sensitive data.

In this method, the first electronic device does not require the second electronic device to have a trusted execution environment, that is, does not need to authenticate whether the second electronic device has a trusted execution environment. The first electronic device may fragment the sensitive data to generate a plurality of data fragments, where a set of the plurality of data fragments constitutes the sensitive data. The first electronic device sends the data fragments to at least two second electronic devices, where data fragments received by different second electronic devices are different. In this method, the sensitive data fragments are stored in a distributed storage manner, thereby improving cross-device transmission security of sensitive data.

Specifically, a manner of fragmenting the sensitive data by the first electronic device may include but is not limited to the following manner: The first electronic device directly splits or secretly splits (for example, by using a secret sharing algorithm) the sensitive data into n (n≥2) data fragments, and transmits the n data fragments obtained after the splitting to m (m≥2) second electronic devices, respectively. Data fragments stored in different second electronic devices of the m second electronic devices are different.

In this way, a method for performing device authentication on the m second electronic devices based on the data fragments may include the following manners:

Manner 1: When a target second electronic device in the m second electronic devices receives an authentication request, that is, when the sensitive data is to be used, the target second electronic device may obtain data fragments from the other m−1 second electronic devices, and then the required sensitive data is restored on the target second electronic device. The target second electronic device performs identity authentication by using restored sensitive data, and generates an authentication result.

For example, with reference to a smart home system, when a user replaces a previous smart speaker with a new smart speaker, sensitive data such as a fingerprint, a face, and a voiceprint on the previous smart speaker may be fragmented into n data fragments. The n data fragments are transmitted to devices such as the new smart speaker, a camera, and a smart television, where the new smart speaker, the camera, and the smart television are bound to each other. Identity authentication is performed in a collaborative manner. For example, after receiving a face authentication request, the smart television obtains data fragments from the camera and the new smart speaker, combines the data fragments into a face template, performs face authentication by using the face template, and generates an authentication result.

Manner 2: When a target second electronic device in the m second electronic devices receives an authentication request, that is, when the sensitive data is to be used, a central device in the m second electronic devices may be instructed to obtain data fragments from the other m−1 second electronic devices, and then the required sensitive data is restored on the central device. The central device in the m second electronic devices performs face authentication by using the restored sensitive data, generates a face authentication result, and sends the face authentication result to the target second electronic device.

For example, with reference to a smart home system, when a user replaces a previous smart speaker with a new smart speaker, sensitive data such as a fingerprint, a face, and a voiceprint on the previous smart speaker may be fragmented into n data fragments. The n data fragments are transmitted to devices such as the new smart speaker, a camera, and a smart television, where the new smart speaker, the camera, and the smart television are bound to each other. Identity authentication is performed in a collaborative manner. For example, after receiving a face authentication request, the camera instructs the new smart speaker to obtain data fragments from the camera and the smart television. Then, the new smart speaker combines the data fragments into a face template, performs face authentication by using the face template, generates an authentication result, and sends the authentication result to the camera.

Manner 3: After receiving an authentication request, any electronic device of the m second electronic devices may distribute the authentication request to other m−1 second electronic devices. Then, the m second electronic devices respectively match a biometric feature in the authentication request by using a respective data fragment, and distribute a matching result to a target second electronic device of the m second electronic devices for summarization, so that the target second electronic device generates a final authentication result. In other words, the authentication process may be separately executed by the m second electronic devices that store the data fragments.

For example, with reference to a smart home system, when a user replaces a previous smart speaker with a new smart speaker, sensitive data such as a fingerprint, a face, and a voiceprint on the previous smart speaker may be fragmented into n data fragments. The n data fragments are transmitted to devices such as the new smart speaker, a camera, and a smart television, where the new smart speaker, the camera, and the smart television are bound to each other. Identity authentication is performed in a collaborative manner. For example, after the smart television receives a face authentication request, the new smart speaker forwards the face authentication request to the camera and the smart television. The smart television performs facial feature matching by using a data fragment stored in the smart television, and generates a first authentication result. The camera also performs facial feature matching by using a data fragment stored in the camera, and generates a second authentication result. The new smart speaker also performs facial feature matching by using a data fragment stored in the new smart speaker, and generates a third authentication result. Finally, the smart television sends the first authentication result to the new smart speaker, the camera sends the second authentication result to the new smart speaker, and the new smart speaker summarizes the first authentication result, the second authentication result, and the third authentication result, to generate a final authentication result.

Figure 7C:
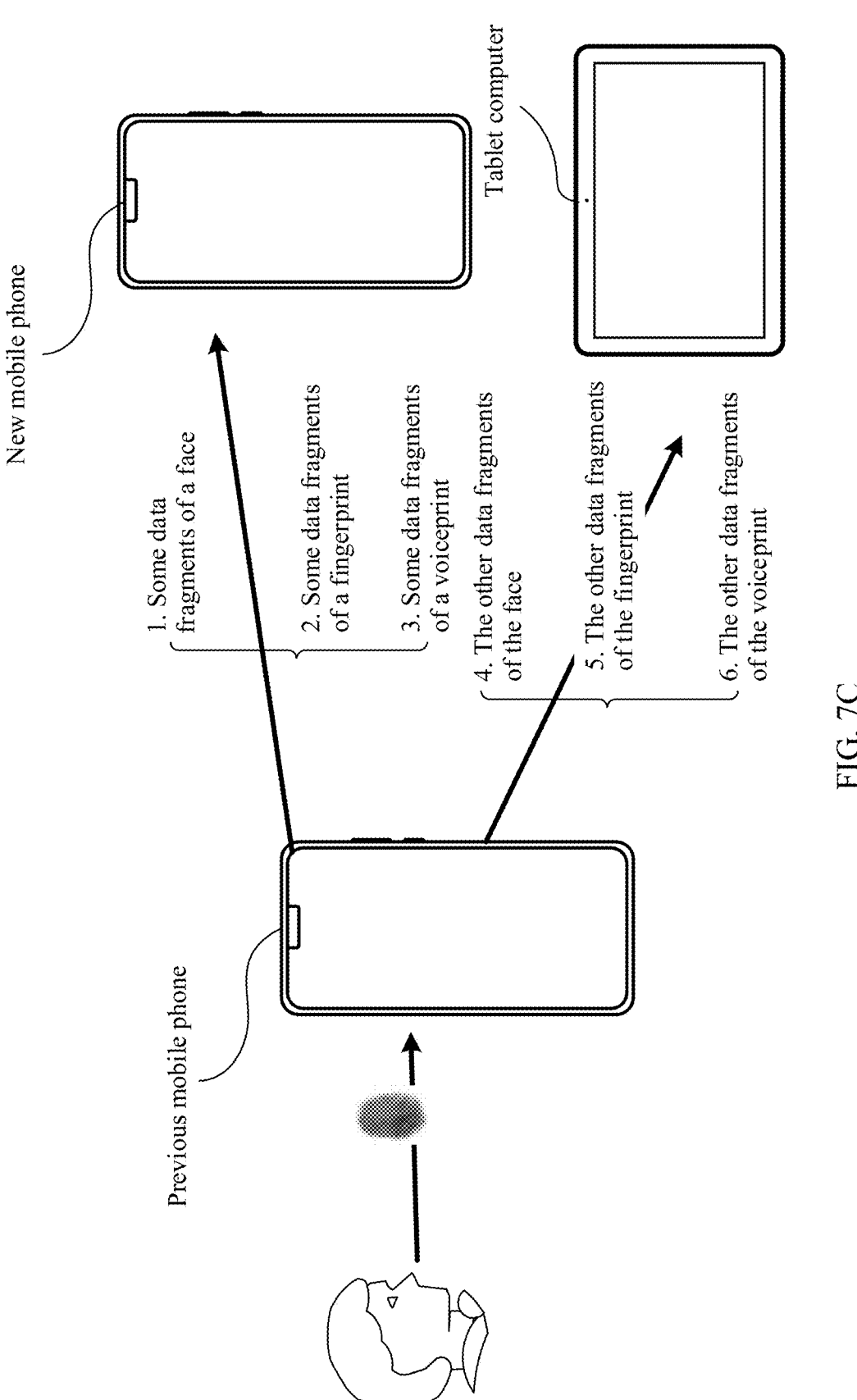
FIG. 7C is a schematic diagram of biometric feature distribution according to an embodiment of this application.

For example, as shown in FIG. 7C, in addition to establishing a secure connection to a new mobile phone, a previous mobile phone further establishes a secure connection to a tablet computer. The new mobile phone receives a fingerprint input by a user, and then sends a data obtaining request to the previous mobile phone. The request includes the fingerprint input by the user. The previous mobile phone performs matching on the fingerprint input by the user, and if authentication succeeds, determines that sensitive data associated with the fingerprint includes a fingerprint, a face, and a voiceprint. The previous mobile phone fragments the sensitive data that includes the fingerprint, the face, and the voiceprint, sends some data fragments of the fingerprint, some data fragments of the face, and some data fragments of the voiceprint to the new mobile phone, and sends the other data fragments of the fingerprint, the other data fragments of the face, and the other data fragments of the voiceprint to the tablet computer.

In a possible embodiment, in addition to sending the sensitive data to the second electronic device, the first electronic device further sends usage policy information of the sensitive data to the second electronic device.

In a possible embodiment, the usage policy information is used to indicate an authorized service of the sensitive data. The authorized service is a service that can be executed by a device by using the sensitive data. For example, the first electronic device sends a fingerprint template and usage policy information of the fingerprint template to the second electronic device. The usage policy information of the fingerprint template is used to indicate that a fingerprint unlock service is supported.

In another possible embodiment, the usage policy information is used to indicate an unauthorized service of the sensitive data. The unauthorized service is a service that is not allowed to be executed by a device by using the sensitive data. For example, the first electronic device sends a fingerprint template and usage policy information of the fingerprint template to the second electronic device. The usage policy information of the fingerprint template is used to indicate that a fingerprint payment service is not supported.

In still another possible embodiment, the usage policy information is used to indicate an authorized service of the sensitive data and an unauthorized service of the sensitive data. For example, the first electronic device sends a fingerprint template and usage policy information of the fingerprint template to the second electronic device. The usage policy information of the fingerprint template is used to indicate that a fingerprint unlock service is supported, but a fingerprint payment service is not supported.

In another possible embodiment, the usage policy information may be further used to indicate information of a user who can use the sensitive data. For example, the first electronic device sends a fingerprint template and usage policy information of the fingerprint template to the second electronic device. The usage policy information of the fingerprint template is used to indicate that a user A can use a fingerprint unlock service, and that a user B cannot use a fingerprint payment service.

In this way, when the first electronic device distributes locally stored sensitive data to the second electronic device, service scenarios in which the sensitive data is used or permission of users using the sensitive data can be standardized by using the usage policy information, so that abuse of the sensitive data is avoided.

Figure 8A:
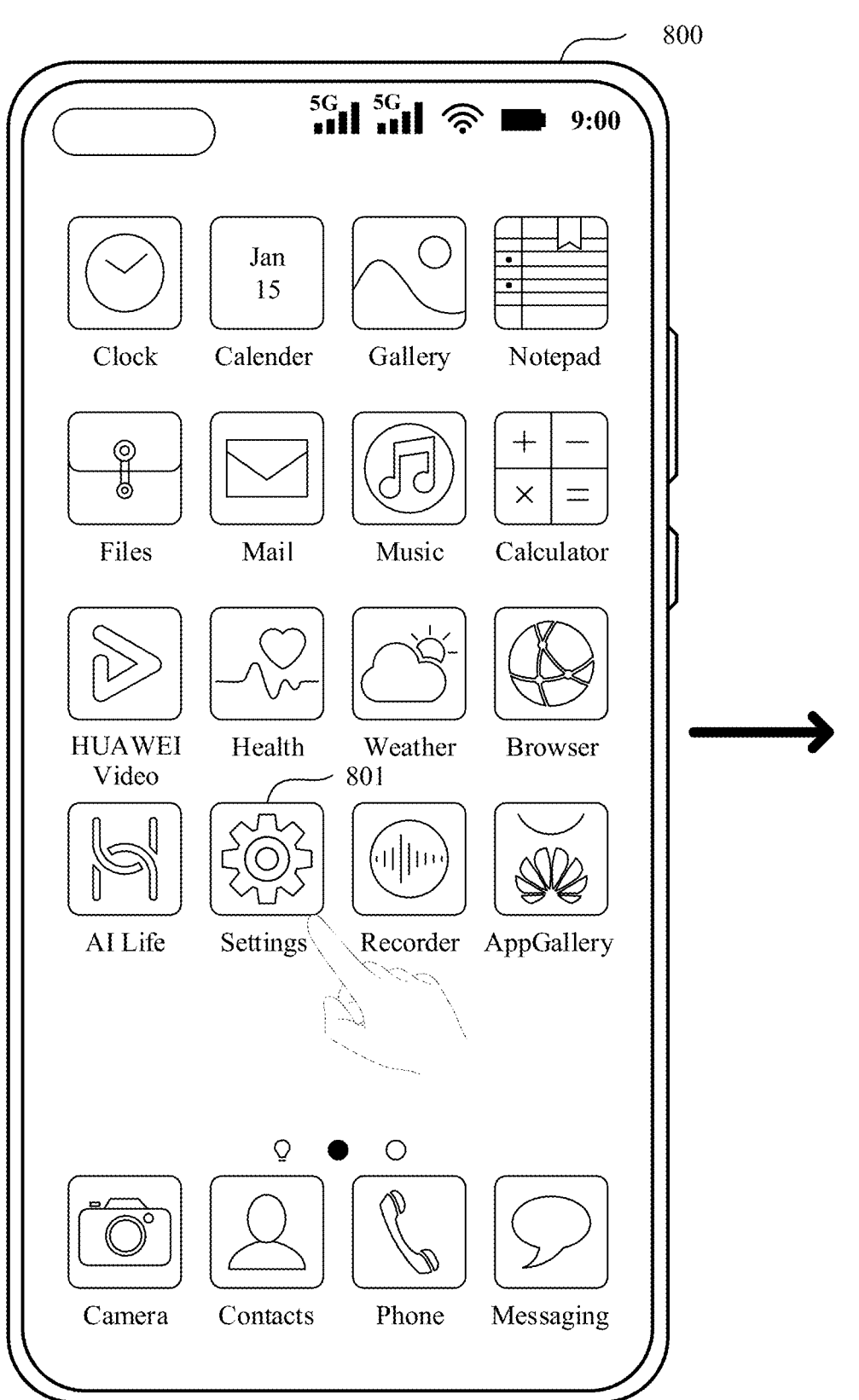
FIG. 8A(a) to FIG. 8A(d) are a schematic diagram of still another group of interfaces according to an embodiment of this application.
Figure 8A:
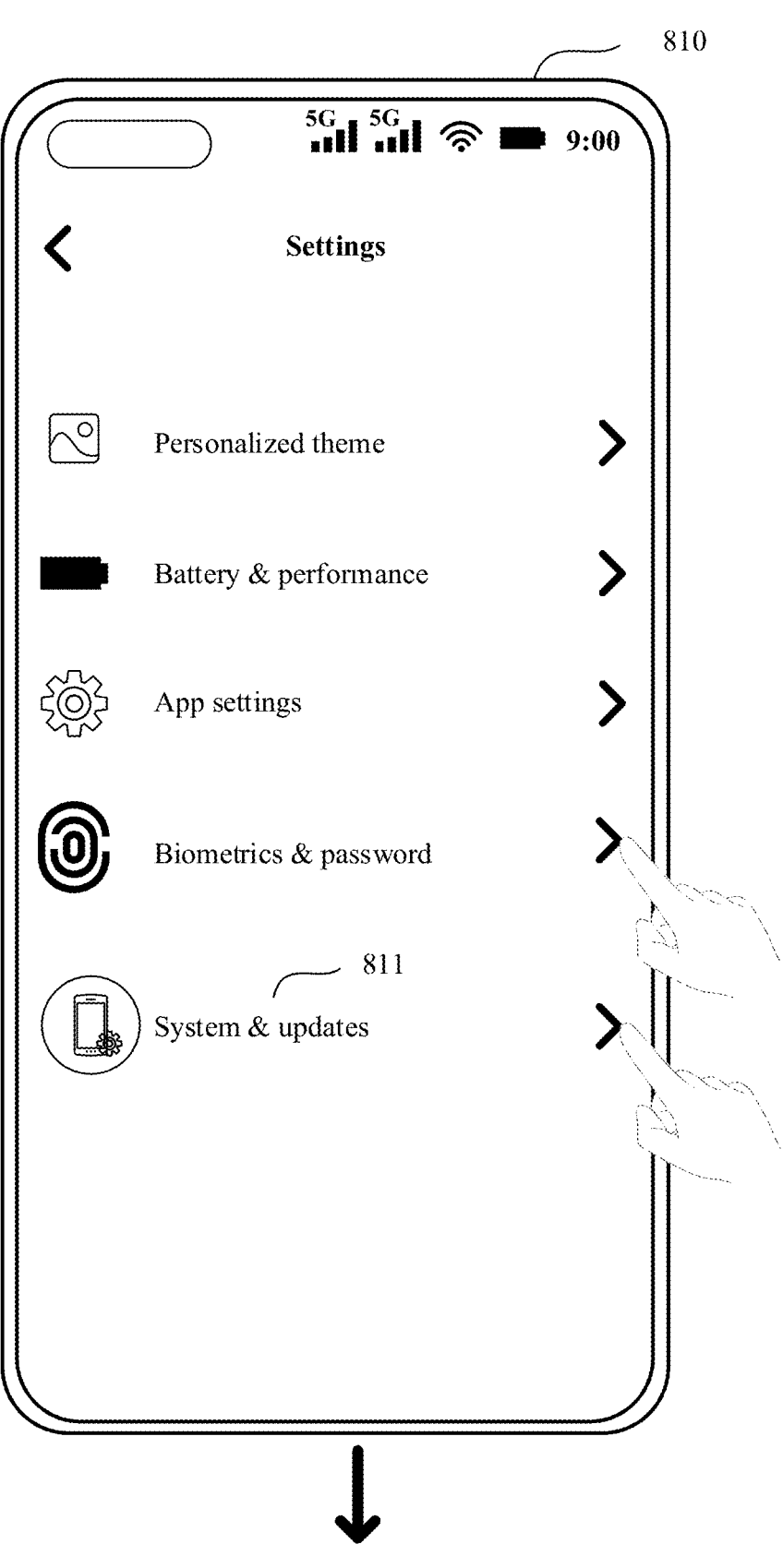
Figure 8A:
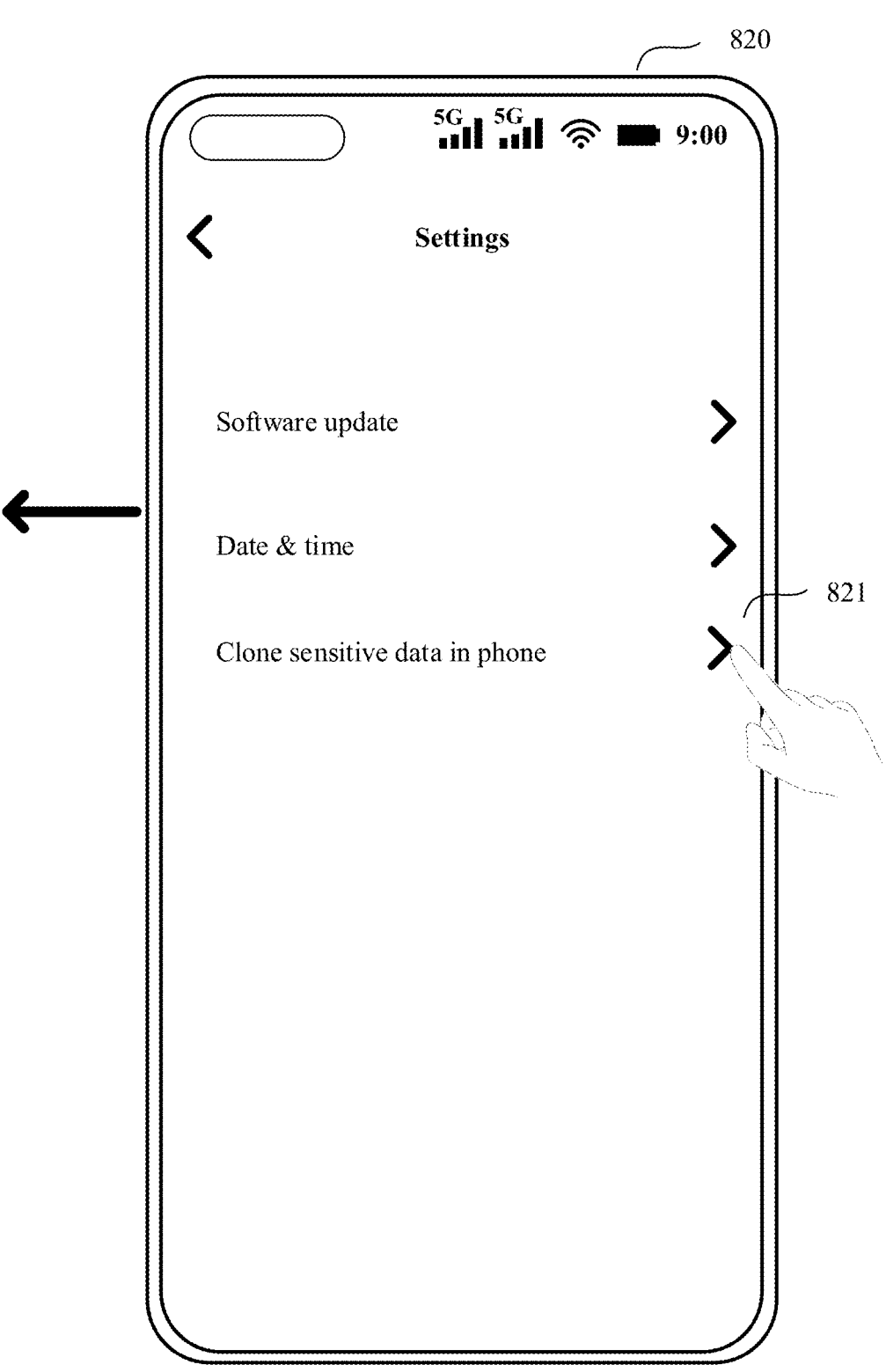
Figure 8A:
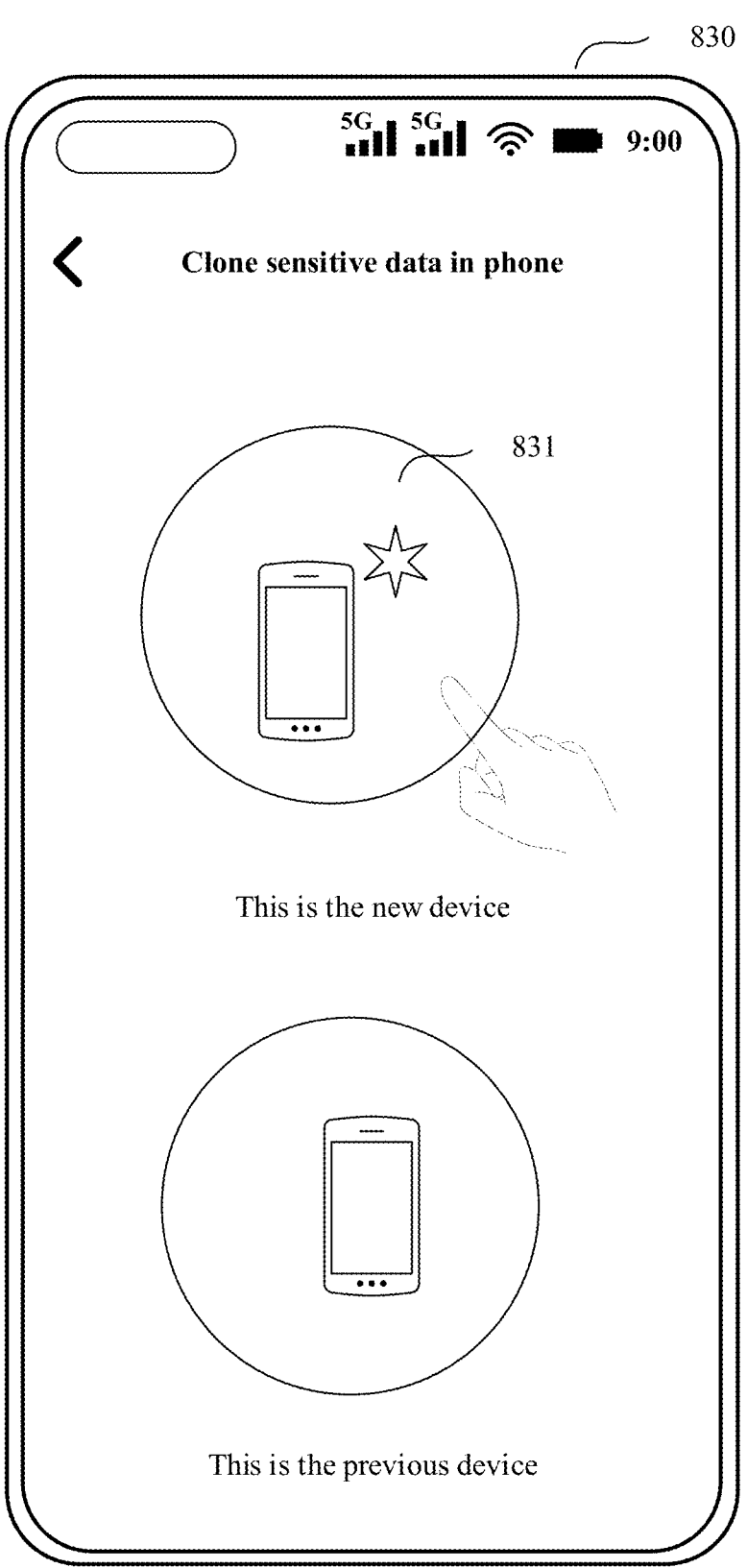

The following further describes the foregoing data transmission method by using an example with reference to a scenario, shown in FIG. 8A(a) to FIG. 8A(d), in which a previous mobile phone is replaced with a new mobile phone.

Referring to FIG. 8A(a), a user interface 800 is a desktop of a new mobile phone of a user. The desktop of the mobile phone includes applications such as Phone, Gallery, WeChat®, Album, Weather, Calendar, and Settings. After detecting an operation performed by the user on the "Settings" control 801, the mobile phone may display a user interface 810 shown in FIG. 8A(b). Referring to FIG. 8A(b), the user interface 810 is a display interface for setting applications. The user interface 810 displays a plurality of setting items, including a "System & updates" control 811. After a tablet computer detects an operation performed by the user on the "System & updates" control 811, the mobile phone may display a user interface 820 shown in FIG. 8A(c). The user interface 820 is a display interface of a setting item: "System & updates". When needing to replace a previous mobile phone with a new mobile phone, a user may tap a "Clone sensitive data in phone" control 821. After detecting an operation performed by the user on the "Clone sensitive data in phone" control 821, the mobile phone displays a user interface 830 shown in FIG. 8A(d).

Figure 8B:
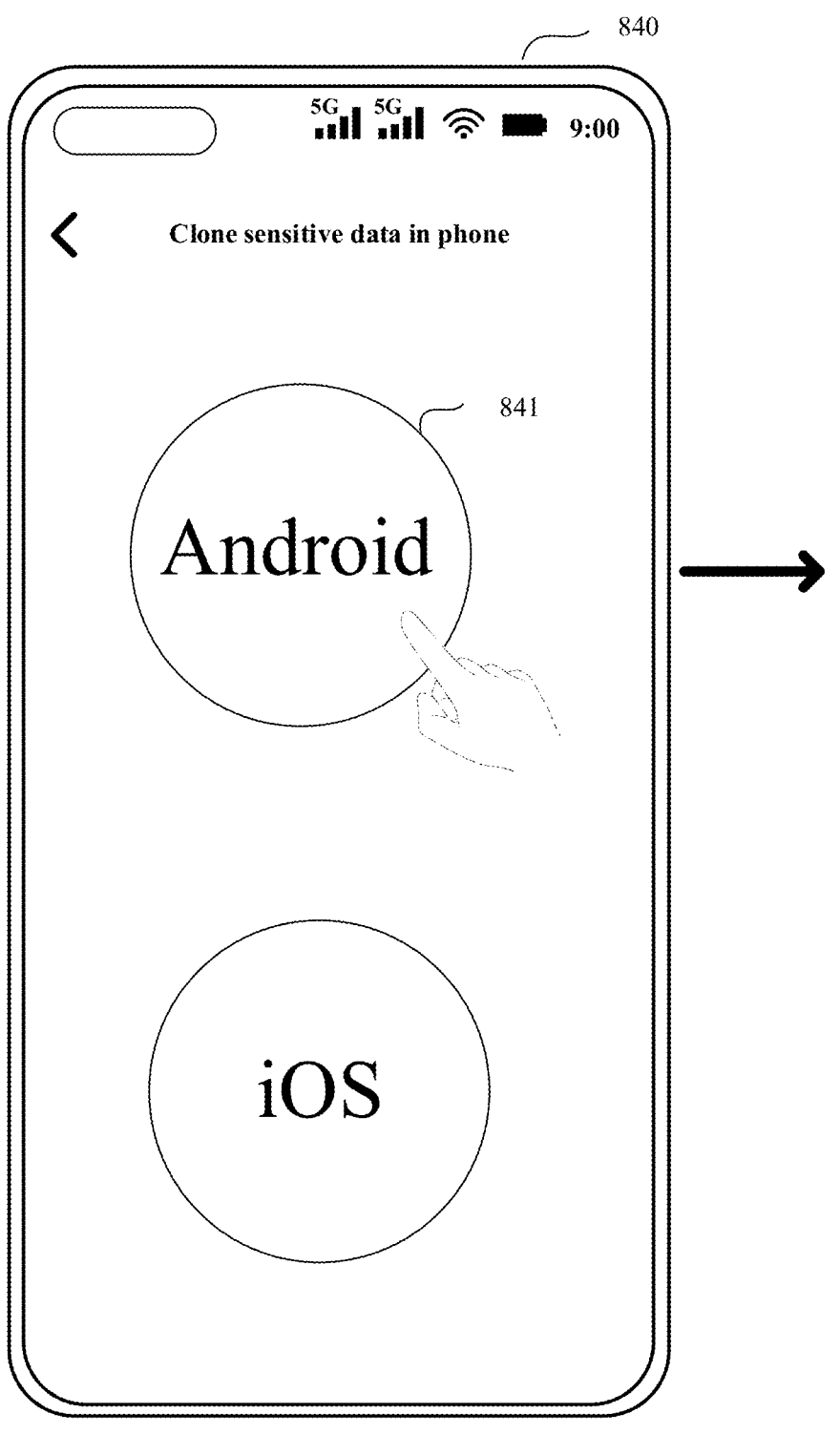
FIG. 8B(e) and FIG. 8B(f) are a schematic diagram of yet another group of interfaces according to an embodiment of this application.
Figure 8B:
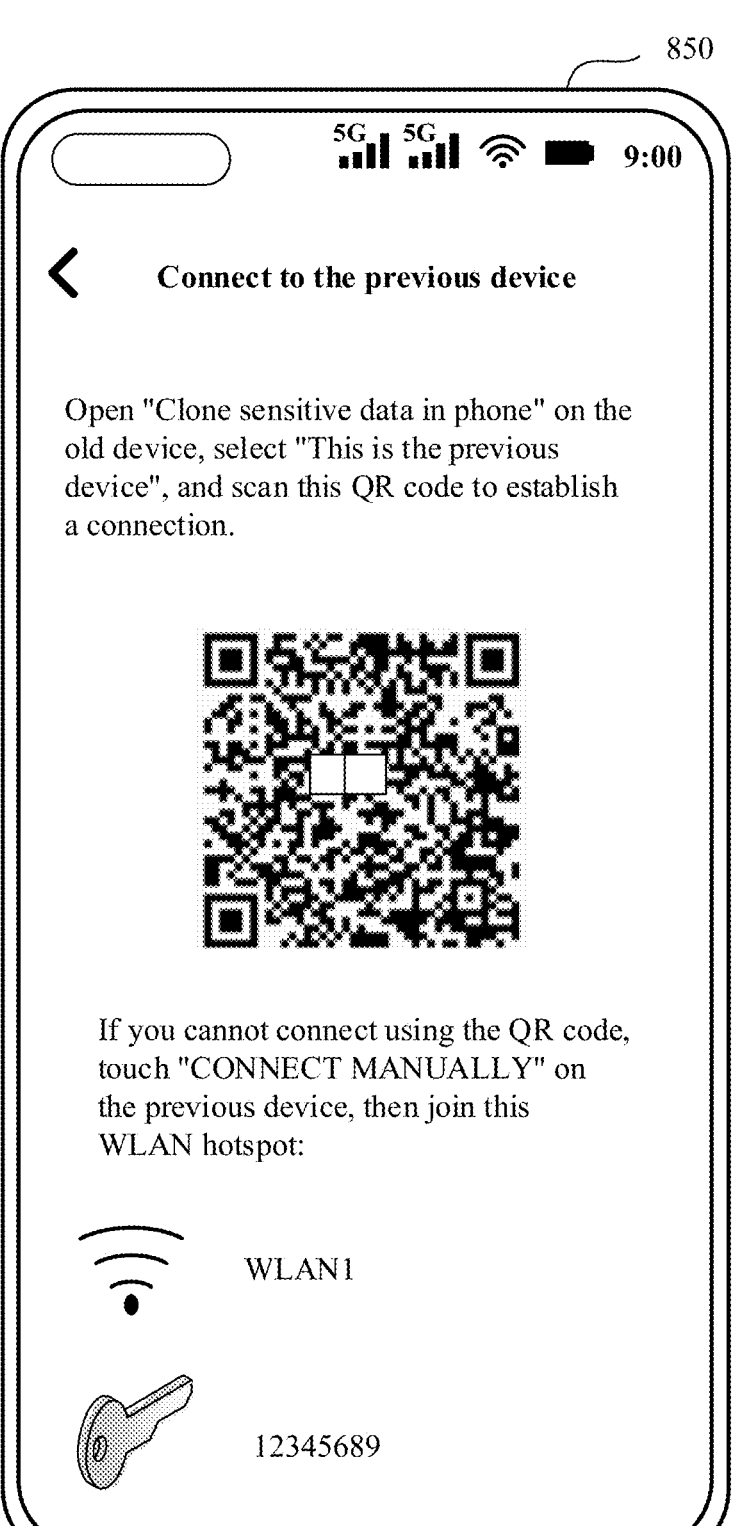

After the user taps a "This is the new device" control 831 in the user interface 830, the mobile phone displays an interface 840 shown in FIG. 8B(e). The interface displays different operating systems for the user to select. The user may select, according to an operating system of the previous mobile phone, a corresponding operating system for presetting. It is assumed that the operating system of the previous mobile phone is an Android operating system. After detecting an operation performed by the user on an "Android" control 841, the new mobile phone displays an interface 850 shown in FIG. 8B(f). The interface 850 provides device connection manners for the user to select, for example, scanning a quick response code or accessing a hotspot. In addition, the interface 850 prompts the user to open "Clone sensitive data in phone" on the previous mobile phone, and select "This is the previous device", to establish a network connection to the new mobile phone.

Figure 8C:
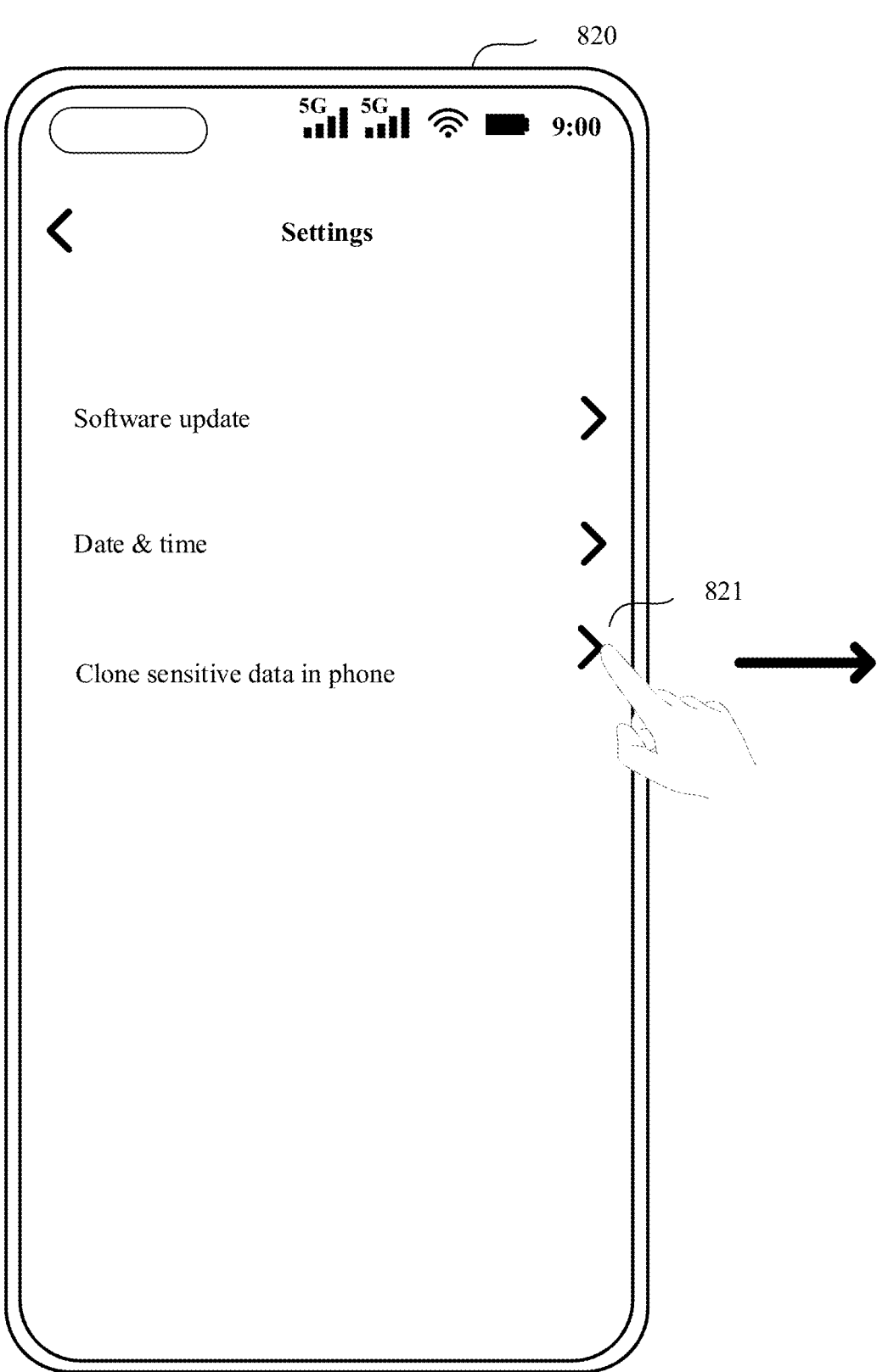
FIG. 8C(a) to FIG. 8C(c) are a schematic diagram of still yet another group of interfaces according to an embodiment of this application.
Figure 8C:
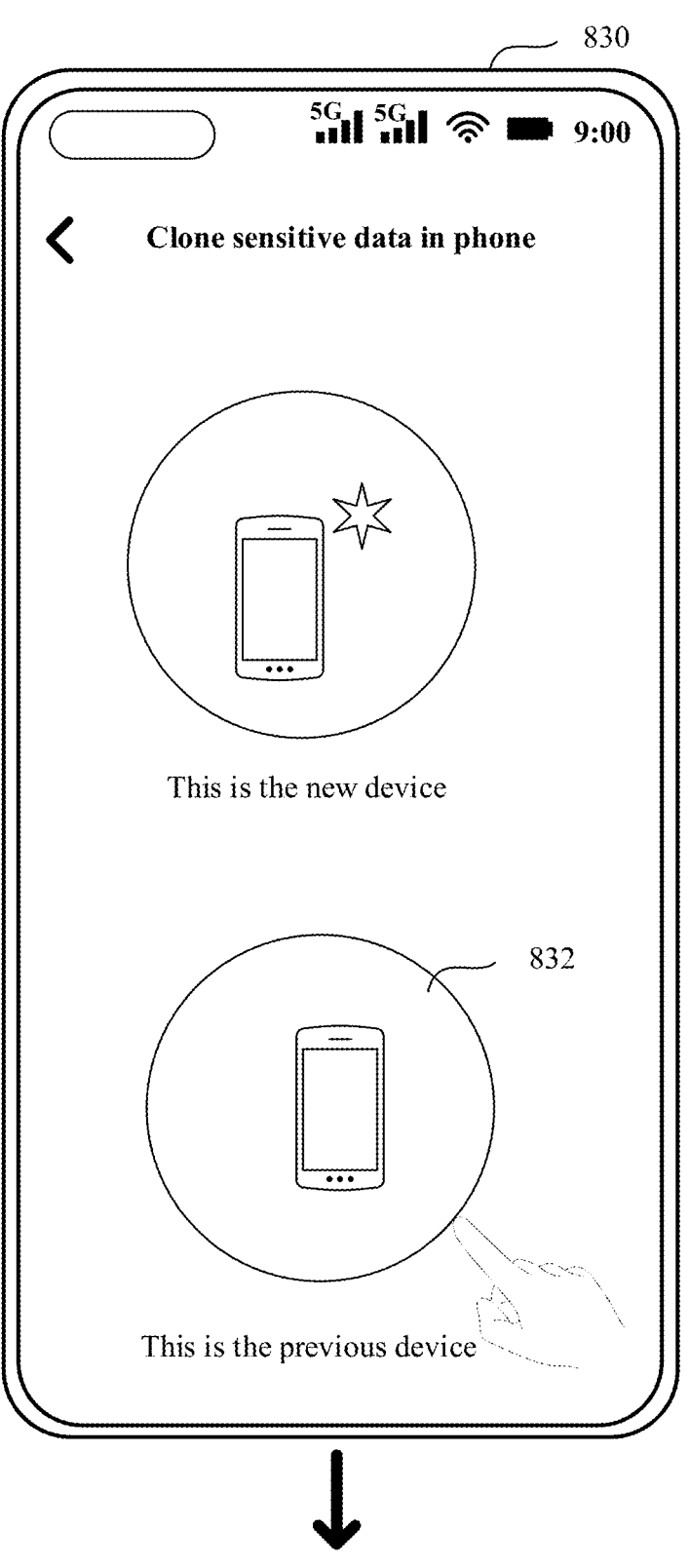
Figure 8C:
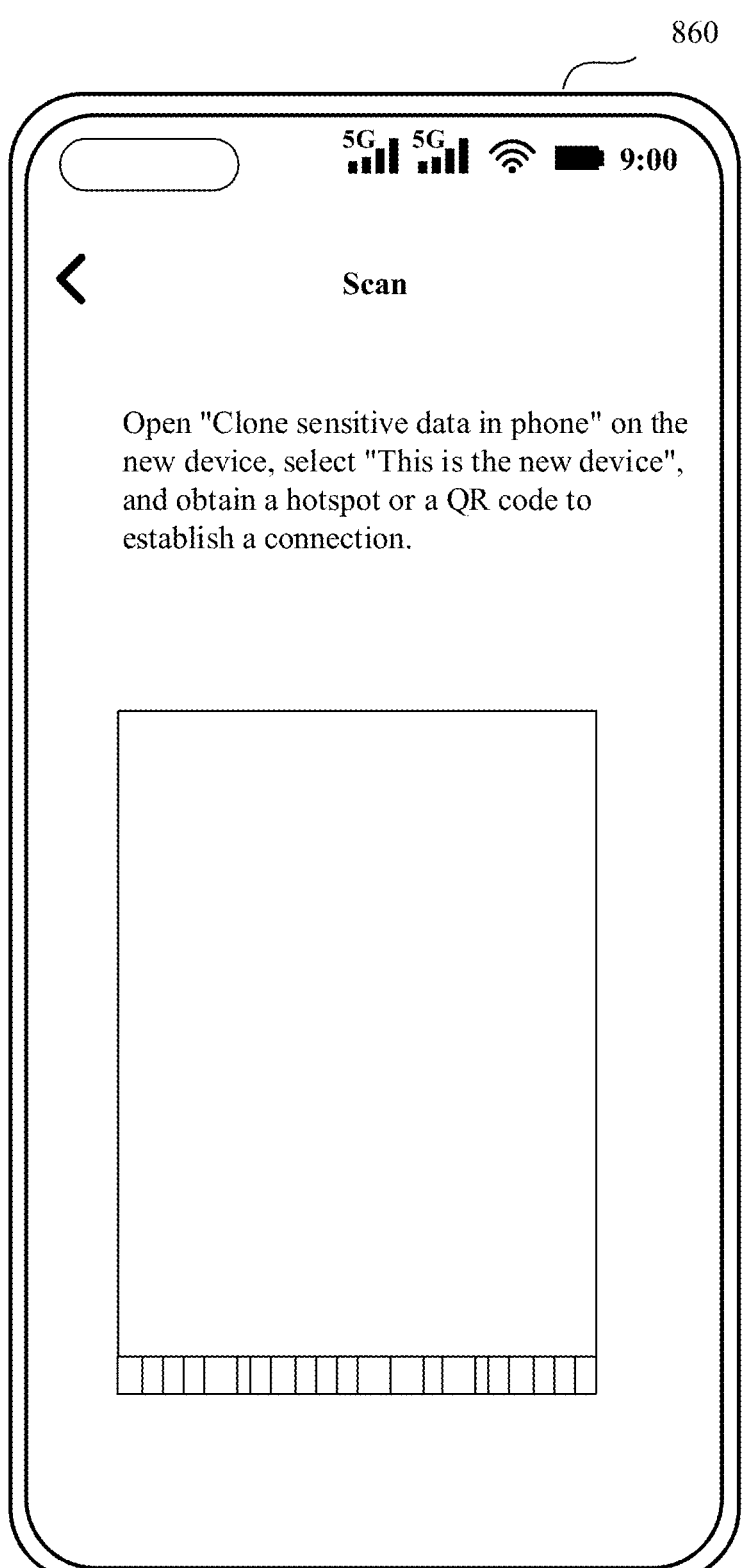

It is assumed that, in this case, the user performs an operation on the previous mobile phone according to a prompt, thereby entering a "Settings" interface. The mobile phone displays an interface 820 shown in FIG. 8C(a). After the user taps the "Clone sensitive data in phone" control 821, the mobile phone displays an interface 830 shown in FIG. 8C(b). After the user taps a "This is the previous device" control 832 in the user interface 830, the mobile phone displays an interface 860 shown in FIG. 8C(c). The user may establish a network connection to the new mobile phone by scanning a quick response code or in another manner.

Figure 8D:
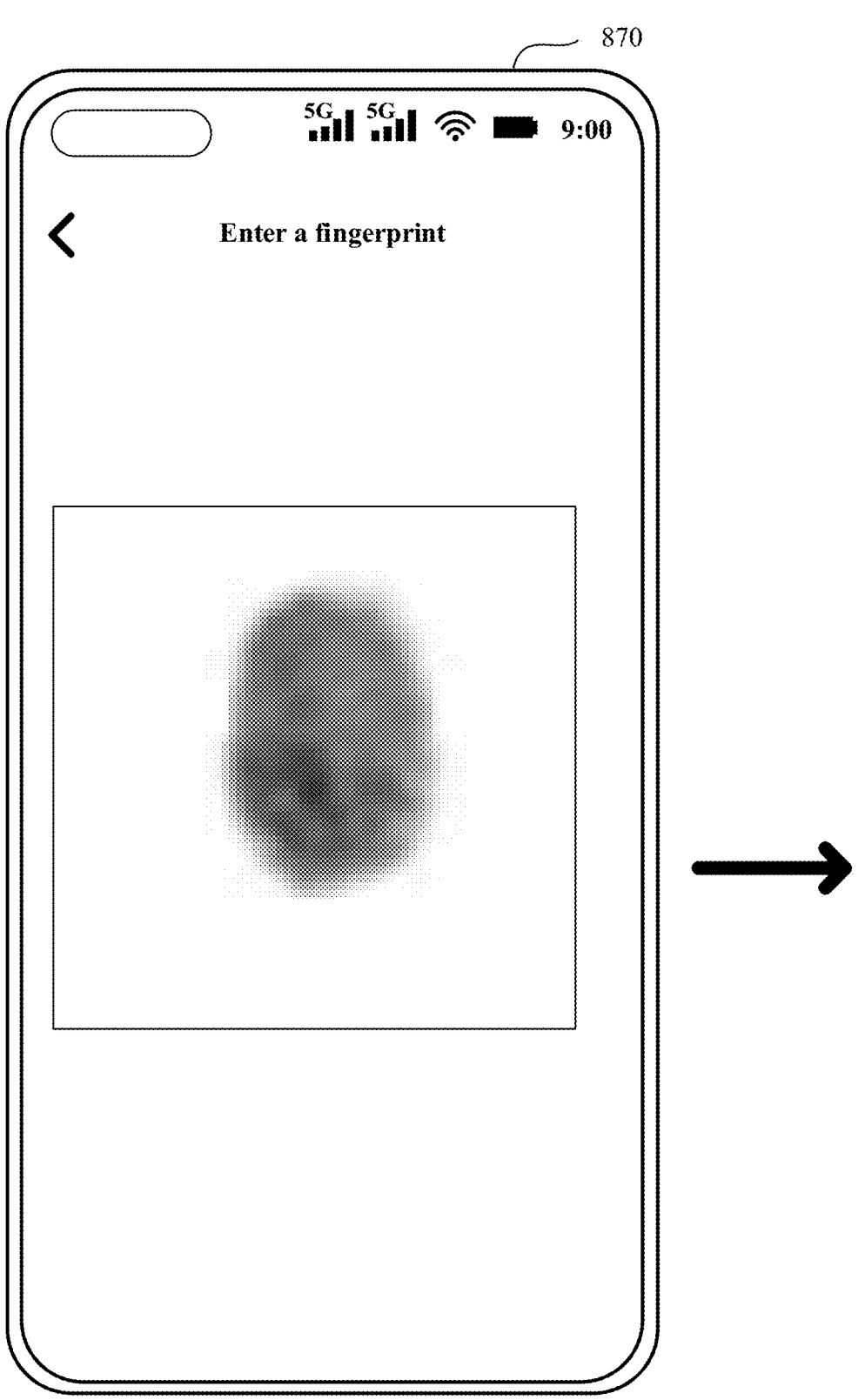
FIG. 8D(g) to FIG. 8D(i) are a schematic diagram of a further group of interfaces according to an embodiment of this application.
Figure 8D:
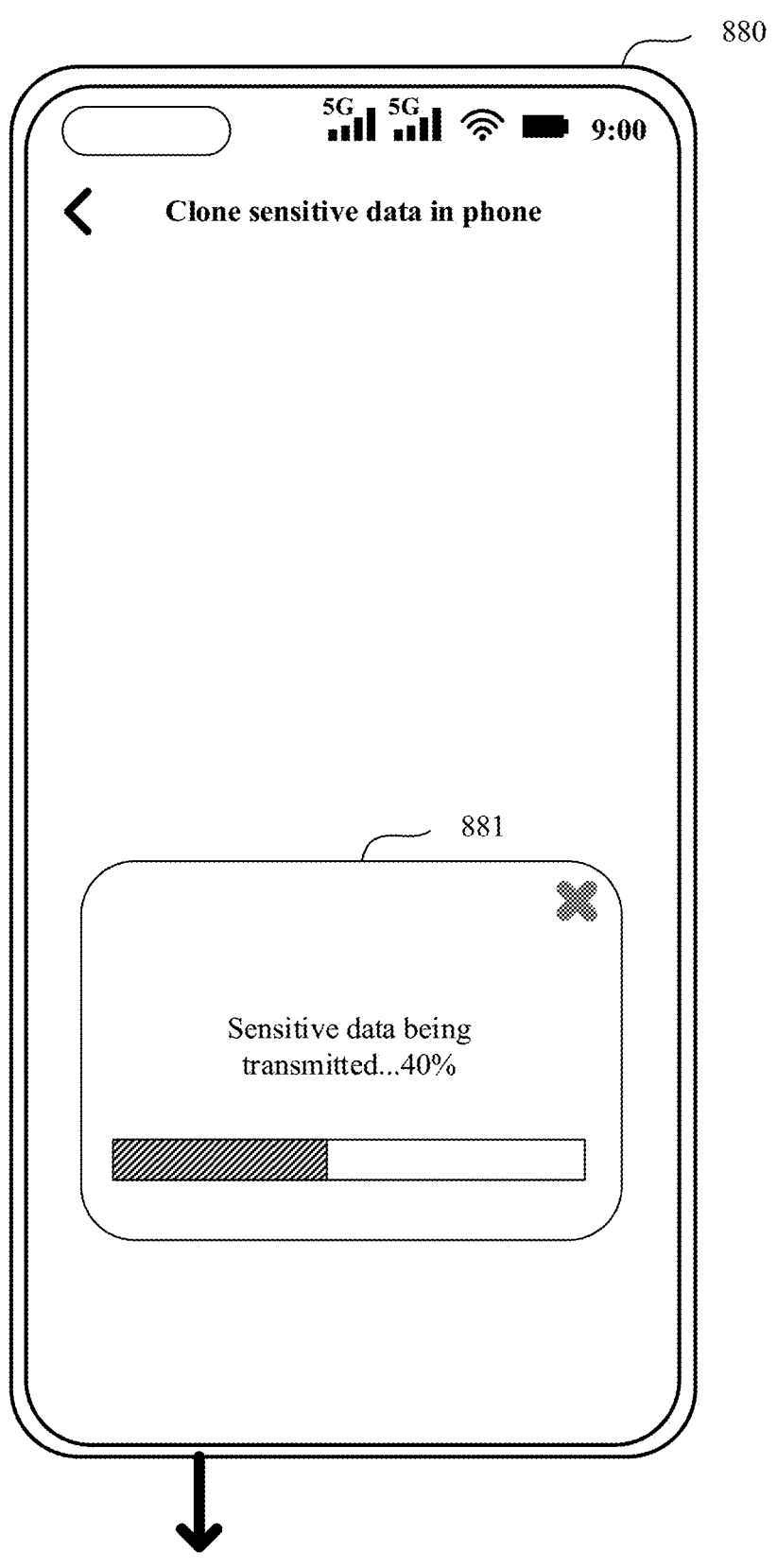
Figure 8D:
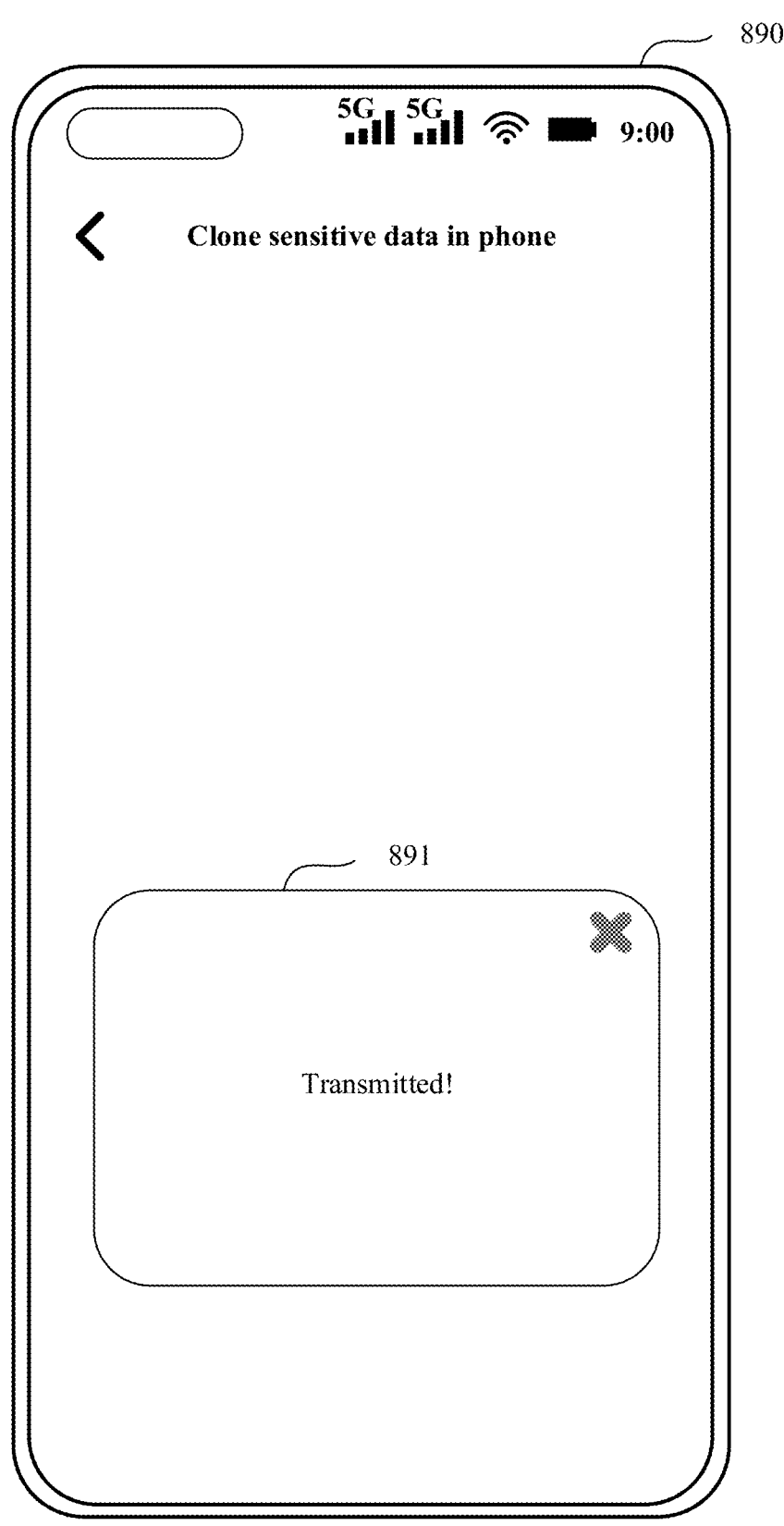

Assuming that the previous mobile phone successfully establishes a network connection to the new mobile phone, the new mobile phone displays an interface 870 shown in FIG. 8D(g), prompting the user to input a fingerprint for verification. Assuming that the new mobile phone receives the fingerprint input by the user, the new mobile phone sends the received fingerprint to the previous mobile phone. After the verification performed by the previous mobile phone on the fingerprint succeeds, the previous mobile phone transmits sensitive data associated with the fingerprint to the new mobile phone. For example, in a transmission process of the sensitive data, the new mobile phone may further display an interface 880 shown in FIG. 8D(h). The interface 880 includes a prompt box 881. The prompt box 881 is used to prompt the user that the sensitive data is being transmitted and display transmission progress information of the sensitive data. When transmission of the sensitive data is completed, the new mobile phone may further display an interface 890 shown in FIG. 8D(i). The interface 890 includes a prompt box 891. The prompt box 891 is used to prompt the user that the sensitive data has been transmitted completely.

In this embodiment, when a previous device is replaced with a new device, a first electronic device may receive a request from a second electronic device, where the request may include a biometric feature input by a user on the second electronic device. The first electronic device may perform authentication on the second electronic device by using a locally stored biometric feature. When the authentication succeeds, it may be determined that the second electronic device is a trusted device. The first electronic device may distribute sensitive data input by the user to the second electronic device, thereby implementing secure sharing of the sensitive data between the electronic devices. In addition, when a previous device is replaced with a new device, all sensitive data related to a user can be transmitted to the new device via one time of data transmission, thereby implementing "one-click device replacement" and improving user experience.

Embodiment 2

In addition, the data transmission method provided in this embodiment of this application is applicable to not only a scenario in which a previous device is replaced with a new device, but also cross-device transmission of sensitive data. This method can implement sharing of biometric feature data between devices while ensuring data security. In one aspect, a user does not need to repeat recording of the biometric feature data. In another aspect, an electronic device that does not have a collection capability is enabled to obtain the biometric feature data.

Referring to FIG. 9, an embodiment of this application provides a method for cross-device transmission of biometric feature data. The method mainly includes the following operations.

S901: In a pre-sharing phase, perform authentication between a first electronic device and a second electronic device.

This phase is mainly used to authenticate whether a peer device has a trusted execution environment and/or whether the trusted execution environment meets a specified security level. This phase is used to establish a secure transmission channel between the first electronic device and the second electronic device. For an example method for authenticating a trusted execution environment, refer to the foregoing embodiments. Details are not described herein again.

S902: In a data transmission phase, the first electronic device transmits encrypted biometric feature data to the second electronic device.

This phase is mainly used to: negotiate a session key that can be used when a constraint condition of a trusted environment is met; encrypt the biometric feature data by using the session key; and send the encrypted biometric feature data.

S903: In a post-sharing phase, the second electronic device uses the received biometric feature data according to a usage policy of the biometric feature data from the first electronic device.

This phase is mainly used to control the biometric feature data by the first electronic device by using information about the usage policy, so that after receiving the biometric feature data, the second electronic device uses the biometric feature data under a constraint condition of the information about the usage policy.

With reference to accompanying drawings, the following describes in detail a data transmission process by using three phases: the pre-sharing phase, the data transmission phase, and the post-sharing phase. In the following, that biometric feature data is the biometric feature data mainly used as an example for illustration.

Manner 1: The first electronic device receives a request from the second electronic device, and passively shares the biometric feature data.

FIG. 10 is a schematic flowchart of a data transmission method according to an embodiment of this application. The method includes the following operations.

S1001: The second electronic device sends a request message to the first electronic device, where the request message is used to request the biometric feature data.

Figure 11A:
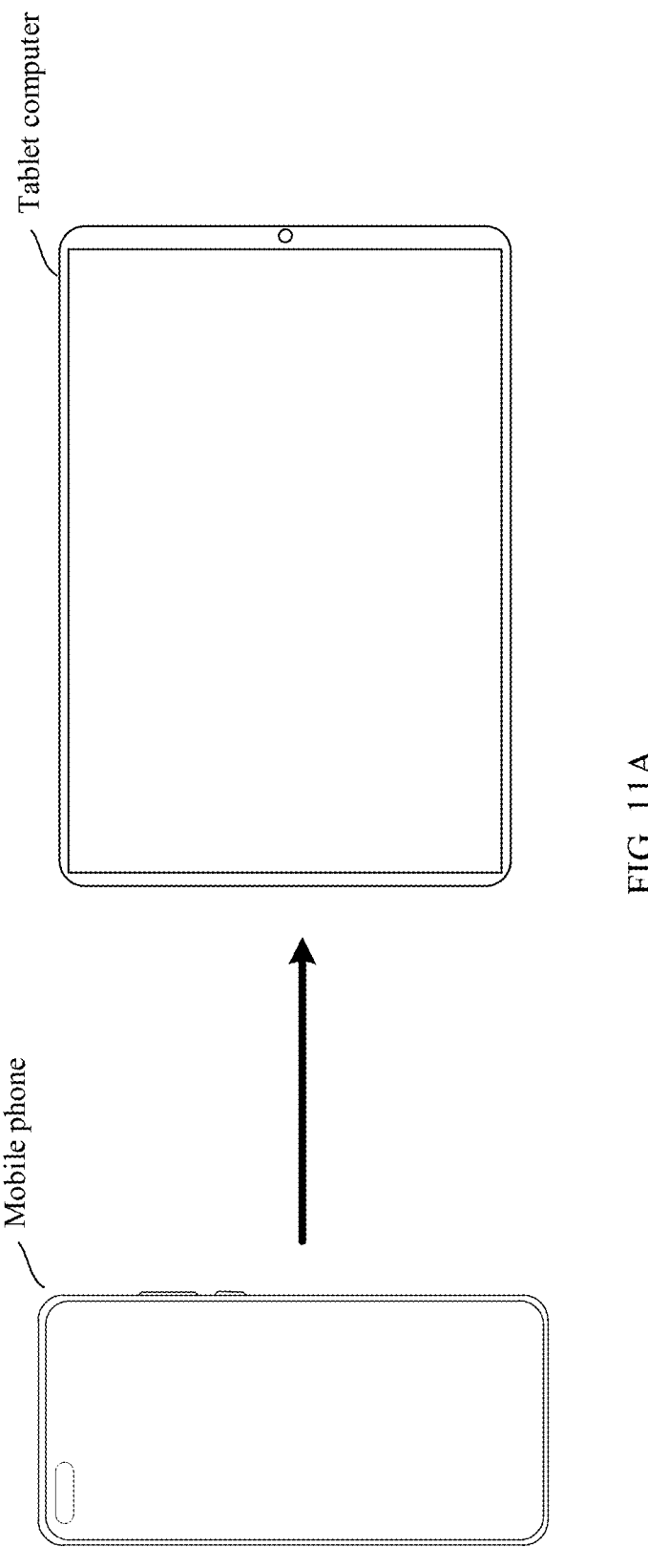
FIG. 11A is a schematic diagram of a data transmission scenario according to an embodiment of this application.

For example, as shown in FIG. 11A, the first electronic device is a mobile phone of a user, and the second electronic device is a tablet computer of the user. It is assumed that the mobile phone of the user stores a face of the user, but the tablet computer of the user does not store the face of the user. The tablet computer may request facial feature data of the user from the mobile phone, that is, send a facial feature obtaining request message to the mobile phone.

S1002: After receiving the request message, the first electronic device performs authentication on the second electronic device.

Specifically, in a possible embodiment, the first electronic device determines whether user accounts logging in to the second electronic device and the first electronic device are the same; or the first electronic device performs the authentication on the second electronic device by using an authentication request message; or the first electronic device determines whether the second electronic device is in a whitelist device list. Alternatively, it should be understood according to the foregoing manner that, the first electronic device may perform security authentication in a plurality of existing manners, such as password-based authentication and biometric recognition-based authentication. This is not limited in this application.

S1003: After the authentication succeeds, the first electronic device sends the biometric feature data to the second electronic device.

Specifically, after the authentication performed by the first electronic device succeeds, the first electronic device sends an authentication success response message to the second electronic device. After the authentication performed by the first electronic device fails, the first electronic device sends an authentication failure response message to the second electronic device.

Figure 11B:
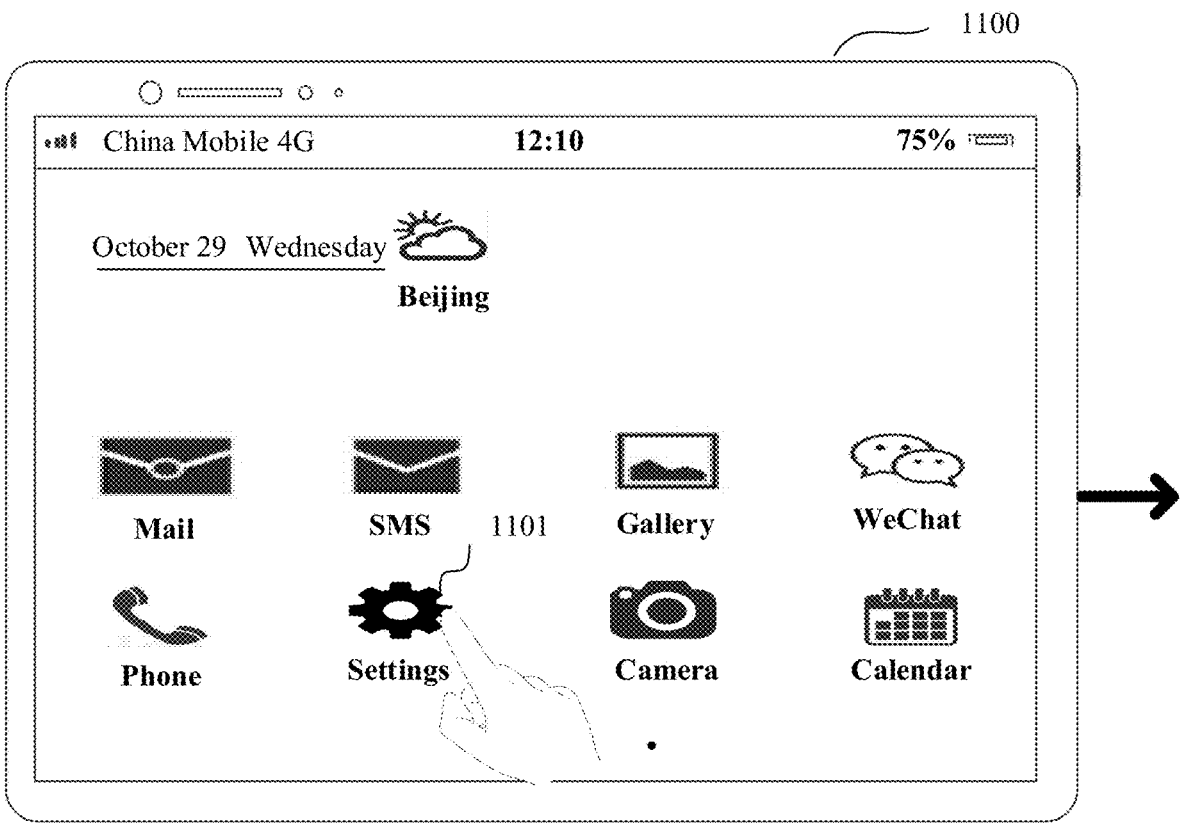
FIG. 11B(a) to FIG. 11B(f) are a schematic diagram of a still further group of interfaces according to an embodiment of this application.
Figure 11B:
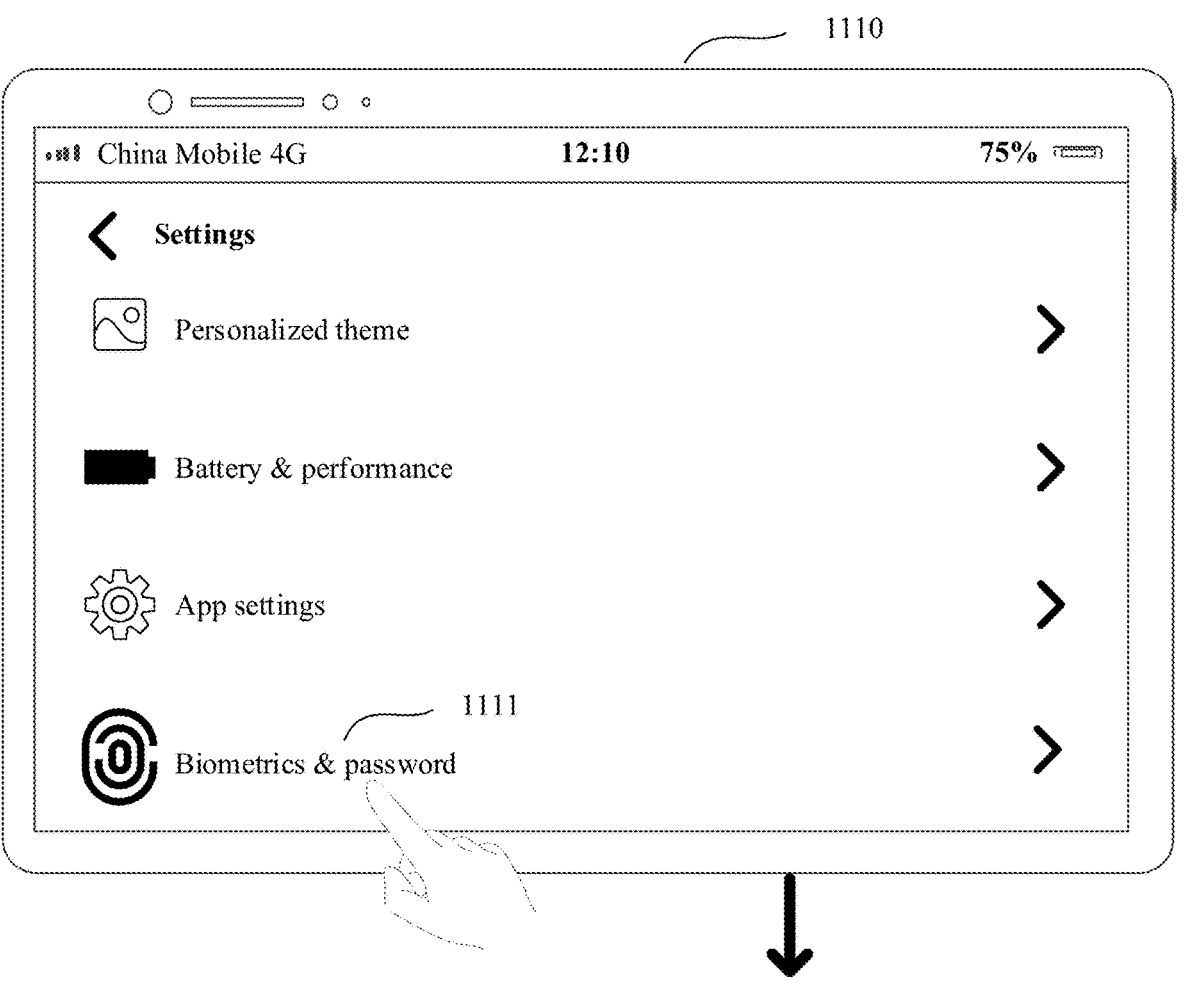
Figure 11B:
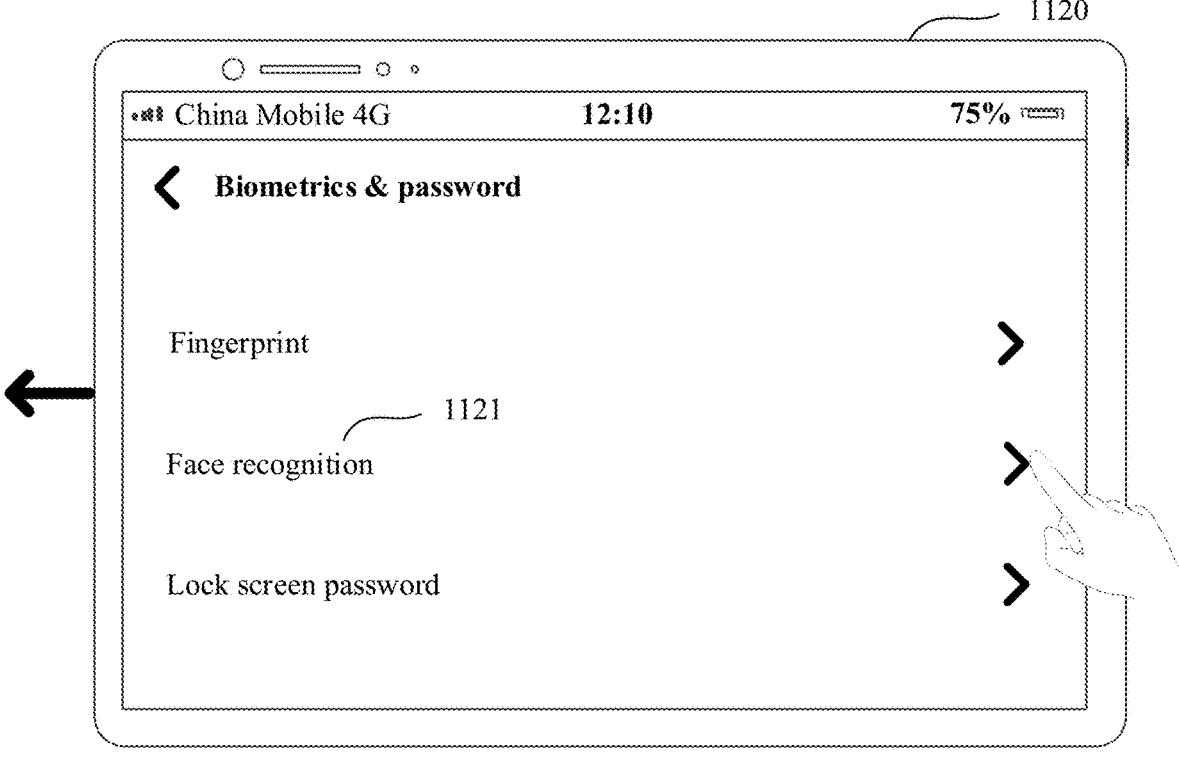
Figure 11B:
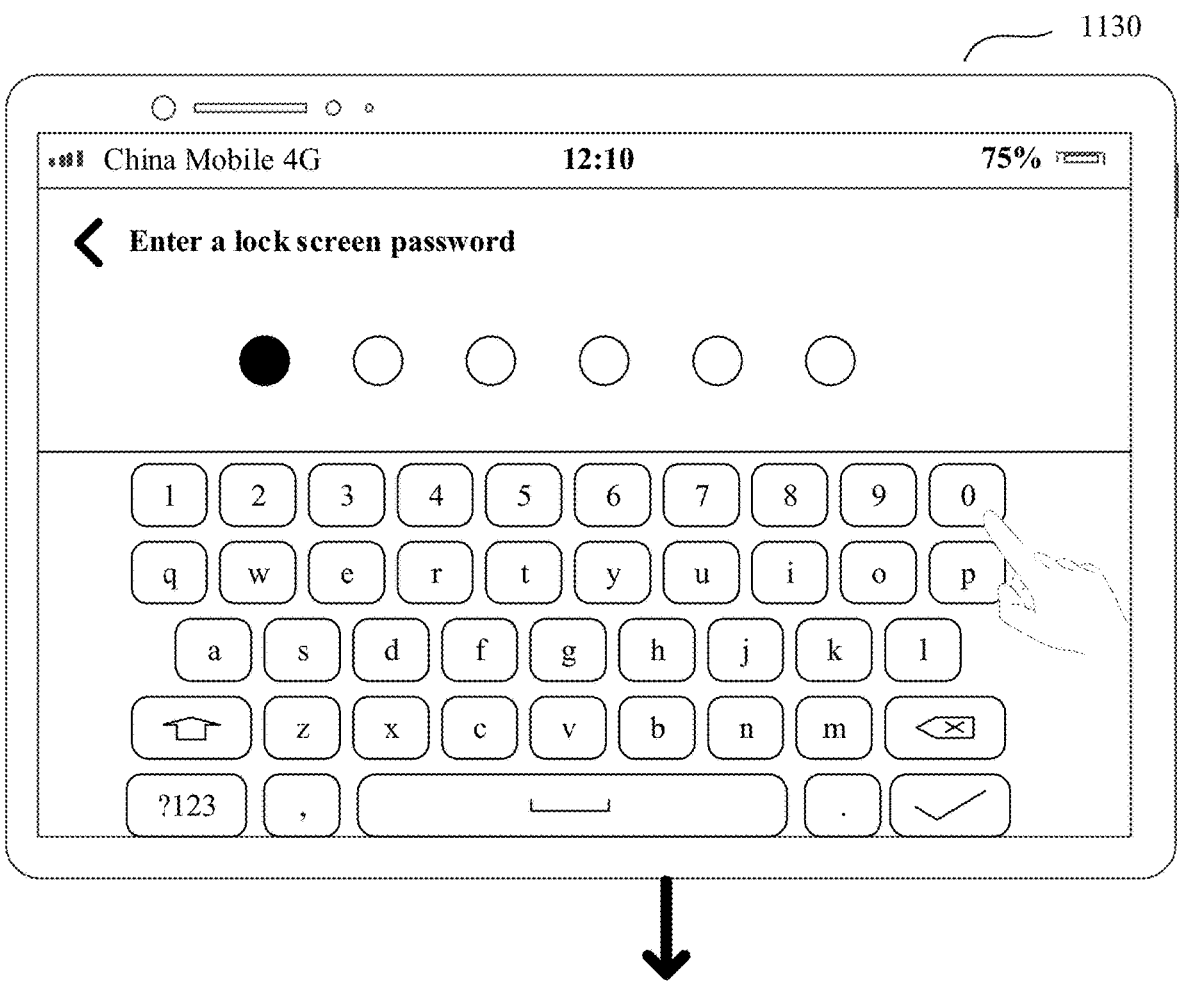
Figure 11B:
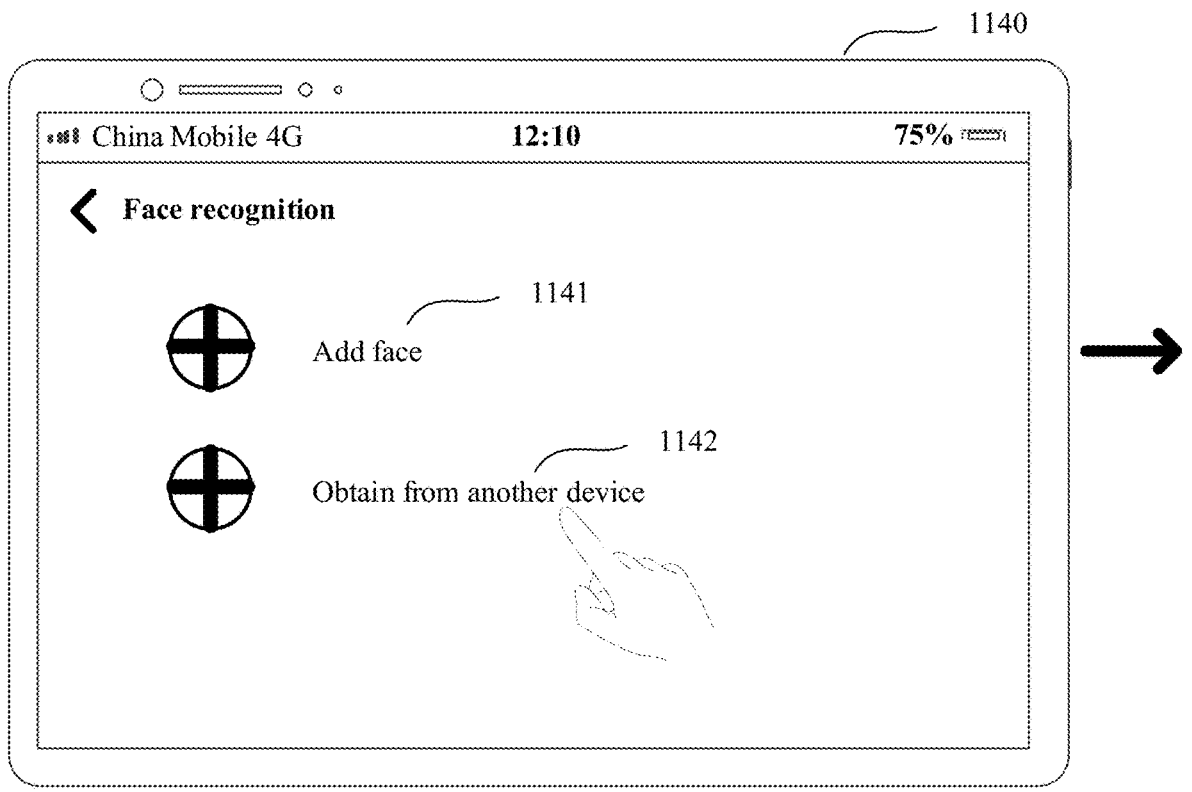
Figure 11B:
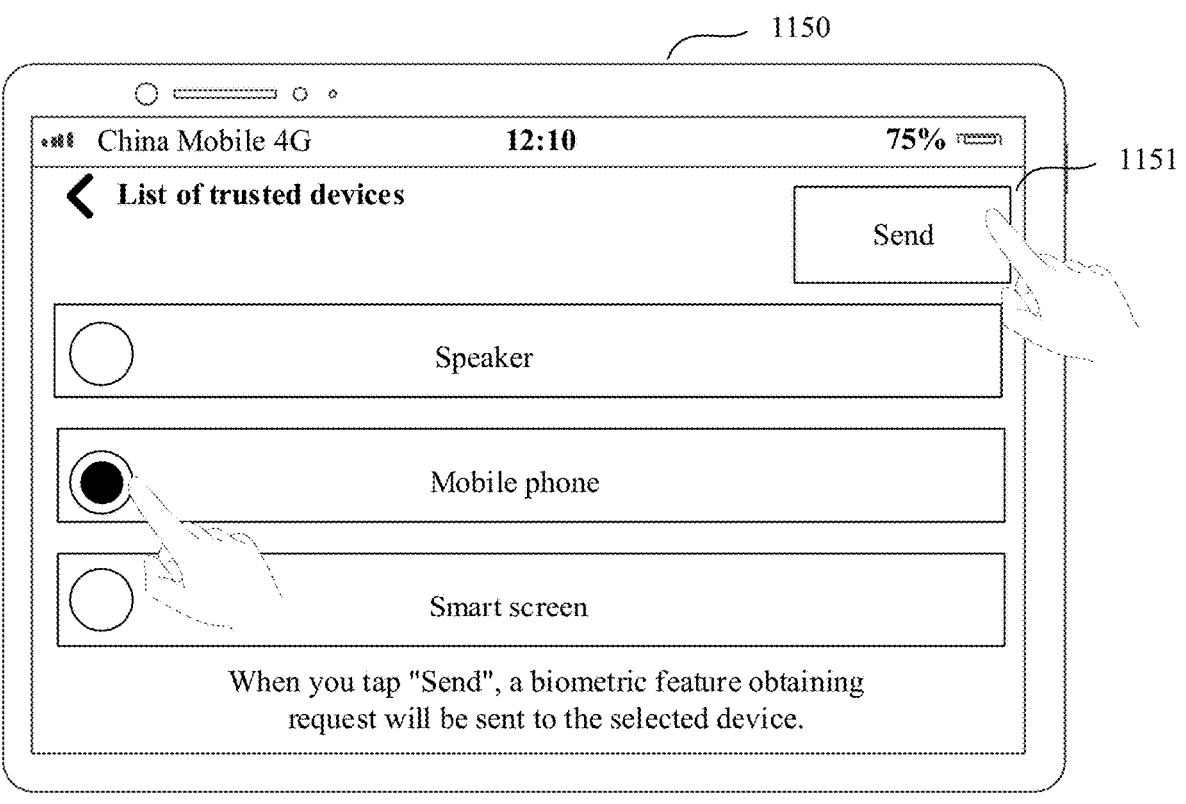

For example, the first electronic device is a mobile phone, and the second electronic device is a tablet computer. Referring to FIG. 11B(a), a user interface 1100 of the second electronic device is a desktop of the tablet computer of the user. The desktop of the tablet computer of the user includes applications such as Phone, Gallery, WeChat®, Album, Weather, Calendar, and Settings. After detecting an operation performed by the user on the "Settings" control 1101, the tablet computer may display a user interface 1110 shown in FIG. 11B(b). Referring to FIG. 11B(b), the user interface 1110 is a display interface for setting applications. The user interface 1110 displays a plurality of setting items, including a "Biometrics & password" control 1111. After detecting an operation performed by the user on the "Biometrics & password" control 1111, the tablet computer may display a user interface 1120 shown in FIG. 11B(c). The user interface 1120 is a display interface of a setting item: "Biometrics & password". When the user taps a "Face recognition" control 1121, the tablet computer detects an operation performed by the user on the "Face recognition" control 1121, and displays a user interface 1130 shown in FIG. 11B(d). After the user correctly enters a lock screen password, and verification performed by the tablet computer on the lock screen password succeeds, the tablet computer displays a user interface 1140 shown in FIG. 11B(e). The user interface 1140 includes two menu items: an "Add face" control 1141 and an "Obtain from another device" control 1142. When the user chooses "Obtain from another device", the tablet computer detects an operation performed by the user on the "Obtain from another device" control 1142, and the tablet computer displays a user interface 1150 shown in FIG. 11B(f). The user interface 1150 includes a list of devices that can be selected. The user may tap a "Send" control 1151 after selecting a mobile phone. In this case, the tablet computer sends a request message to the mobile phone. The request message further includes a request of the tablet computer for facial feature data from the mobile phone.

Figure 11C:
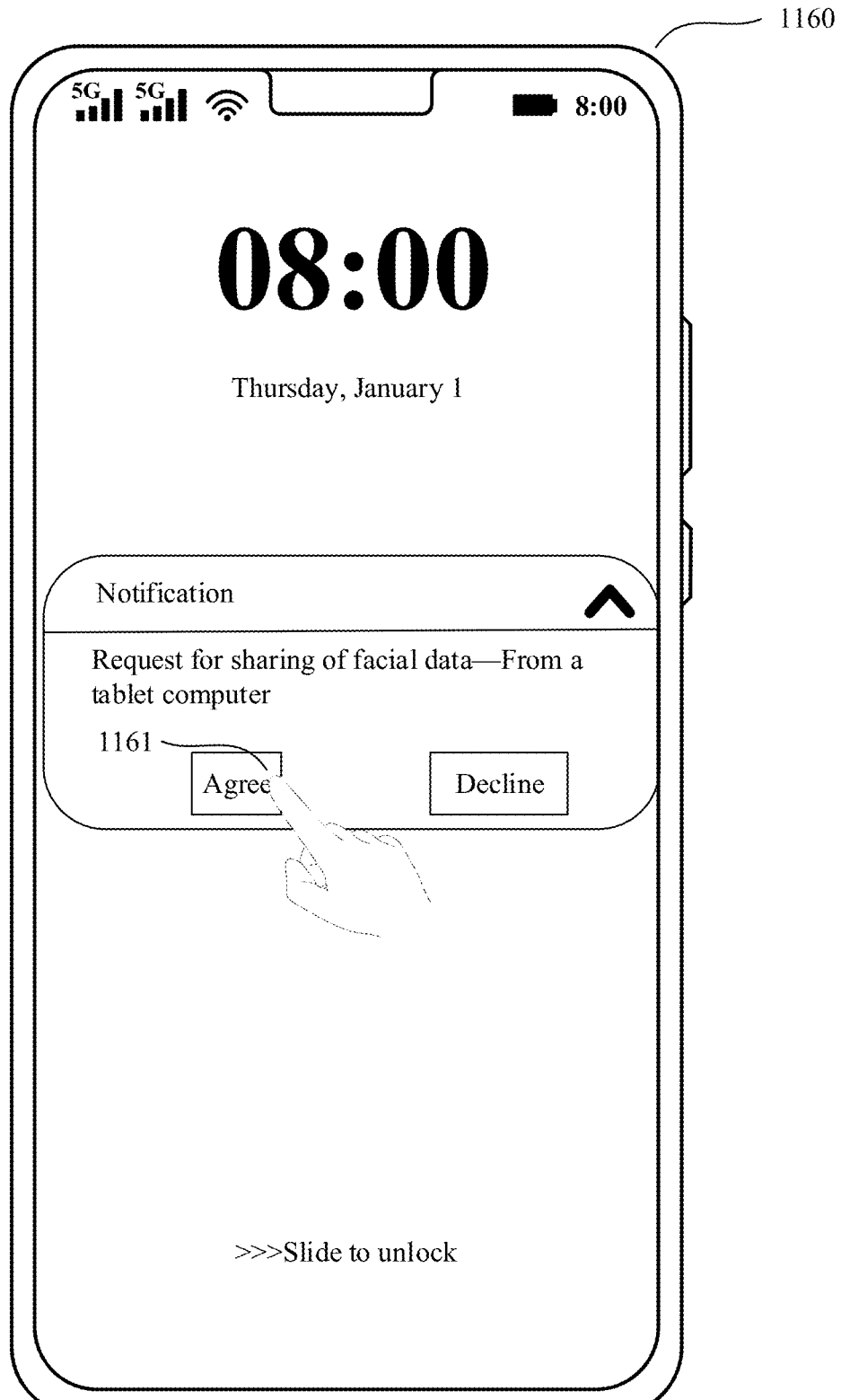
FIG. 11C is a schematic diagram of a yet further group of interfaces according to an embodiment of this application.

Referring to FIG. 11C, the mobile phone may display a notification message shown in FIG. 11C. The notification message is used to notify the user that the tablet computer requests sharing of facial data. When the user agrees, the user may tap an "Agree" control 1161. The mobile phone may detect a confirmation operation of the user, and then send the facial data stored in the mobile phone to the tablet computer. In addition, if the mobile phone stores facial data of a plurality of users, the user may further select facial data of the user and send the facial data to the tablet device.

In another possible embodiment, the first electronic device and the second electronic device perform interactive authentication. For example, referring to FIG. 11C, to ensure that users operating the tablet computer and the mobile phone are a same person, the tablet computer may further collect a biometric feature (for example, a fingerprint) of a user of a current operation, and then add the collected biometric feature of the user of the current operation to an authentication request message that is to be sent to the mobile phone. After receiving the authentication request message, the tablet computer further may invoke a biometric feature template, performs authentication on the biometric feature in the authentication request message, and sends the facial data to the tablet computer only after the authentication succeeds. In this way, a biometric feature on the first electronic device can be prevented from being shared with an unauthorized device, to ensure security of the biometric feature. In other words, a biometric feature can be migrated from one terminal of a user to another terminal of the user.

It should be noted that, in a possible embodiment, the first electronic device and the second electronic device may alternatively establish a trusted connection by scanning quick response codes of each other, or establish a trusted connection in manners such as touch. This method can ensure security of a biometric feature in a transmission process, that is, the biometric feature is protected from being disclosed, tampered with, or intercepted. Specifically, a trusted connection may be established by using a shared secret-based public cryptographic algorithm protocol such as PAKE and SRP. For the public cryptographic algorithm protocol, reference may be made to an existing technology. Details are not described herein.

Manner 2: The first electronic device receives an operation of a user, and sends the biometric feature data of the first electronic device to the second electronic device.

Figure 12:
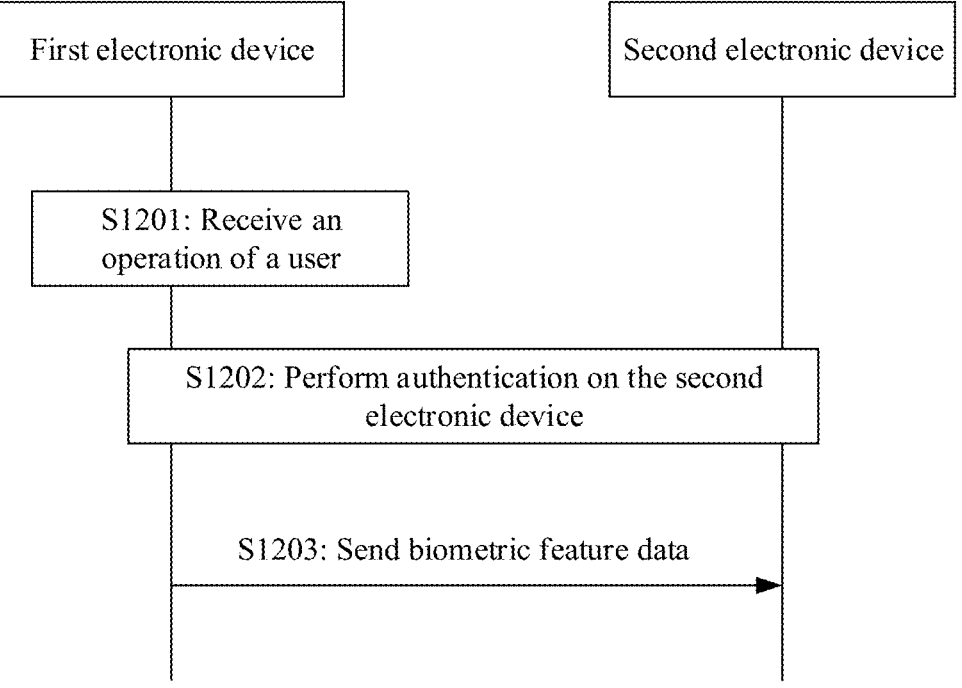
FIG. 12 is a schematic diagram of a data transmission method according to an embodiment of this application.

FIG. 12 is a schematic flowchart of a data transmission method according to an embodiment of this application. The method includes the following operations.

S1201: The second electronic device receives an operation of a user, and determines to-be-transmitted biometric feature data and a second electronic device according to the operation of the user.

For example, as shown in FIG. 11A, the first electronic device is a mobile phone of the user, and the second electronic device is a tablet computer of the user. It is assumed that the mobile phone of the user stores a face of the user, but the tablet computer of the user does not store the face of the user. The user may operate the mobile phone, that is, the user sends an instruction to the mobile phone, to instruct the mobile phone to send facial feature data of the user to the tablet computer.

Manner 1: The first electronic device receives to-be-shared data selected by the user from a displayed to-be-shared data list. In some embodiments, the first electronic device may detect a gesture operation of the user on a display. In this way, the first electronic device may select to to-be-share data according to the detected gesture operation. For example, when detecting a gesture operation performed by the user for selecting to-be-shared data, the first electronic device generates a to-be-shared data selection instruction, and determines the to-be-shared data according to the to-be-shared data selection instruction.

Manner 2: The first electronic device selects to-be-shared data from a displayed to-be-shared data list according to an instruction of the another device, and determines the to-be-shared data. In some embodiments, after receiving a data sharing request sent by the second electronic device, the first electronic device determines the to-be-shared data according to to-be-shared data information carried in the data sharing request. For example, in a communications system, the second electronic device may be a newly deployed device. Therefore, there is no to-be-shared data in the second electronic device. In this case, if the user is to perform a service on the second electronic device by using the to-be-shared data, the user may record the to-be-shared data on the second electronic device again, resulting in a complex process. Therefore, the second electronic device may request the to-be-shared data from the first electronic device.

Manner 3: The first electronic device selects to-be-shared data from a displayed to-be-shared data list according to a specified to-be-shared data selection rule. In some embodiments, when some data stored in the first electronic device is continuously updated, the first electronic device may determine, after the data is updated, that the data is to-be-shared data, and determine, at a specified moment, that the data is to-be-shared data, or periodically determine that the data is to-be-shared data. For example, during daily use, the first electronic device may collect user's voice in a real-time manner to optimize voiceprint data, thereby obtaining more accurate voiceprint data and further achieving a better voice authentication effect. Therefore, the first electronic device may periodically determine collected user's voiceprint data as to-be-shared data.

S1202: After receiving a request message, the first electronic device performs authentication on the second electronic device.

Specifically, in a possible embodiment, the first electronic device determines whether user accounts logging in to the second electronic device and the first electronic device are the same; or the first electronic device performs the authentication on the second electronic device by using an authentication request message; or the first electronic device determines whether the second electronic device is in a whitelist device list. Alternatively, it should be understood according to the foregoing manner that, the first electronic device may perform security authentication in a plurality of existing manners, such as password-based authentication and biometric recognition-based authentication. This is not limited in this application.

S1203: After the authentication succeeds, the first electronic device sends the biometric feature data to the second electronic device.

Specifically, after the authentication performed by the first electronic device succeeds, the first electronic device sends an authentication success response message to the second electronic device. After the authentication performed by the first electronic device fails, the first electronic device sends an authentication failure response message to the second electronic device.

In a possible embodiment, if a receiving device passively receives a feature template, the receiving device may first perform authentication on a transmit end, to avoid receiving data from an unauthorized device and avoid affecting security of the receiving device. An authentication manner is, for example, entering a verification code or a lock screen password of the transmit end for authentication.

Figure 13A:
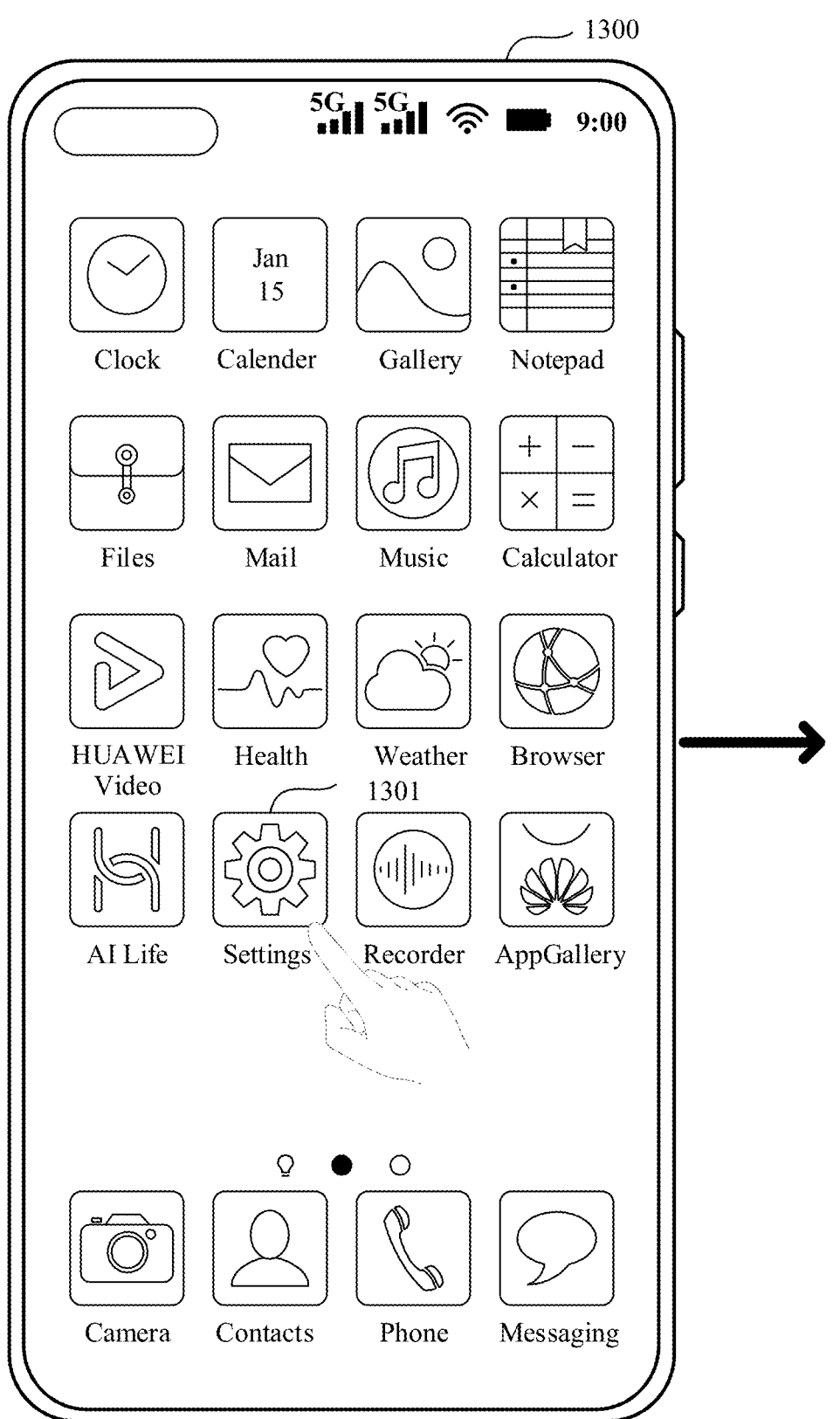
FIG. 13A(a) to FIG. 13A(d) are a schematic diagram of a still yet further group of interfaces according to an embodiment of this application.
Figure 13A:
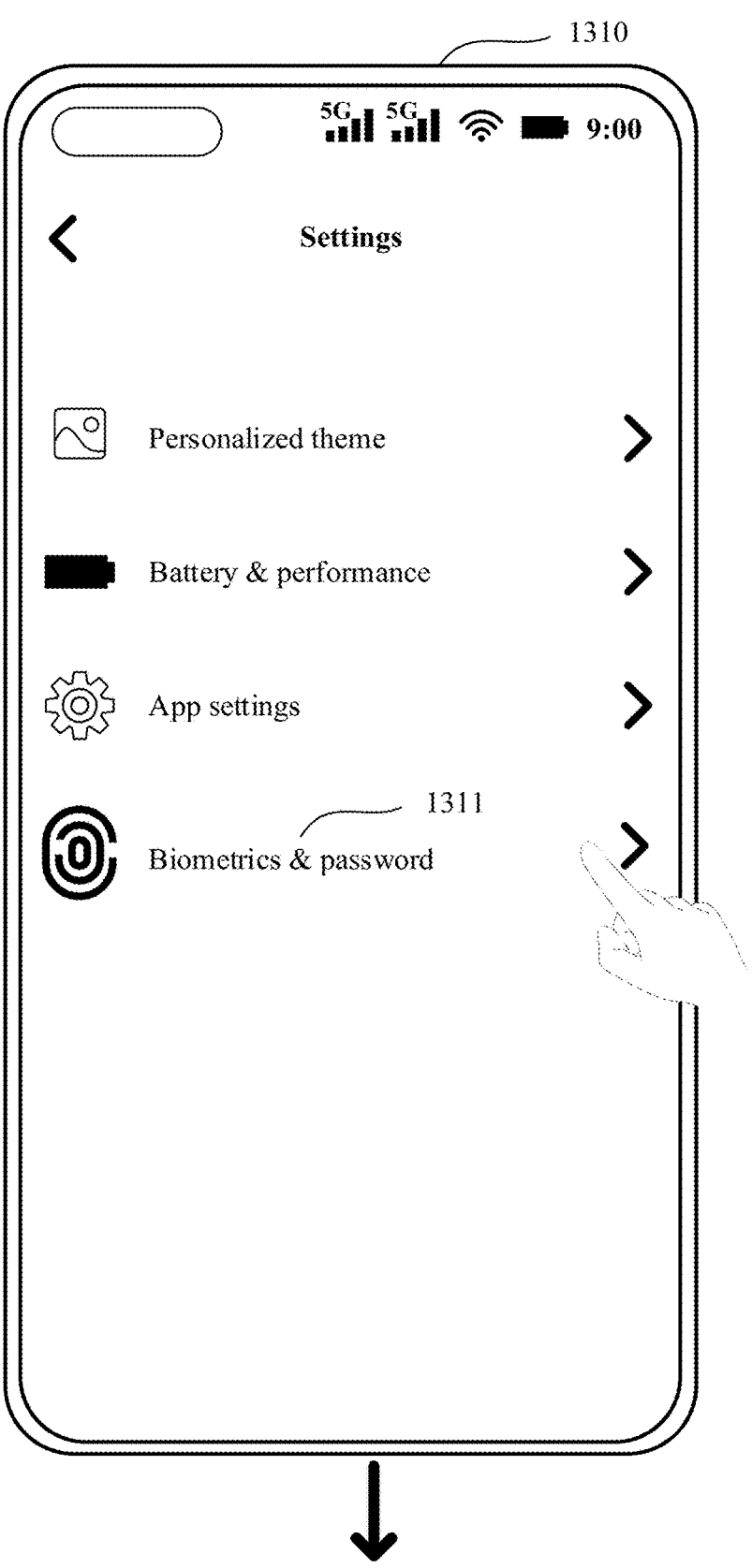
Figure 13A:
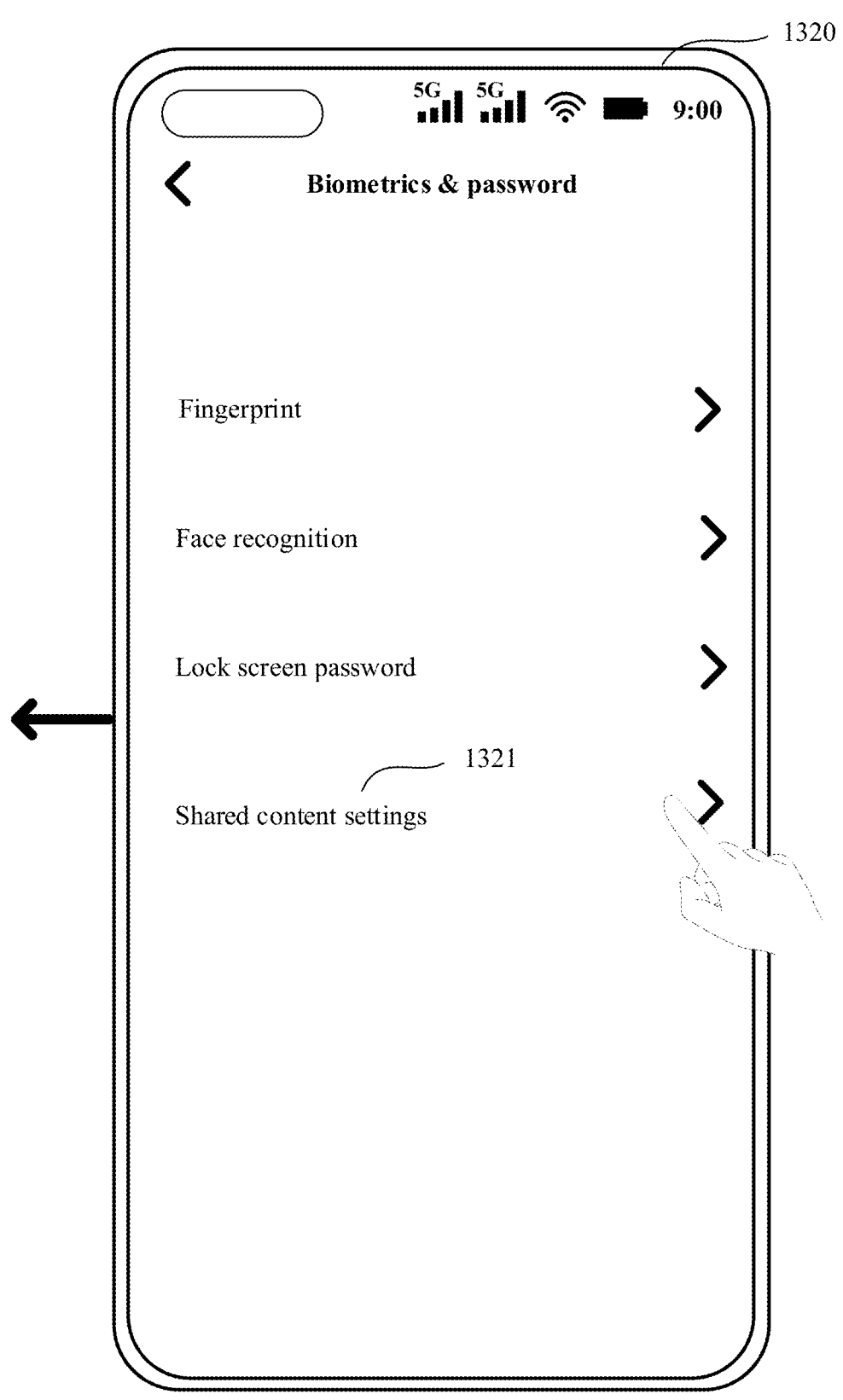
Figure 13A:
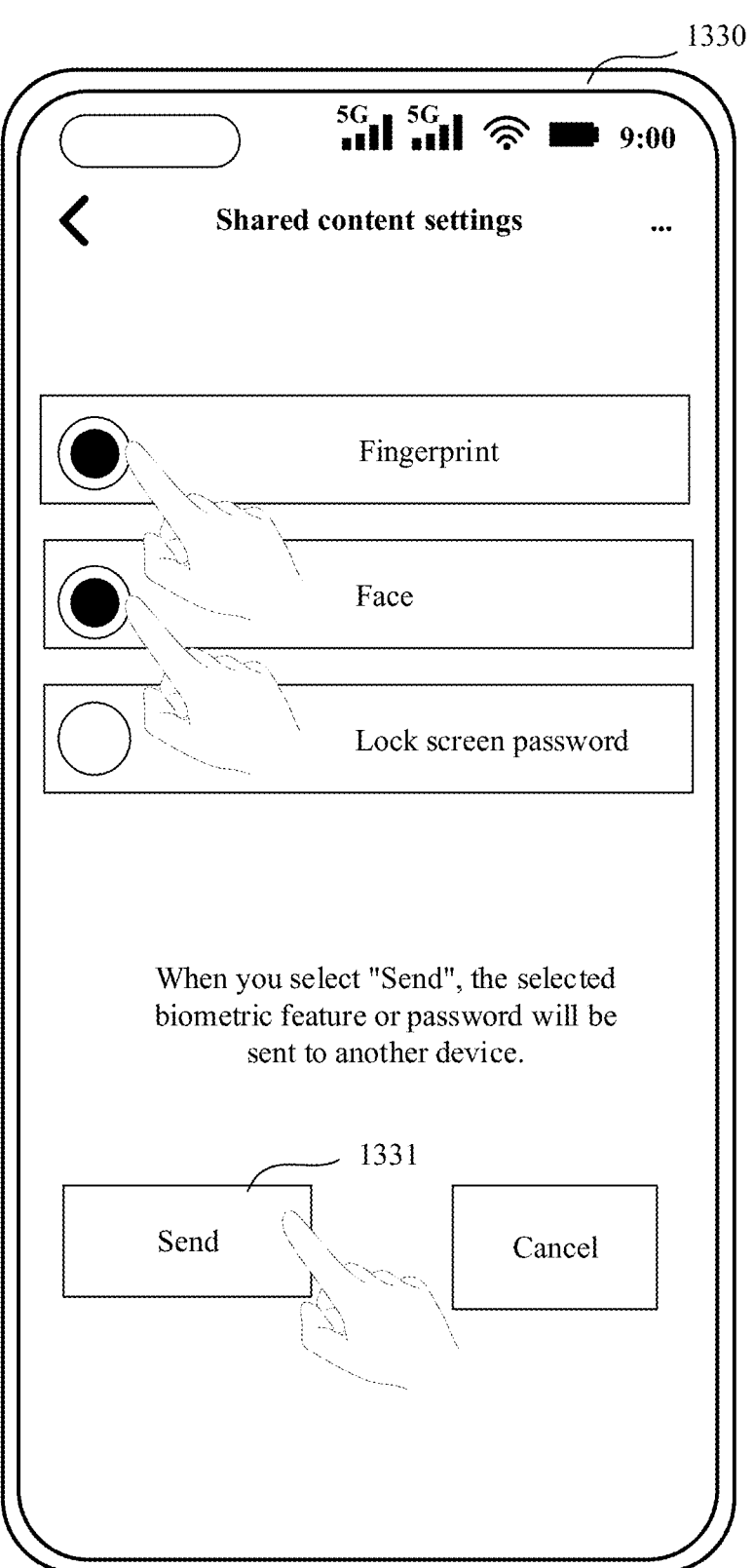
Figure 13B:
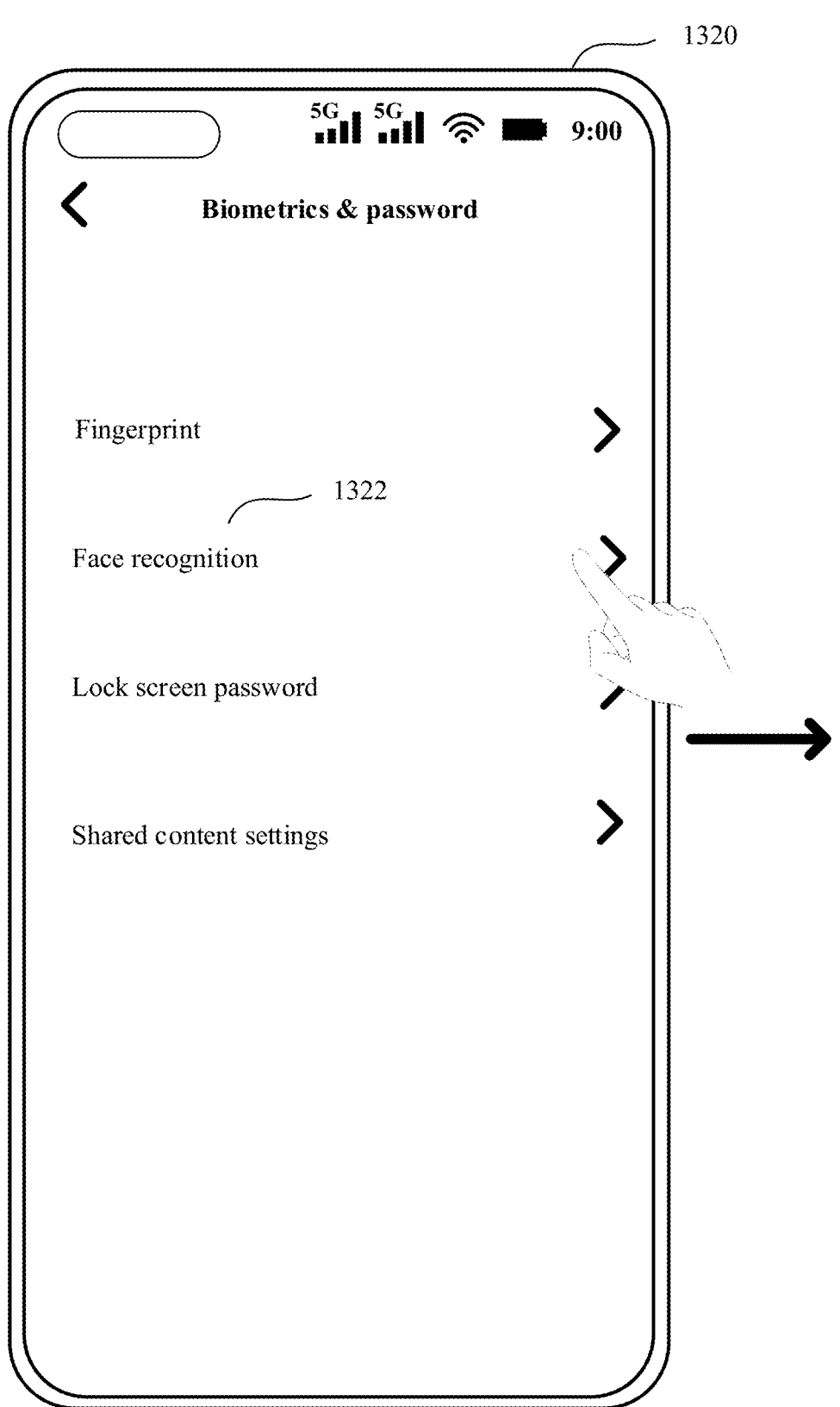
FIG. 13B(a) to FIG. 13B(c) are a schematic diagram of even yet another group of interfaces according to an embodiment of this application.
Figure 13B:
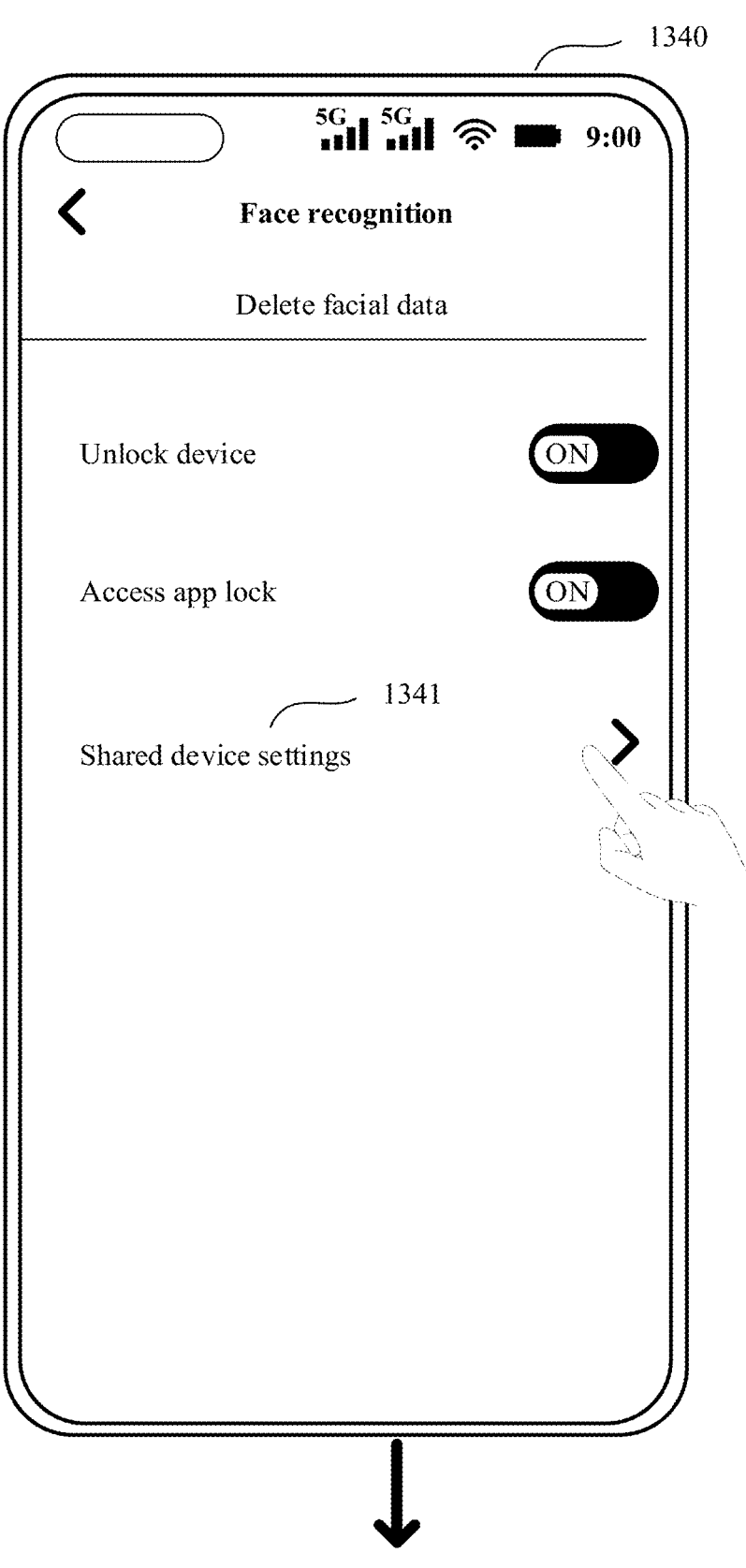
Figure 13B:
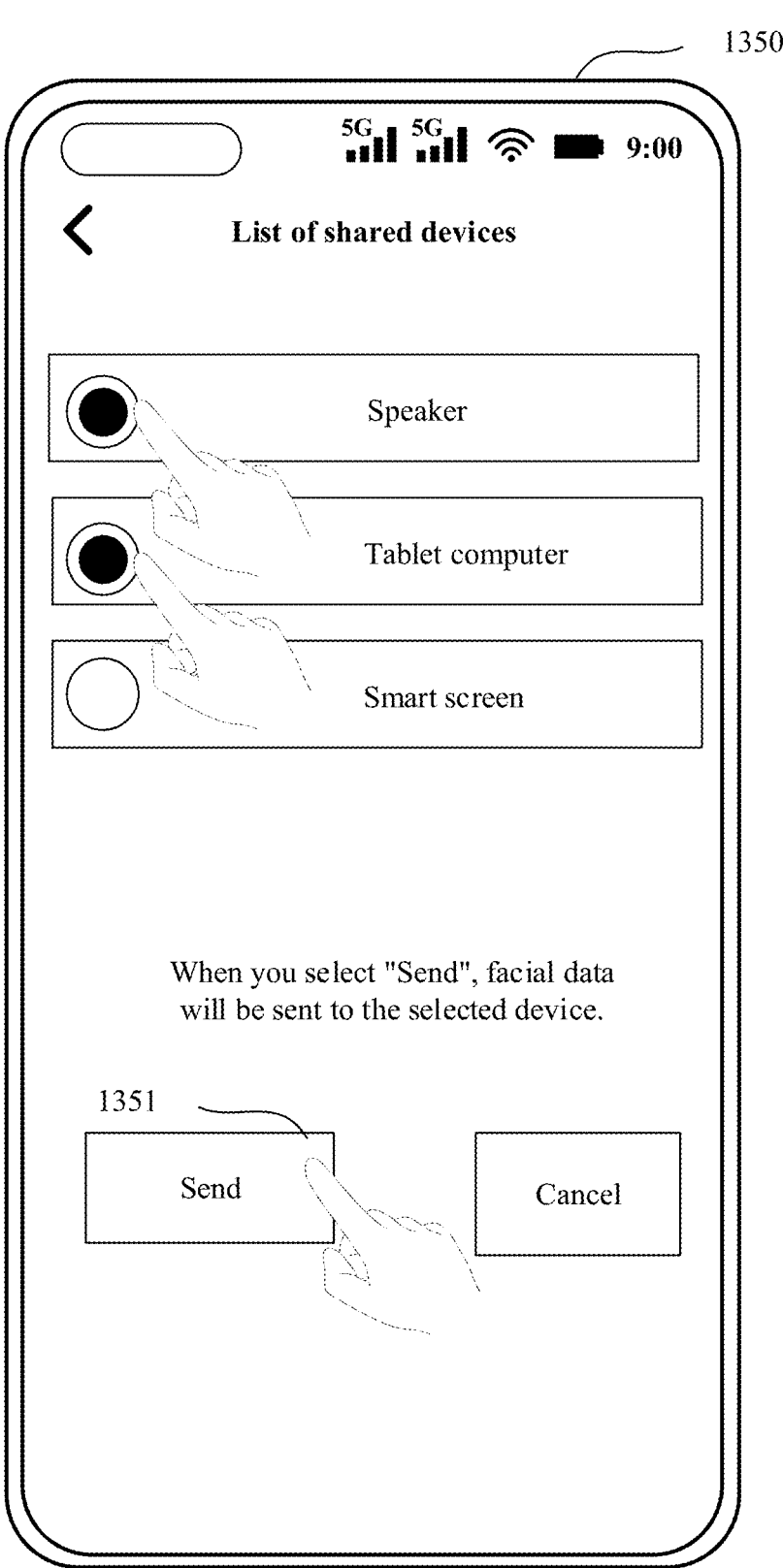

For example, the first electronic device is a mobile phone, and the second electronic device is a tablet computer. Referring to FIG. 13A(a), a user interface 1300 of the first electronic device is a desktop of the mobile phone of the user. The desktop of the mobile phone of the user includes applications such as Phone, Gallery, WeChat®, Album, Weather, Calendar, and Settings. After detecting an operation performed by the user on the "Settings" control 1301, the mobile phone may display a user interface 1310 shown in FIG. 13B(b). Referring to FIG. 13B(b), the user interface 1310 is a display interface for setting applications. The user interface 1310 displays a plurality of setting items, including a "Biometrics & password" control 1311. After detecting an operation performed by the user on the "Biometrics & password" control 1311, the mobile phone may display a user interface 1320 shown in FIG. 13B(c). The user interface 1320 is a display interface of a setting item: "Biometrics & password". When the user taps a "Shared content settings" control 1321, the mobile phone detects an operation performed by the user on the "Shared content settings" control 1321, and displays a user interface 1330 shown in FIG. 13B(d). When the user selects "Fingerprint" and "Face", and taps the "Send" control 1331, and the mobile phone detects the operation of the user, the mobile phone may send feature data of a fingerprint and a face to a connected tablet computer. For another example, the user may further select, on the first electronic device, a receiving device for the data. For example, the mobile phone displays a user interface 1320 shown in FIG. 13B(a). The user interface 1320 is a display interface of a setting item: "Biometrics & password". When the user taps a "Face recognition" control 1322, the mobile phone detects the operation performed by the user on the "Face recognition" control 1322, and displays a user interface 1340 shown in FIG. 13B(b). When detecting an operation performed by the user on a "Sharing device settings" control 1341, the mobile phone displays a user interface 1350 shown in FIG. 13B(c). When the user selects "Speaker" and "Tablet device" and taps a "Send" control 1351, the mobile phone sends a fingerprint and a face to a speaker and a tablet device.

Figure 14:
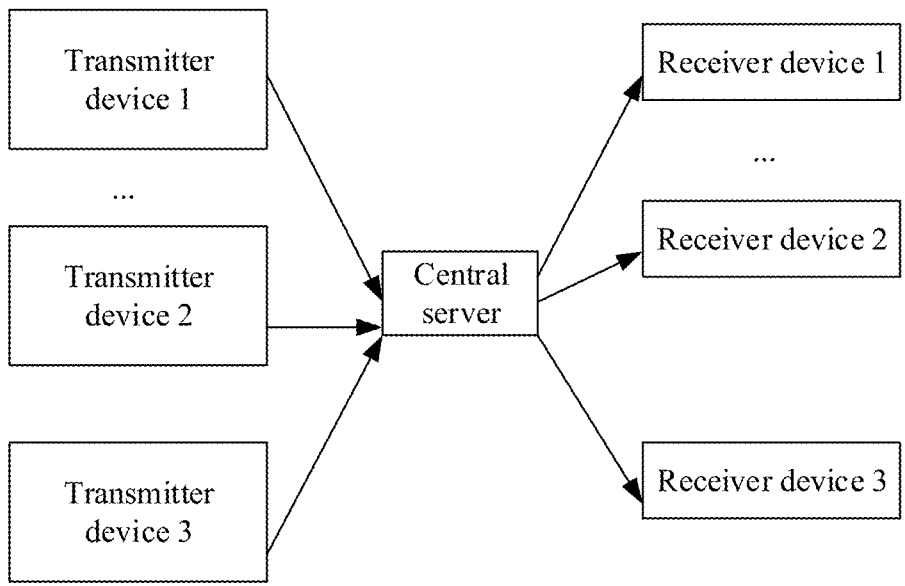
FIG. 14 is a schematic diagram of a distributed system based on a central server according to an embodiment of this application.

In addition, it should be noted that, in addition to the foregoing end-to-end architecture, sharing of biometric feature data is also applicable to a distributed structure that is served by a central server. For example, as shown in FIG. 14, a transmitter device 1, a transmitter device 2, and a transmitter device 3 share biometric feature data to the central server in the foregoing manner, and a receiver device 1, a receiver device 2, and a receiver device 3 obtain required biometric feature data from the central server as required. It should be noted that the central server in FIG. 14 is a virtual role, and may be a fixed device (for example, a smart television, a router, or a speaker), or may be a mobile phone, a tablet, or the like.

In a possible embodiment, in addition to sending the sensitive data to the second electronic device, the first electronic device further sends usage policy information of the sensitive data to the second electronic device. In a possible embodiment, the usage policy information is used to indicate an authorized service of the sensitive data. The authorized service is a service that can be executed by a device by using the sensitive data. In another possible embodiment, the usage policy information is used to indicate an unauthorized service of the sensitive data. The unauthorized service is a service that is not allowed to be executed by a device by using the sensitive data. In still another possible embodiment, the usage policy information is used to indicate an authorized service of the sensitive data and an unauthorized service of the sensitive data. For an example, refer to Embodiment 1.

In another possible embodiment, the first electronic device associates the biometric feature data with specified user information. In addition to sending the biometric feature data to the second electronic device, the first electronic device further sends the associated user information to the second electronic device. In other words, usage permission or authorized services of biometric feature data on different devices are not directly distinguished, but a biometric feature usage policy is subject to a permission range of a user corresponding to the user information.

TABLE 1

| User ID | Biometric feature template ID | Device | Executable service |
|---|---|---|---|
| User A | Biometric feature template ID1 | First electronic device | Payment Video playback service |

TABLE 2

| User ID | Biometric feature template ID | Device | Executable service |
|---|---|---|---|
| User A | Biometric feature template ID1 | First electronic device | Payment Video playback service |
| | Biometric feature template ID1 | Second electronic device | Payment Video playback service |

In Table 1, the biometric feature template ID1 on the first electronic device is associated with the user A. Services that can be performed by the user A include a payment service and a video playback service. Therefore, after the first electronic device sends a biometric feature template ID to the second electronic device, in Table 2, the second electronic device determines, according to user information in a message, that the services that can be performed by the user A include a payment service and a video playback service. Therefore, the user A may perform a corresponding service on the second electronic device.

For example, a parent creates a user ID for a child in a smart home system, and associates the user ID with a face on a tablet device. In addition, the parent further sets use permission for the user ID of the child, for example, the child can watch TV, but cannot perform payment. When the parent shares the face of the child on the tablet computer with a smart screen (the associated user ID of the child is also sent to the smart screen in the sharing process), the smart screen may determine, based on the user ID, a usage policy for the face, that is, the parent does not need to set additional permission for the shared face.

In this way, the first electronic device avoids, by sharing a biometric feature, repeated recording of a same user on another device, or enables a device that does not have a biometric feature collection capability to obtain an authenticated biometric feature template. Therefore, when the first electronic device distributes locally stored sensitive data to the second electronic device, service scenarios in which the sensitive data is used or permission of users using the sensitive data can be standardized by using the usage policy information, so that abuse of the sensitive data is avoided. It should be noted that the foregoing method is also applicable to transmission of other sensitive data, for example, information such as an unlock password.

Figure 15:
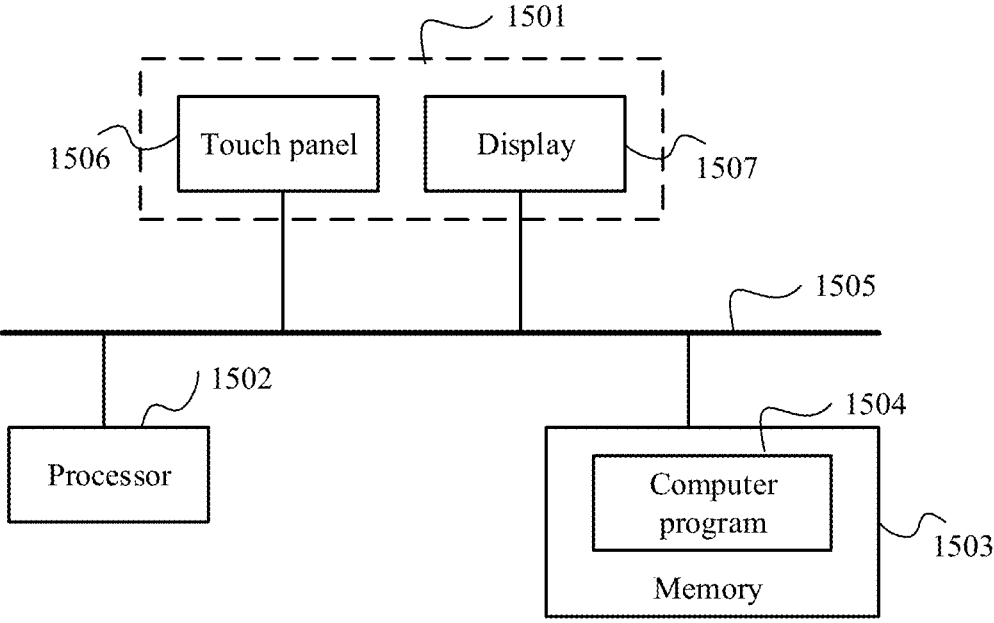
FIG. 15 is a schematic structural diagram of an electronic device according to an embodiment of this application.

In some other embodiments of this application, the embodiments of this application disclose an electronic device. As shown in FIG. 15, the electronic device may include a touchscreen 1501. The touchscreen 1501 includes a touch panel 1506 and a display 1507, one or more processors 1502, a memory 1503, one or more applications (not shown), and one or more computer programs 1504. The foregoing components may be connected by using one or more communications buses 1505. The one or more computer programs 1504 are stored in the memory 1503 and are configured to be executed by the one or more processors 1502. The one or more computer programs 1504 include instructions, which can be used to perform the operations in Embodiment 1 and Embodiment 2.

It may be understood that the memory 1503 in FIG. 15 of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example instead of limitation, many forms of RAMs are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

Based on the foregoing embodiments, an embodiment of this application further provides a computer program. When the computer program runs on a computer, the computer is enabled to perform the data transmission method according to the foregoing embodiments.

Based on the foregoing embodiments, an embodiment of this application further provides a computer storage medium. The computer storage medium stores a computer program. When the computer program runs on a computer, the computer is enabled to perform the data transmission method according to the foregoing embodiments.

The storage medium may be any available medium accessible by a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer.

Based on the foregoing embodiments, an embodiment of this application further provides a chip. The chip is configured to: read a computer program stored in a memory, and perform the data transmission method according to the foregoing embodiments.

Based on the foregoing embodiments, an embodiment of this application provides a computer program product. When the computer program product runs on an electronic device, the data transmission method according to the foregoing embodiments is implemented.

In conclusion, embodiments of this application provide a data transmission method and an electronic device. In this solution, a device may transmit locally stored data to another device, and enables, by using usage policy information, the another device that receives shared data to perform an authorized service according to an indication of the usage policy information. In this way, when the device transmits the locally stored data to the another device, a service scenario in which the shared data can be used can be standardized by using the usage policy information, thereby avoiding abuse of the shared data. Therefore, by using this method, the device can prevent shared data from being used in an improper or unexpected application scenario, thereby better ensuring security of shared data that is stored in a distributed manner. In addition, after distribution, the shared data cannot be abused or used for an extended purpose. Moreover, shared data in another device still complies with an authorized service configured by a distributing device. Therefore, the device can well manage and control the shared data.

A person skilled in the art should understand that the embodiments of this application may be provided as a method, a system, or a computer program product. Therefore, this application may use a form of hardware-only embodiments, software-only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable data processing device, thereby generating computer-implemented processing. Therefore, the instructions executed on the computer or the another programmable data processing device provide operations for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations provided that they fall within the scope of the claims of this application and their equivalent technologies.

What is claimed is:

1. A data transmission method, comprising:
establishing, by a first electronic device, a connection to a second electronic device;
receiving, by the first electronic device, a request from the second electronic device, wherein the request comprises a biometric feature input by a user;
performing, by the first electronic device by using a target biometric feature template, authentication on the biometric feature input by the user, and, in response to the authentication succeeding, determining sensitive data associated with the target biometric feature template;
receiving, by the first electronic device, a first operation of the user, wherein the first operation is used to select, by the user from a plurality of pieces of sensitive data, the target biometric feature template and the sensitive data, and the plurality of pieces of sensitive data comprise the target biometric feature template and the sensitive data;
establishing, by the first electronic device, an association relationship between the target biometric feature template and the sensitive data in response to the first operation;
receiving, by the first electronic device, data sharing requests from the second electronic device and a third electronic device;
in response to receiving the data sharing requests, fragmenting, by the first electronic device, the sensitive data into first data fragments and second data fragments, wherein the second data fragments are different from the first data fragments, and the first data fragments and the second data fragments constitute the sensitive data;
transmitting, by the first electronic device, the first data fragments to the second electronic device; and
transmitting, by the first electronic device, the second data fragments to the third electronic device.

2. The method according to claim 1, wherein the plurality of pieces of sensitive data are displayed on the first electronic device.

3. The method according to claim 1, further comprising:
in a process of receiving the sensitive data input by the user, performing, by the first electronic device, authentication on the user by using the target biometric feature template; and
in response to the authentication succeeding, recording, by the first electronic device, an association relationship between the sensitive data input by the user and the target biometric feature template.

4. The method according to claim 1, wherein the establishing, by the first electronic device, the connection to the second electronic device comprises:
sending, by the first electronic device, check request information to the second electronic device;
receiving, by the first electronic device, a security proof from the second electronic device;
performing, by the first electronic device, a security check on the second electronic device according to the security proof; and
establishing, by the first electronic device, the connection to the second electronic device after determining that the security check succeeds.

5. The method according to claim 1, further comprising:
generating, by the first electronic device, a negotiation key by using a device certificate preset in a trusted execution environment of the first electronic device,
wherein transmitting, by the first electronic device, the first data fragments to the second electronic device comprises:
encrypting, by the first electronic device, the first data fragments by using the negotiation key; and transmitting the encrypted first data fragments to the second electronic device.

6. The method according to claim 1, wherein transmitting, by the first electronic device, the first data fragments to the second electronic device comprises:

transmitting, by the first electronic device, the first data fragments and usage policy information to the second electronic device, wherein the usage policy information is used to indicate an authorized service, and the authorized service is a service that can be executed by the second electronic device by using the sensitive data.

7. The method according to claim 1, wherein the sensitive data comprises at least one of user's confidential data or biometric feature data.

8. The method according to claim 1, wherein the second electronic device and the first electronic device are connected to a same local area network, and the second electronic device and the first electronic device are pre-bound to a same user account.

9. A data transmission method, comprising:

establishing, by a second electronic device, a connection to a first electronic device;

sending, by the second electronic device, a request to the first electronic device, wherein the request comprises a biometric feature input by a user;

sending, by the second electronic device, a data sharing request to the first electronic device;

receiving, by the second electronic device, first data fragments of sensitive data from the first electronic device, wherein the sensitive data is determined according to the biometric feature;

wherein:

a first operation of the user is received by the first electronic device, wherein the first operation is used to select, by the user from a plurality of pieces of sensitive data, a target biometric feature template and the sensitive data, and the plurality of pieces of sensitive data comprise the target biometric feature template and the sensitive data;

an association relationship is established, by the first electronic device, between the target biometric feature template and the sensitive data in response to the first operation;

the sensitive data is fragmented, by the first electronic device, into the first data fragments and second data fragments, wherein the second data fragments are different from the first data fragments, and the first data fragments and the second data fragments constitute the sensitive data;

the first data fragments are transmitted, by the first electronic device, to the second electronic device; and the second data fragments are transmitted, by the first electronic device, to a third electronic device.

10. The method according to claim 9, further comprising:

receiving, by the second electronic device, check request information from the first electronic device;

sending, by the second electronic device, a security proof to the first electronic device; and establishing, by the second electronic device, the connection to the first electronic device.

11. The method according to claim 9, wherein receiving, by the second electronic device, the first data fragments from the first electronic device comprises receiving, by the second electronic device, encrypted first data fragments from the first electronic device, and wherein the method further comprises:

generating, by the second electronic device, a negotiation key by using a device certificate preset in a trusted execution environment of the second electronic device; and performing, by the second electronic device, decryption by using the negotiation key to obtain the first data fragments.

12. The method according to claim 9, further comprising:

receiving, by the second electronic device, usage policy information from the first electronic device, wherein the usage policy information is used to indicate an authorized service, and the authorized service is a service that can be executed by the second electronic device by using the sensitive data.

13. The method according to claim 9, wherein the sensitive data comprises at least one of user's confidential data or biometric feature data.

14. The method according to claim 9, wherein the second electronic device and the first electronic device are connected to a same local area network, and the second electronic device and the first electronic device are pre-bound to a same user account.

15. An electronic device, comprising:

a processor; and a memory storing program instructions, which when executed by the processor, cause the electronic device to:

establish a connection to a second electronic device;

receive a request from the second electronic device, wherein the request comprises a biometric feature input by a user;

perform, using a target biometric feature template, authentication on the biometric feature input by the user, and, in response to the authentication succeeding, determine sensitive data associated with the target biometric feature template;

receive a first operation of the user, wherein the first operation is used to select, by the user from a plurality of pieces of sensitive data, the target biometric feature template and the sensitive data, and the plurality of pieces of sensitive data comprise the target biometric feature template and the sensitive data;

establish an association relationship between the target biometric feature template and the sensitive data in response to the first operation;

receive data sharing requests from the second electronic device and a third electronic device;

in response to receiving the data sharing requests, fragment the sensitive data into first data fragments and second data fragments, wherein the second data fragments are different from the first data fragments, and the first data fragments and the second data fragments constitute the sensitive data;

transmit the first data fragments to the second electronic device; and transmit the second data fragments to the third electronic device.

16. The electronic device according to claim 15, wherein the plurality of pieces of sensitive data are displayed on the electronic device.

17. The electronic device according to claim 15, wherein the program instructions, which when executed by the processor, further cause the electronic device to:

in a process of receiving the sensitive data input by the user, perform authentication on the user by using the target biometric feature template; and in response to the authentication succeeding, record an association relationship between the sensitive data input by the user and the target biometric feature template.

18. The electronic device according to claim 15, wherein to establish the connection to the second electronic device, the electronic device is to:

send check request information to the second electronic device;

receive a security proof from the second electronic device;

perform a security check on the second electronic device according to the security proof; and establish the connection to the second electronic device after determining that the security check succeeds.

19. A non-transitory computer-readable storage medium comprising program instructions, which when run on an electronic device, cause the electronic device to:

establish a connection to a second electronic device;

receive a request from the second electronic device, wherein the request comprises a biometric feature input by a user;

perform, using a target biometric feature template, authentication on the biometric feature input by the user, and, in response to the authentication succeeding, determine sensitive data associated with the target biometric feature template;

receive a first operation of the user, wherein the first operation is used to select, by the user from a plurality of pieces of sensitive data, the target biometric feature template and the sensitive data, and the plurality of pieces of sensitive data comprise the target biometric feature template and the sensitive data;

establish an association relationship between the target biometric feature template and the sensitive data in response to the first operation;

receive data sharing requests from the second electronic device and a third electronic device;

in response to receiving the data sharing requests, fragment the sensitive data into first data fragments and second data fragments, wherein the second data fragments are different from the first data fragments, and the first data fragments and the second data fragments constitute the sensitive data;

transmit the first data fragments to the second electronic device; and transmit the second data fragments to the third electronic device.

* * * * *